(12) United States Patent
Lew et al.

(10) Patent No.: US 8,180,042 B2
(45) Date of Patent: May 15, 2012

(54) AGENT COMMUNICATIONS TOOL FOR COORDINATED DISTRIBUTION, REVIEW, AND VALIDATION OF CALL CENTER DATA

(75) Inventors: Steven Lew, Newton, MA (US);
Jeanne-Marie Daggett, London (GB);
Robert Etchepare, Highlands Ranch, CO (US)

(73) Assignee: Accenture Global Services Limited, Dublin (IE)

( * ) Notice: Subject to any disclaimer, the term of this patent is extended or adjusted under 35 U.S.C. 154(b) by 884 days.

(21) Appl. No.: 12/191,621

(22) Filed: Aug. 14, 2008

(65) Prior Publication Data
US 2009/0046846 A1    Feb. 19, 2009

Related U.S. Application Data

(60) Provisional application No. 60/965,136, filed on Aug. 17, 2007.

(51) Int. Cl.
H04M 3/00    (2006.01)
(52) U.S. Cl. .............................. 379/265.02; 379/265.04
(58) Field of Classification Search . 379/265.01–265.14
See application file for complete search history.

(56) References Cited

U.S. PATENT DOCUMENTS

| | | | |
|---|---|---|---|
| 7,110,525 B1 * | 9/2006 | Heller et al. | 379/265.11 |
| 7,174,010 B2 * | 2/2007 | McIlwaine et al. | 379/265.01 |
| 2003/0086555 A1 | 5/2003 | McIlwaine et al. | |

FOREIGN PATENT DOCUMENTS

| | | |
|---|---|---|
| EP | 0 982 915 A2 | 3/2000 |
| EP | 0 982 915 A3 | 6/2003 |

OTHER PUBLICATIONS

International Preliminary Report on Patentability issued Feb. 24, 2010 [including Written Opinion of the International Searching Authority].

* cited by examiner

*Primary Examiner* — Curtis Kuntz
*Assistant Examiner* — Amal Zenati
(74) *Attorney, Agent, or Firm* — Brinks Hofer Gilson & Lione

(57) ABSTRACT

The Agent Communication Toolbox (ACT) eliminates the burdens to call center managers of manually distributing desk drops and following up with call center agents to determine whether the agents have accessed the desk drops and completed related training. ACT provides distributed communications to the desktop of a call center agent. ACT records access, testing and training by call center agents and produces reports that indicate the understanding and content comprehension of call center agents. ACT provides real-time coaching to call center agents to improve call center agent knowledge, increase first call resolution and the quality of responses provided by the call center agent. ACT also intelligently routes communications based on the location and skills of the call center agent, reducing the volume of communications and network bandwidth requirements.

19 Claims, 62 Drawing Sheets

Web Based User Interface
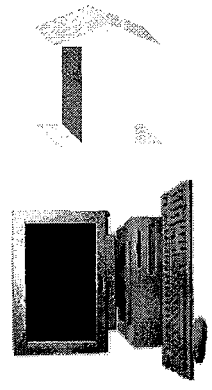
Content
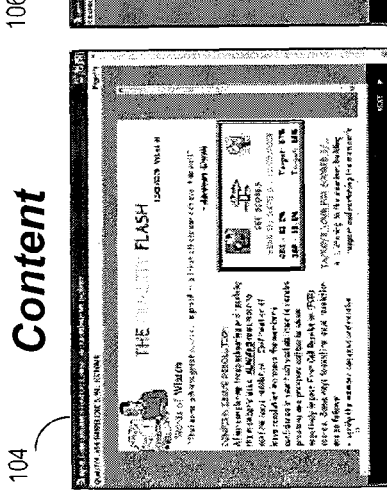
Exams
Reports
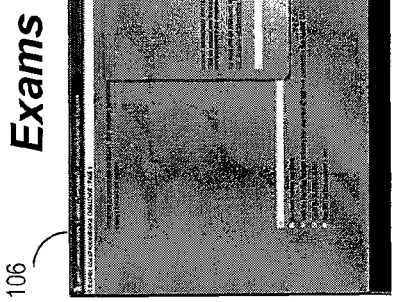
Figure 1

Report 4: Missed Exam Questions by User

| Exam Name | Vendor | Center | Team Lead | USERNAME | FTE Eligible for Content | # FTE Tested | # FTE Incomplete | % Complete | Average Score | # Scoring Less Than 80 | % Scoring Less Than 80 | # Scoring 100 | % Scoring 100 | # of Times Accessed the Exam |
|---|---|---|---|---|---|---|---|---|---|---|---|---|---|---|
| CSI AGENT | ChaseCom | | | | 1,565 | 122 | 1443 | 8% | 83% | 37 | 30% | 13 | 11% | |
| CSI AGENT | ChaseCom | Houston | | | 190 | 33 | 157 | 17% | 84% | 8 | 24% | 4 | 12% | |
| CSI AGENT | ChaseCom | Houston | | | 190 | 33 | 157 | 17% | 84% | 8 | 24% | 4 | 12% | |
| CSI AGENT | ChaseCom | Houston | fts_amarty | | 1 | 0 | 1 | 0% | | | | | | |
| CSI AGENT | ChaseCom | Houston | fts_amarty | fts_amarty | 1 | 0 | 1 | 0% | | | | | | 0 |
| CSI AGENT | ChaseCom | Houston | FTS_BBUTLER | | 17 | 4 | 13 | 24% | 84% | 1 | 25% | | | |
| CSI AGENT | ChaseCom | Houston | FTS_BBUTLER | FTS_AANOSIKE | 1 | 0 | 1 | 0% | | | | | | 0 |
| CSI AGENT | ChaseCom | Houston | FTS_BBUTLER | FTS_ALEWIS1 | 1 | 0 | 1 | 0% | | | | | | 0 |
| CSI AGENT | ChaseCom | Houston | FTS_BBUTLER | FTS_ALEWIS1 | 1 | 1 | 0 | 100% | 83% | | | | | 1 |
| CSI AGENT | ChaseCom | Houston | FTS_BBUTLER | FTS_CBAISY1 | | | | | | | | | | |
| CSI AGENT | ChaseCom | Houston | FTS_BBUTLER | FTS_CBAISY1 | | | | | | | | | | |
| CSI AGENT | ChaseCom | Houston | FTS_BBUTLER | FTS_CBAISY1 | | | | | | | | | | |
| CSI AGENT | ChaseCom | Houston | FTS_BBUTLER | FTS_CCUTWRIGH | 1 | 0 | 1 | 0% | | | | | | 0 |
| CSI AGENT | ChaseCom | Houston | FTS_BBUTLER | FTS_CDAVIS5 | | | | | | | | | | |
| CSI AGENT | ChaseCom | Houston | FTS_BBUTLER | FTS_CDAVIS5 | 1 | 1 | 0 | 100% | 73% | 1 | | | | 1 |
| CSI AGENT | ChaseCom | Houston | FTS_BBUTLER | FTS_CDAVIS5 | | | | | | | | | | |

| | A | B | C | D | E | F | G | H |
|---|---|---|---|---|---|---|---|---|
| 1 | Report 14: Escalation report | | | | | | | |
| 2 | Module Name | Vendor | | Center | Team Lead | User Name | Average | Date Data Pulled |
| 3 | WPA; November 1, 2006 | 2wire | | 2wire-Phoenix | fts_brossi | fts_ashockman | 60% | 11/20/2006 |
| 4 | WPA; November 1, 2006 | 2wire | | 2wire-Phoenix | fts_brossi | fts_aspletter | 80% | 11/20/2006 |
| 5 | WPA; November 1, 2006 | 2wire | | 2wire-Phoenix | fts_brossi | fts_bcostales | 80% | 11/20/2006 |
| 6 | WPA; November 1, 2006 | 2wire | | 2wire-Phoenix | fts_brossi | fts_bmatus | 100% | 11/20/2006 |
| 7 | WPA; November 1, 2006 | 2wire | | 2wire-Phoenix | fts_brossi | fts_dwalser | 40% | 11/20/2006 |
| 8 | WPA; November 1, 2006 | 2wire | | 2wire-Phoenix | fts_brossi | fts_gmays | 40% | 11/20/2006 |
| 9 | WPA; November 1, 2006 | 2wire | | 2wire-Phoenix | fts_brossi | fts_gvillatoro | 80% | 11/20/2006 |
| 10 | WPA; November 1, 2006 | 2wire | | 2wire-Phoenix | fts_brossi | fts_jangell | 100% | 11/20/2006 |
| 11 | WPA; November 1, 2006 | 2wire | | 2wire-Phoenix | fts_brossi | fts_jbradley | 80% | 11/20/2006 |
| 12 | WPA; November 1, 2006 | 2wire | | 2wire-Phoenix | fts_brossi | fts_jcreighton | 100% | 11/20/2006 |

| Last Name | First Name | Score | Completed |
|---|---|---|---|
| Adamson | Dale | 60% | Yes |
| Barker | James | 60% | Yes |
| Buramekh | Jason | 100% | Yes |
| Campbell | Sigurd | 40% | Yes |
| Cessor | Andy | 40% | Yes |
| Chambers | Brent | 0% | No |
| Cole | Mark | 100% | Yes |
| Dartt | Richard | 0% | No |
| Demmer | Dominique | 60% | Yes |
| Francis | Peter | 100% | Yes |
| Garcia | Brian | 40% | Yes |
| Halla | Bradley | 40% | Yes |
| Hudson | Beau | 60% | Yes |
| Jackson | Nika | 0% | No |
| Mark | Gregg | 100% | Yes |
| Mooney | William | 60% | Yes |
| Sanchez | Fabian | 80% | Yes |
| Sommers | Laura | 60% | Yes |
| Walliser | Chad | 40% | Yes |
| Ward | Dustin | 80% | Yes |
| Team Lead Summary | | 66% | 85% |

Content Name: WPA, October 25, 2006
Type: WPAs
Start Date: 10/25/2006
End Date: 11/15/2006
Team Lead Last Name: Wooten
Team Lead First Name: Daniel
Team Lead Username: fts_dwooten

Figure 35

AGENT COMMUNICATIONS TOOL FOR COORDINATED DISTRIBUTION, REVIEW, AND VALIDATION OF CALL CENTER DATA

BACKGROUND OF THE INVENTION

1. Technical Field

This disclosure concerns a system and method to distribute communications and track access, testing and training of a recipient based on the location, skill and line of business within the responsibility of the recipient. In particular, this disclosure concerns a system and method to automatically monitor receipt and comprehension of information, training progress regarding distributed information and compliance with progress goals.

2. Background Information

Organizations require large call center facilities with thousands of agents located globally to maintain daily operations. Call center managers face a significant challenge and consume a great deal of time manually distributing information to agents and monitoring whether agents actually read the information and more importantly comprehend the information. Unfortunately, the manual practice of monitoring whether an agent comprehends information and performs requisite training activities cannot be completed in a timely fashion. In addition, the global distribution of information and the countless number of systems and vendors supported by call centers make the task of monitoring information distribution and actual comprehension by agents of the information make the use of a manual process impractical.

A need has long existed for a system and method that address the problems noted above and other previously experienced.

SUMMARY

The Agent Communication Toolbox (ACT) eliminates the burdens to call center managers of manually distributing desk drops and following up with call center agents to determine whether the agents have accessed the desk drops and completed related training. ACT provides distributed communications to the desktop of a call center agent. ACT records access, testing and training by call center agents and produces reports that indicate the understanding and content comprehension of call center agents. ACT provides real-time coaching to call center agents to improve call center agent knowledge, increase first call resolution and the quality of responses provided by the call center agent. ACT also intelligently routes communications based on the location and skills of the call center agent, reducing the volume of communications and network bandwidth requirements.

Agent Communications Tool (ACT) may be used by organizations and the subcontractors of an organization to provide call center agents with process updates (daily, weekly, and other intervals of time). ACT includes routing, tracking and feedback logic, documentation, training guides, agent guides, admin guides, design guides, agent ID guides. Supervisors formerly provided agents with "desk drops," hard copy or virtual notices about problem areas that an agent would be expected to address during their business day when end customers called for support into a call center. ACT automatically distributes training to Call Center Agents (CCAs) regarding the latest tools, technology and processes and procedures, and provides training status information regarding the progress of CCAs.

ACT uses real-time dynamic routing to deliver directed content to contact center agents. ACT includes logic to measure comprehension of the content, and to provide real-time feedback to the end agents and their supervisors. ACT provides distributed communications to the agent desktop, improving operational efficiency, restricts communications based on agent location and skills, reducing the volume of communications, tracks and reports agent access to content, confirming agent compliance, tests and reports agent comprehension of content, assessing agent understanding, and provides real-time coaching to agents during testing to improve knowledge, increasing first call resolution and quality.

Other systems, methods, and features of the invention may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 1 illustrates an example of the Agent Communications Toolbox (ACT) components.

FIG. 12 illustrates an ACT report customization interface.

FIG. 14 illustrates Report 1—Exam by agent.

FIG. 17 shows Report 4—Missed Exam Questions by agent.

FIG. 20 shows Report 8—Module by LoB.

FIG. 26 shows Report 14—Escalation Report.

FIG. 27 shows Online Team Lead Reports.

FIG. 35 illustrates a search agent administration interface and an edit agent administration interface.

DETAILED DESCRIPTION

Figure 2:
FIG. 2 shows an example ACT login screen.

The Agent Communications Toolbox (ACT) hosts agent communications and agent examinations. ACT hosts examinations including Weekly Process Announcement (WPA) and WPA quizzes, desk drops, quality flashes, job aids, and exams. ACT provides a central location for managing communications with agents and directs communications to agents so that agents receive communications from vendors specific to the area of responsibility of the agent, call center and line of business (LoB). Call center managers and agents can review the examination results of agents (e.g., a WPA quiz). Agents can access ACT content electronically during idle time and at a point-of-need. Agents may use ACT to refer back to previous communications such as a job aid used in the past. Agents can customize the view of ACT so that the agent can see a log of information previously read and past due information scheduled for the agent to read. ACT can be implemented in a customized configuration with the input of agents and team leads in focus groups, surveys and y-jacking.

Once an organization implements ACT, agents access WPAs and WPA quizzes, desk drops, quality flashes and job aids using ACT. Agents take examinations in ACT and during idle time, agents can explore the communications and job aids within ACT.

Call center agent team leads may use the online ACT reports to track agent completion of communications including WPAs, desk drops and quality flashes. Team leads may use the online ACT reports to identify and coach agents that score low on quizzes. Team leads may use the ACT Management Reporting Tool (MRT) reports to identify and coach agents on topics the agent missed on a particular quiz and/or examination. Team leads can leverage job aids hosted in ACT to assist in coaching agents.

A vendor point of contact (e.g., vendor lead) may use the ACT MRT reports to track completion of communications between vendor representatives and the call center team lead and/or agents. The vendor leads may also use the ACT MRT reports to identify areas of low agent comprehension.

ACT may use a Microsoft Windows Server 2003, Microsoft IIS Web server, Crystal Reports, and Microsoft SQL Server, as well as software and other technologies such as Macromedia DreamWeaver 8.0, Microsoft Visual Studio .NET, Crystal Reports Developer Edition, and Norton Antivirus.

Although specific components of ACT may be described, methods, systems, and articles of manufacture consistent with ACT may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. An example of such a signal is a physical layer Ethernet signal bearing TCP/IP packets that include program source logic or executable programs. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may instead be implemented in hardware.

FIG. 1 illustrates an example of the Agent Communications Toolbox (ACT) components 100. The ACT 100 include a web based agent interface, ACT home page 102, content 104, examinations 106 and reports 108. ACT 100 provides distributed communications to the desktop of a call center agent, improving operational efficiency. ACT 100 also restricts communications based on the location and skills of the call center agent, reducing the volume of communications and network bandwidth requirements. ACT 100 tracks and reports agent access to content so that an organization can monitor compliance with training, as well as other organizational policies. ACT 100 tests and reports the understanding and content comprehension of call center agents and provides real-time coaching to call center agents during testing to improve knowledge, and increase first call resolution and the quality of response provided by the call center agent.

ACT may be used to distribute communications and examinations to call center agents. ACT 100 provides a single source for agents to access all of their communications. ACT 100 provides the capability to target communications to specific agents and to measure whether or not the agent has accessed the content. ACT 100 also uses tracking and testing capabilities to provide immediate feedback to agents and management with a way to check and measure compliance and comprehension of the material.

ACT reduces customer service costs by providing a means to effectively distribute content and examinations to call center agents. ACT 100 directs relevant content to only those agents that need the information. ACT 100 delivers content real-time and enables standardized messages to be quickly disseminated across a global network. The examination functions of ACT 100 provide immediate feedback to agents to establish whether the agents understand the delivered material, transforming communications into training and comprehension. The training feature of ACT 100 assists an organization in determining which agents require additional training and the topics for training. The delivery costs of ACT 100 training avoid instructor costs and leverages agent idle time.

ACT increases customer satisfaction by identifying topics of low agent comprehension by analyzing test results and bridges that gap by automatically initiating agent training. As a result of bridging targeted knowledge gaps, agent knowledge increases, agent quality improves and customer satisfaction rises. Customer satisfaction increases, as agents become better educated and better skilled through the content delivered by ACT. ACT 100 provides a fast, economical, reusable, fully configured and tested solution that reduces the time and resources needed to design and deploy the implementation. An organization may customize ACT 100 to suit specific business requirements of the organization.

FIG. 2 shows an example ACT login screen 200. An agent (e.g., call center agent, team lead, and/or vendor lead) may use a browser and/or agent interface to access the ACT login screen 200. In one implementation, the ACT administrator may configure logins to be identical to other application logins used by the agents and require the ACT password to be unique from other applications used by the agents. In another implementation, ACT 100 may use login/password synchronization so that agents can login using the same login and password used for another application.

Figure 3:
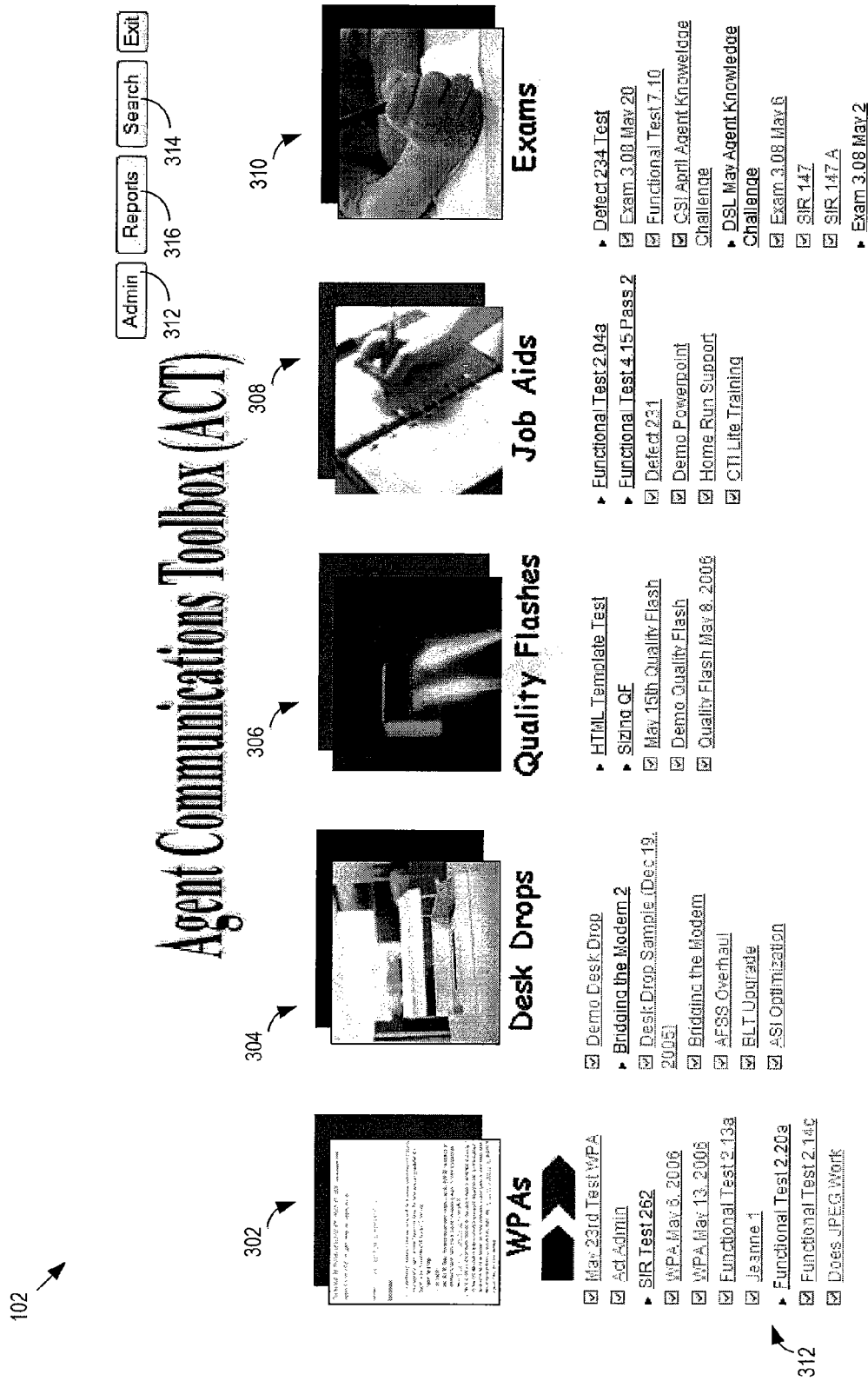
FIG. 3 illustrates the ACT home page 102.

FIG. 3 illustrates the ACT home page 102. Once an agent logins into ACT, an agent customized ACT home page 102 appears. ACT 100 displays content on the ACT home page 102 applicable to the vendor, center and line of business (LoB) within the scope of responsibility of the agent. The ACT home page 102 displays content categories that may include WPAs 302, desk drops 304, quality flashes 306, job aids 308, and examinations 310. Under each content category the ACT home page 102 may display ACT content hyperlinks 312. For example, an agent who supports CCS-Manila DSL may only receive content for that vendor, call center, and LoB combination. Agents supporting multiple lines of business, such as DSL and CSI, may receive content applicable to all lines of the lines of business the agent supports. ACT 100 may display the ten most recently released content items on the home page 102 of the agent and provide the agent access to other content items archived by ACT 100. ACT 100 may mark content with an arrow to indicate content that the agent has not read. ACT 100 may mark content with a "check" to indicate content that the agent has completed (e.g., read information, examination and/or quiz). ACT 100 may highlight content in "red" that has not been completed and/or past due date (e.g., Defect 234 Test). In one implementation, an agent may access ACT content by selecting one of the items displayed on the ACT home page 102 and ACT 100 displays the content in a new browser window and/or agent interface.

Figure 4:
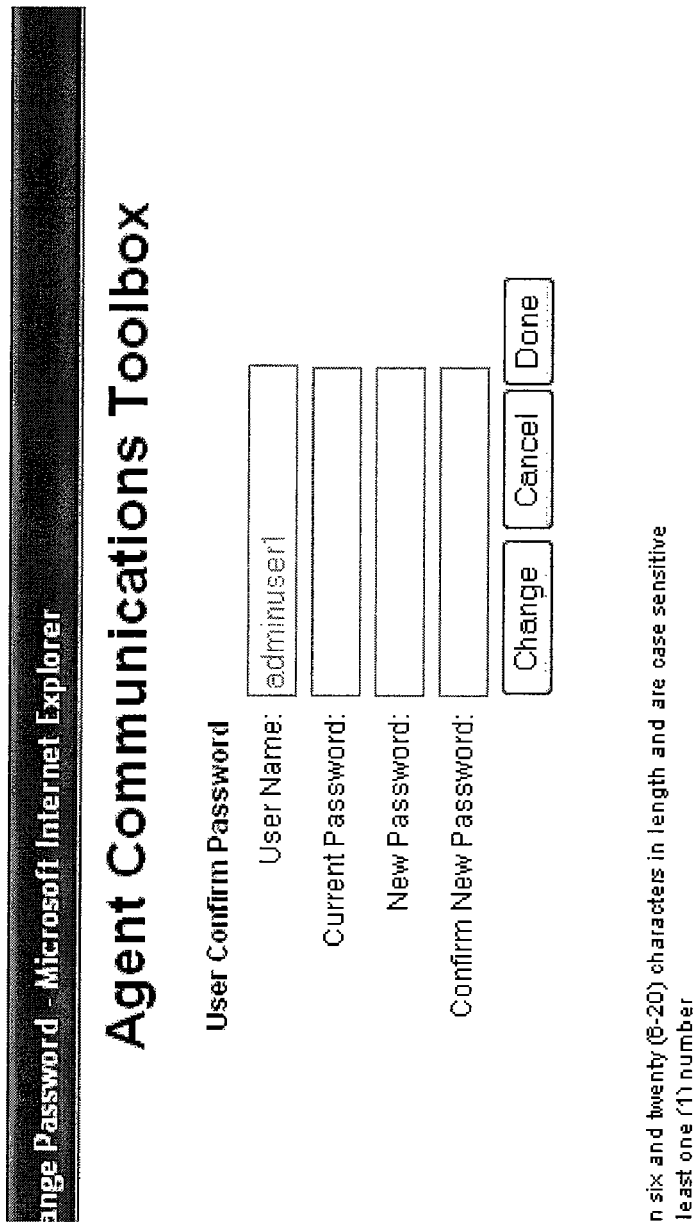
FIG. 4 shows an Agent Communications Toolbox agent confirm password screen.

FIG. 4 shows an Agent Communications Toolbox agent confirm password screen 400. In one implementation, when an agent logs into ACT 100 for the first the agent may need to change the ACT password by clicking on the "Admin" button 312 on the ACT home page 102. ACT 100 may direct the agent to select the "user change password" option from the "Admin" button 312 displayed on the ACT home page 102. ACT may direct the agent to enter the parameters displayed on the "user confirm password" screen. In one implementation, ACT 100 provides the same procedure and set of screens to allow an agent to change the password again following the same steps. In the event an agent encounters an issue while attempting to change the password, the agent can contact the ACT administrator for assistance.

Figure 5:
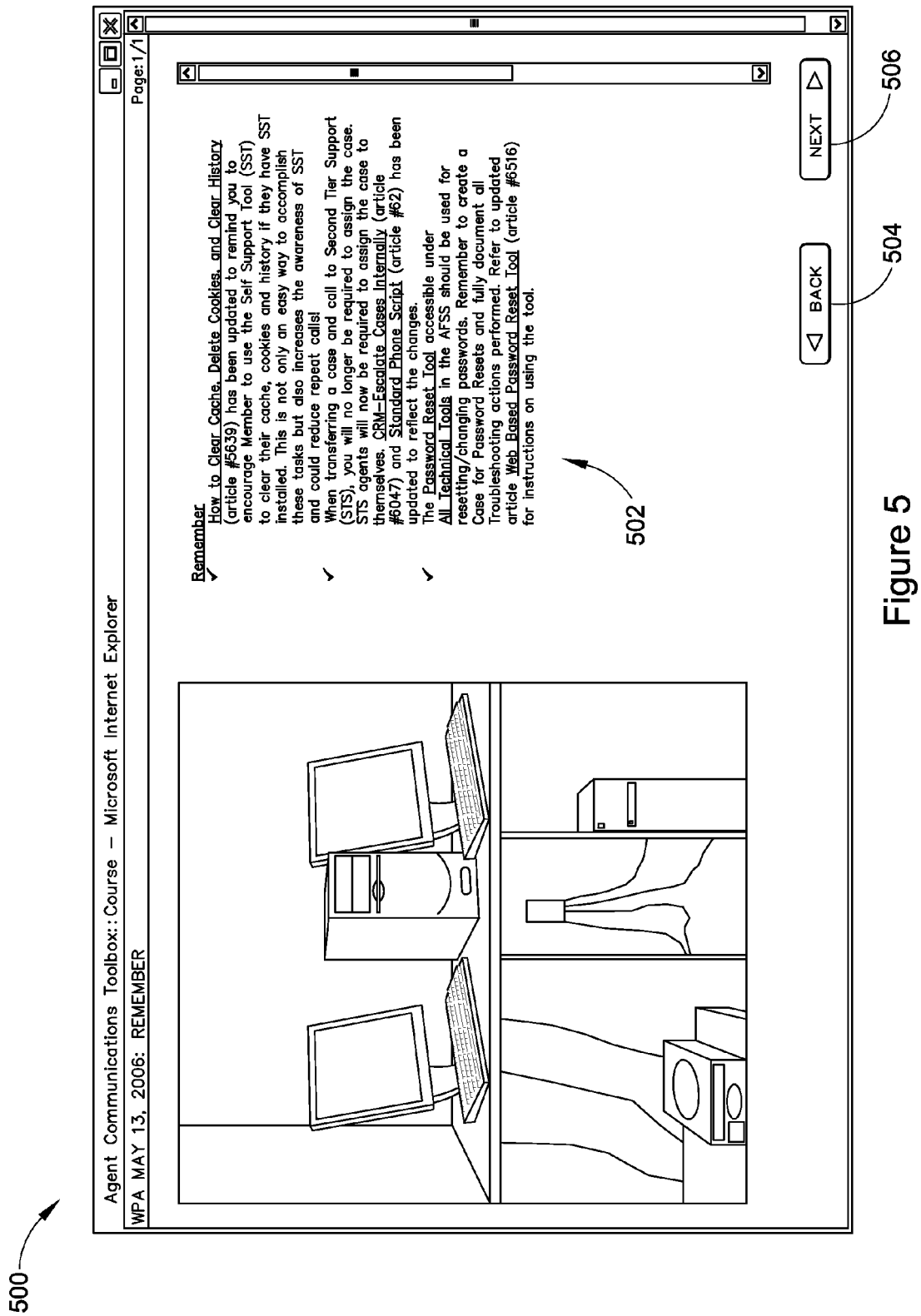
FIG. 5 shows an example Weekly Process Announcement (WPA).

FIG. 5 shows an example Weekly Process Announcement (WPA) 500. The WPA may include scroll bars used to access and view content (e.g., WPA data 502) that does not fit into a window or browser, and "back" button 504 and "next button 506 to navigate multiple displays. An agent may select hyperlinks and ACT 100 displays content in a new window.

Figure 6:
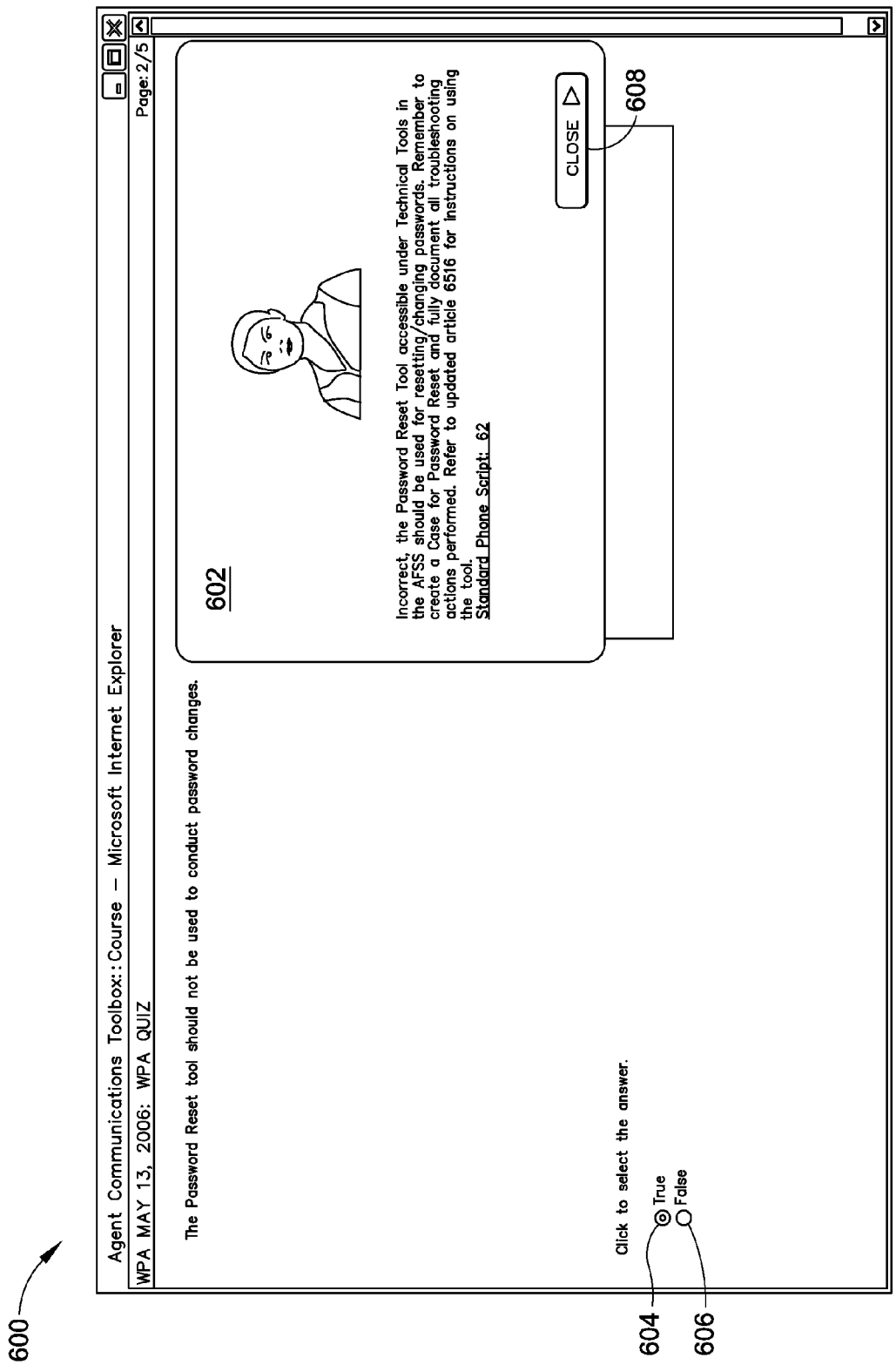
FIG. 6 illustrates an example WPA quiz question with a feedback box displayed.

FIG. 6 illustrates an example WPA quiz question 600 with a feedback box displayed 602. ACT 100 may not include questions in some modules. ACT 100 provides radio buttons (e.g., 604 and 606) for modules with questions. ACT 100 may display a feedback box 602 after an agent has selected an answer to an examination and/or quiz question. ACT feedback encourages agents to write down where to find additional information on a particular topic. In one implementation, ACT 100 may prevent an agent from navigating back to a previously answered question or pages and ACT 100 may not allow an agent to skip a question. Once an agent selects the "close" button 608 ACT displays the next question.

Figure 7:
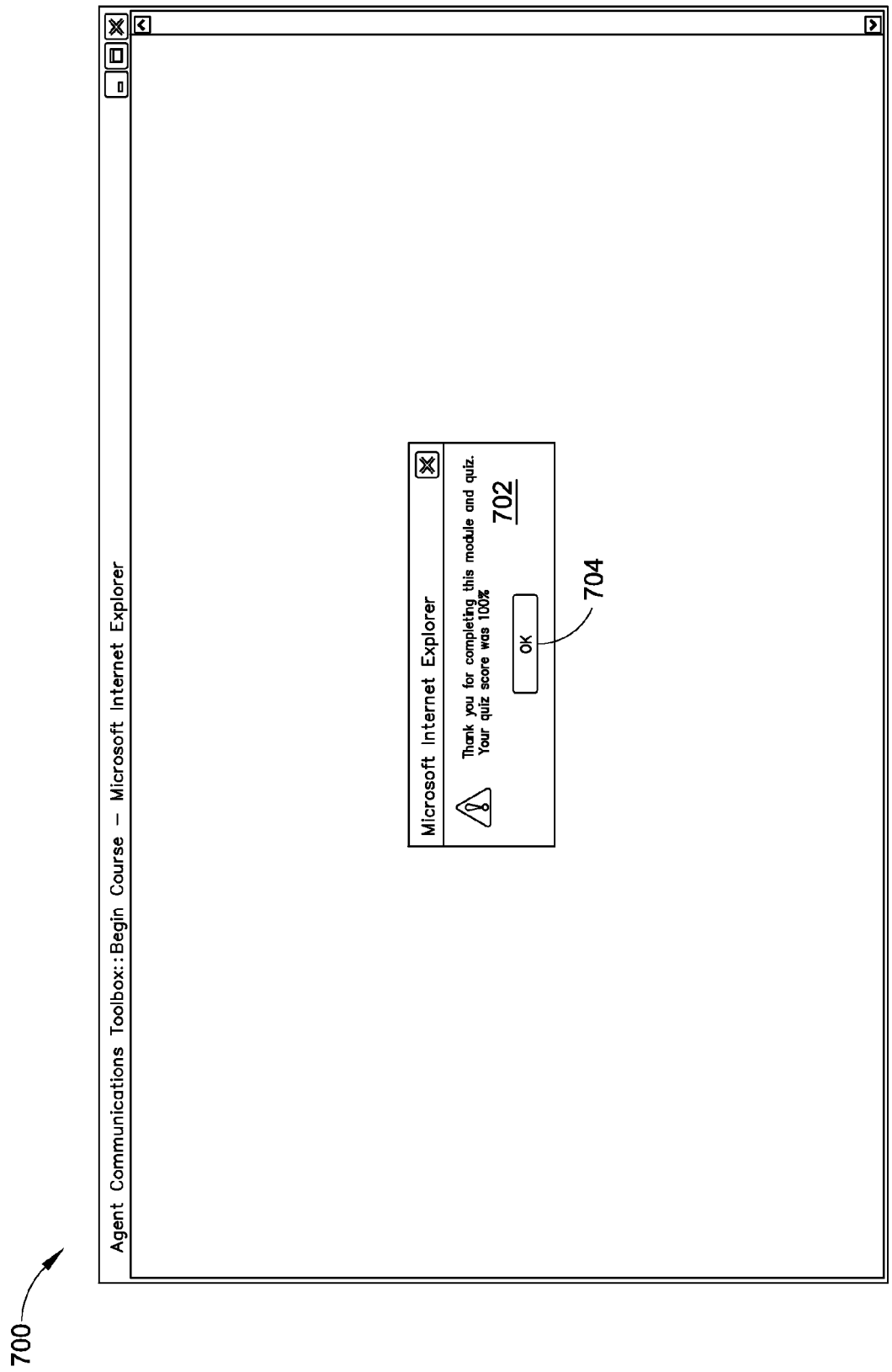
FIG. 7 shows an example of an ACT completion message display that ACT may display when an agent has completed an examination and/or quiz.

FIG. 7 shows an example of an ACT completion message display 700 that ACT may display when an agent has completed an examination and/or quiz. In one implementation, ACT displays the completion message 702 to confirm that the agent has finished the module and ACT displays the examination and/or quiz score of the agent. When a module does not have questions, ACT displays a message indicating that the agent has completed the module (e.g., "Thank the agent for completing the module"). When the agent selects the "ok" button 704, ACT displays the ACT home page 102.

Figure 8:
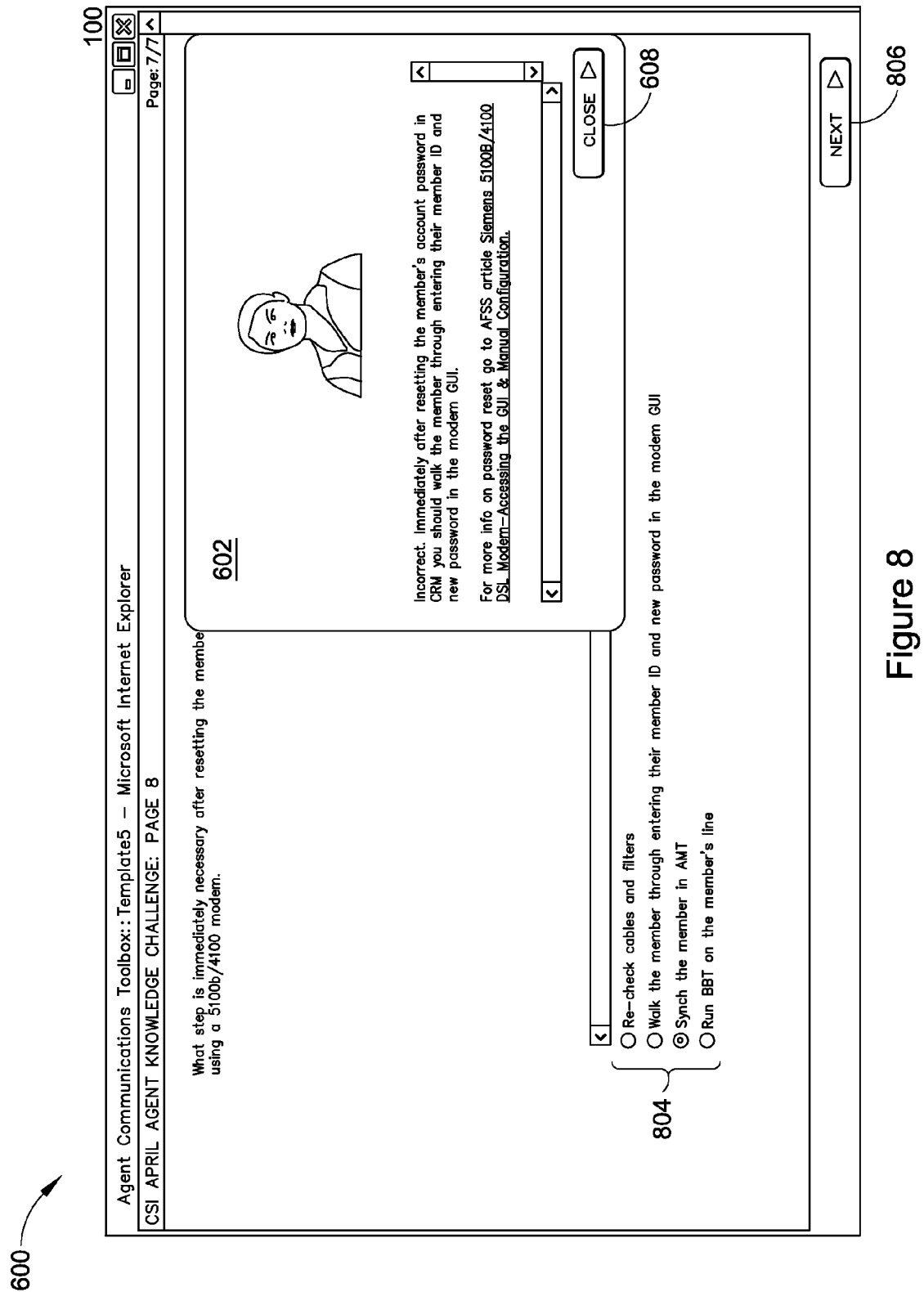
FIG. 8 shows another example of an examination question.

FIG. 8 shows another example of an examination question 800. Once an agent selects an answer by selecting a corresponding radio button 804 and then selecting the "next" button 806, ACT may display a feedback box (e.g., 602). The feedback box 602 may encourage the agent to note where additional information may be found related to the topic of the question that the agent answered. When the agent selects the "close" button 608 ACT displays the next question in the module.

Figure 9:
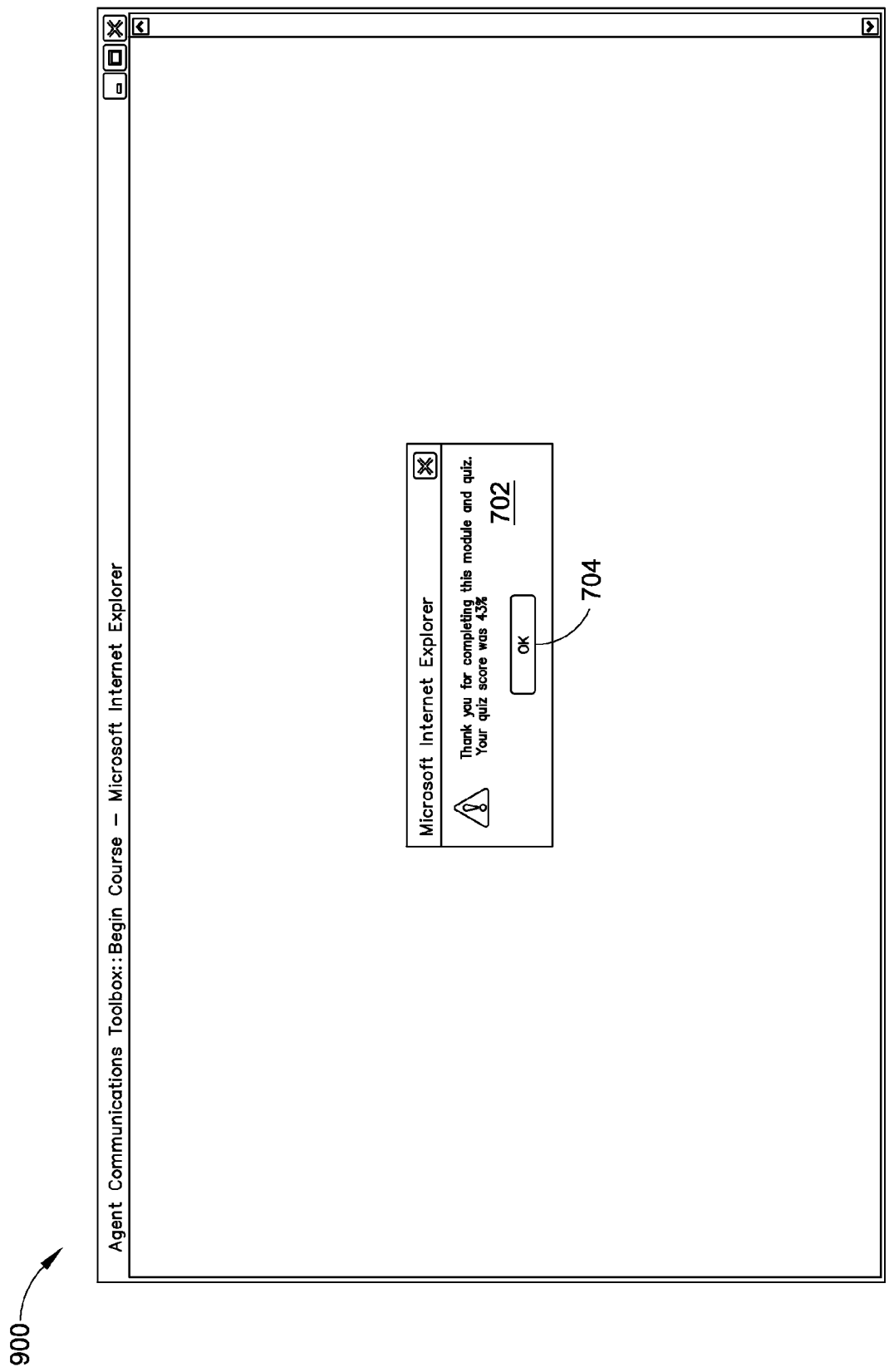
FIG. 9 illustrates another example of an ACT completion message display 900 that ACT may display when an agent has completed an examination and/or quiz.

FIG. 9 illustrates another example of an ACT completion message display 900 that ACT may display when an agent has completed an examination and/or quiz. After completing an examination, a completion message 702 appears with the score of the agent. Once the agent may select the "ok" button 704 ACT displays the ACT home page 102.

Figure 10:
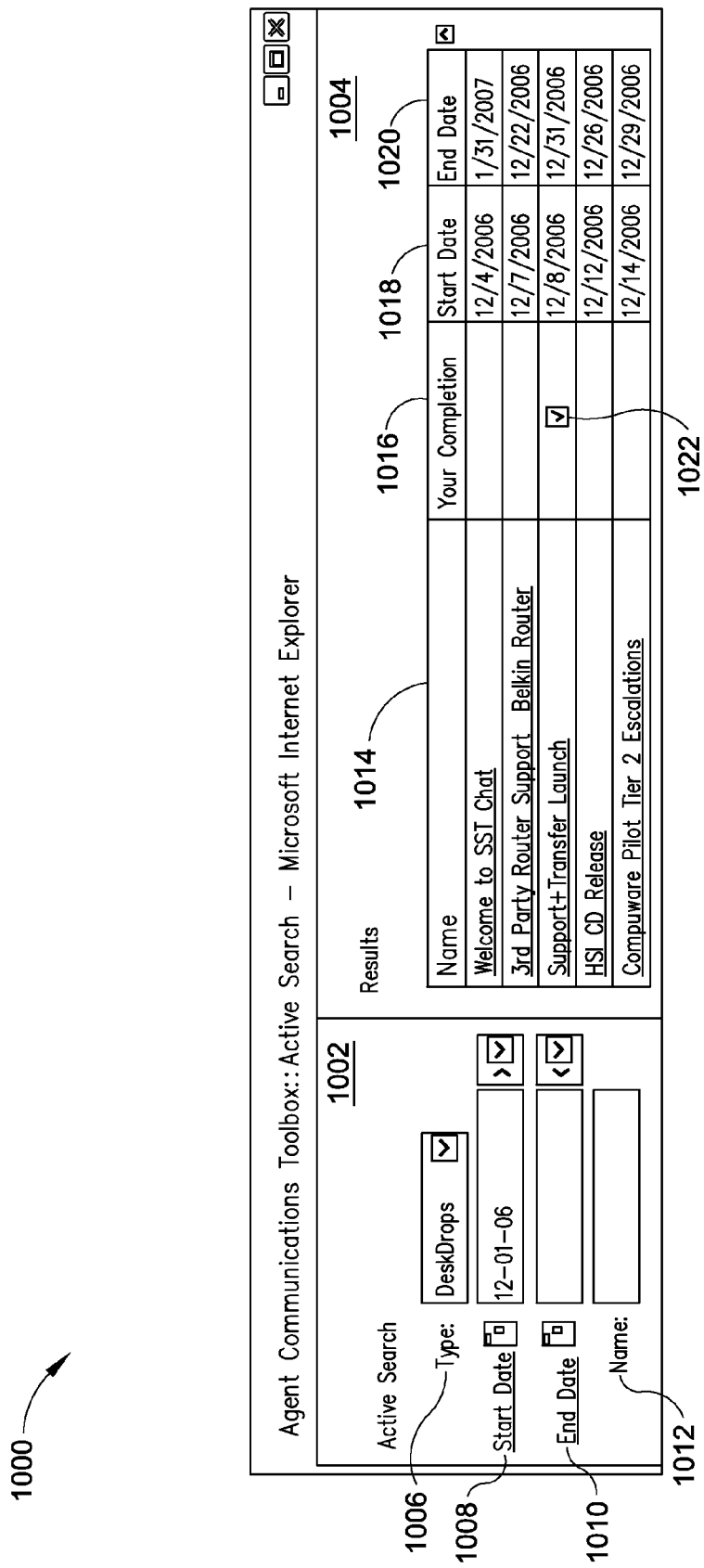
FIG. 10 shows an example of the ACT archive search page.

FIG. 10 shows an example of the ACT archive search page 1000. The ACT archive search page 1000 may include a search criteria interface 1002 and a search result interface 1004. ACT 100 automatically retires older content to an archive when ACT 100 publishes newer content. When an agent selects the "search" button 314 on the ACT home page 102 ACT 100 displays the "archive search" page 1000. An agent may search content (e.g., a module) in the ACT archive search page 1000 based on content type 1006 (e.g., WPA, and Desk Drop), the date of the content (e.g., date range specified by start date 1008 and end date 1010), and the name of the content 1012. The search criteria of the agent can be refined by using all or part of the name of a module. The search result interface 1004 displays information according to the following column headings: the name of the content 1014; an agent completion column 1016; start date 1018; and end date 1020. ACT indicates the modules that the agent has completed by displaying a check mark 1022 in the "The agent Completion" column 1016. In one implementation, ACT searches content based on the vendor, call center, and/or LoB of the agent.

An agent may log into ACT at the beginning of the shift, check for new content (e.g., a new desk drop), complete outstanding desk drops, and complete any content that ACT indicates past due (e.g., highlighted in red). In one implementation, the agent may complete all WPAs and WPA quizzes, quality flashes, and examinations as applicable on a weekly basis. During idle time, the agent may explore ACT, view job aids and communications.

TABLE

Help with ACT.

| Topic | Example | Contact |
|---|---|---|
| Edit agent Profile. | User is assigned to another LOB or agent Team Lead has changed. | Team Lead and Call Center ID point of contact (POC). |
| Unlock agent Account. | Locked Out for Invalid Password. | Team Lead and Call Center ID POC. |
| Tool Issue. | Report Tool Outage. | Team Lead and Network Operations Center (NOC). Submit a reoccurring issue as a "Tool Error" in the Feedback Tool. Confirm issue related to ACT. |
| Request A Tool Enhancement. | Add another type of content. | Submit as a "Tool Error" in the Feedback Tool. Confirm issue related to ACT. |

Figure 11:
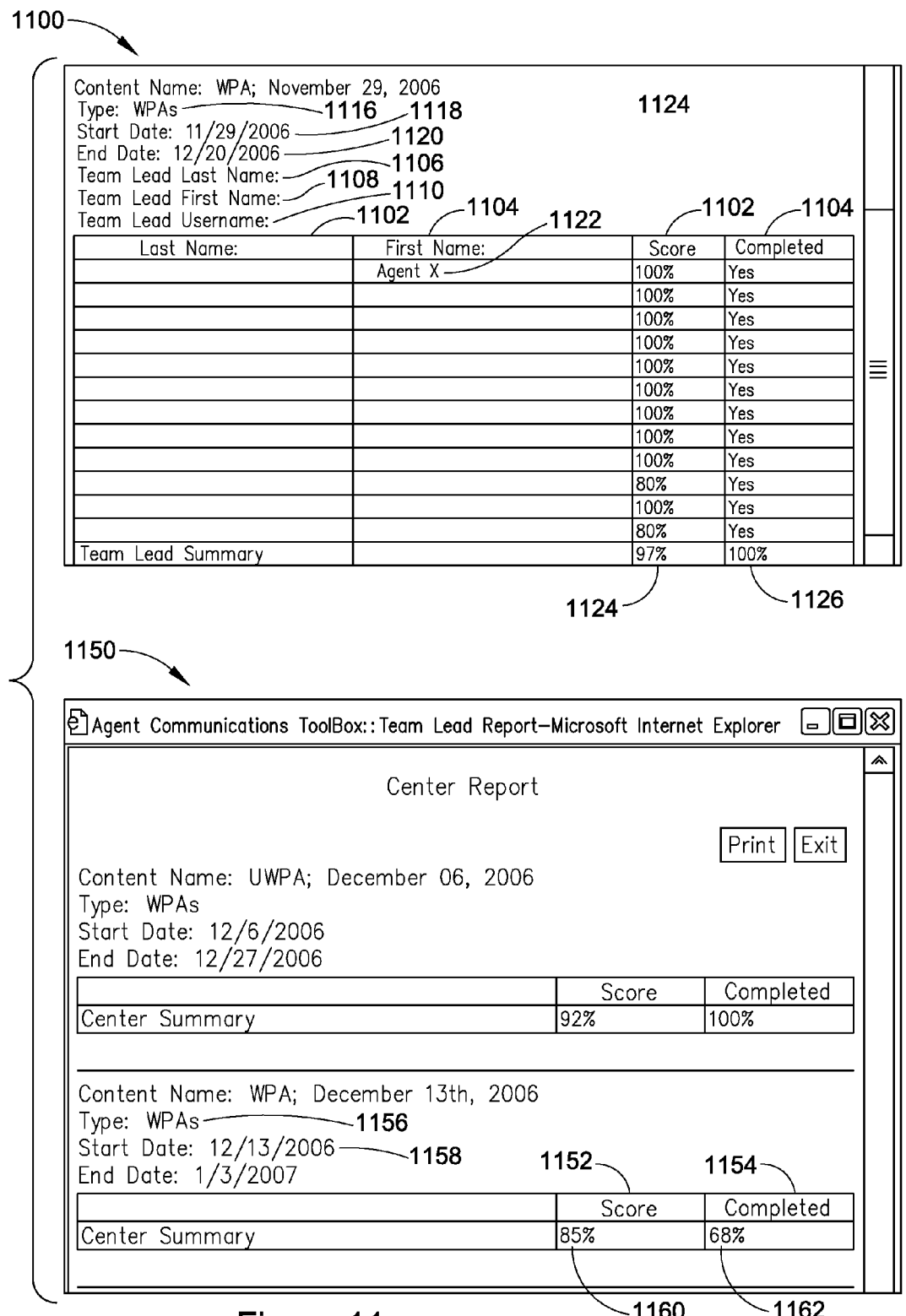
FIG. 11 illustrates an example ACT online report and a center level online report provided by ACT.

FIG. 11 illustrates an example ACT online report 1100. Team Leads can access reports by clicking on the "Reports" button 316 at the top right hand corner of the ACT home page 102. The team lead Online Report lists completion 1102 and scores 1104 for all agents assigned to a team lead (e.g., team lead last name 1106, team lead first name 1108 and team lead username 1110). ACT lists content by last name 1112, first name 1114, the type of content 1116, start date 1118, and end date 1120. Team leads can use ACT to generate reports daily to ensure that agents complete content. Team Leads can coach agents on areas of low comprehension. For example, the ACT report 1100 indicates that agent X 1122 completed the "WPA, Nov. 29, 2006" module and quiz with a score of 100%. The report indicates an average score of 97% 1124 on the "WPA, Nov. 29, 2006" module and quiz for the agents under the responsibility of the team lead. The report indicates a completion percentage of 100% 1126 on the "WPA, Nov. 29, 2006" module and quiz for the agents under the responsibility of the team lead.

FIG. 11 also shows a center level online report 1150 provided by ACT. Call center administrators and/or managers can access reports by selecting the "Reports" button 316 at the top right hand corner of the ACT home page 102. The center level online report lists the completion % 1152 and average score 1154 for all agents within a center. ACT lists content by name, type, start date, and end date. Center administrators and/or managers may use ACT to generate reports daily to check the completion % and average score for center on the WPA. The center level online report 1150 may indicate for "WPA" 1156 on Dec. 13, 2006 1158 an average score 1160 of 85% for agents and the center completion % 1162 of 68% for agents in the center.

The table MRT Reports lists a number of MRT reports. Vendor contacts may access MRT reports. Team leads may use the results provided on MRT reports to identify and coach agents regarding topics the agents answered incorrectly on quizzes and/or examinations. For example, a team lead may review the missed question analysis report (#3) and decide to refer agents to job aids in ACT and provide coaching to agents that miss 3 out of 5 questions on BBT during a DSL Agent Knowledge Challenge. Team leads may use the online reports feature on a daily basis to track agent completion of WPAs, desk drops and quality flashes, and to identify and coach agents that score low on quizzes and/or examinations. Team leads may use the MRT reports on a monthly and/or more frequent basis to identify areas of low agent comprehension and agents that require coaching and leverage job aids provided by ACT while coaching agents.

TABLE

MRT Reports

| Report # | Report | Frequency | Attributes |
|---|---|---|---|
| 1 | Exam by User | Daily | Completion status, average score, % scoring less than 80 and % scoring 100 by username's Vendor, Center and LOB affiliation. |
| 2 | Exam by LOB | Daily | Completion status, average score, % scoring less than 80 and % scoring 100 by LOB. |
| 3 | Missed Exam Questions | Weekly | % of times an exam question is accurately answered and % of |

TABLE-continued

MRT Reports

| | Report # | Report | Frequency | Attributes |
|---|---|---|---|---|
| Exam Reports | | | | times each of the inaccurate choices were selected. |
| | 4 | Missed Exam Questions by User | Weekly | Exam questions missed by user. |
| | 5 | Exam User Past Due | Weekly | Users who are past due for exam completion. |
| | 6 | Score and Performance Correlation | TBD | Compares scores with POSE and FCR Performance Trends. |
| Module Reports | 7 | Module by User | Daily | Module completion status by username's Vendor, Center and Team Lead affiliation. |
| | 8 | Module by Lob | Daily | Module completion status by LoB. |
| | 9 | Missed Module Questions | Weekly | % of times a module question is accurately answered and % of times each of the inaccurate choices were selected. |
| | 10 | Missed Module Questions by User | Weekly | Module questions missed by user. |
| | 11 | Module User Past Due | Weekly | Users who are past due for module completion. |
| | 12 | Free Response Questions for Modules | Weekly | Free response text given by a user within a Module. |
| Exam Reports | 13 | Free Response Questions for Exams | Weekly | Free response text given by a user within an Exam. |
| | 14 | Escalation Certifications | Daily | Scores for the three most recently distributed WPAs for purposes of the Escalation Certification Program. |
| | n/a | Online Team Lead Report | Daily | Module/exam completion status and score results by Team Lead and User. |
| | n/a | Online Center Level Report | Daily | Module/exam completion status and score results at the Center Level. |

Reports 1-6 & 13 may be used for Exams and Reports 7-12 & 14 may be used for Modules. Modules include content categories WPAs, desk drops, Job Aids, and/or Quality Flashes. The two online reports apply to both modules and exams. Only Active agents associated with a Vendor display in the MRT Reports. Specifically, ACT filters out of the MRT Reports inactive agents, deleted agents, and any client and/or ProjectName agents. Team Lead data is displayed, but their scores do not impact the MRT Report Calculations. Only readership of Active content displays in the MRT Reports. Active content is all content that is currently not past its end date and still viewable on the ACT home page 102. In one implementation, the MRT Reports display content when tracking is enabled and the module is distributed to more than the Test LOB. Daily reports may run on any schedule, for example, Monday through Friday at noon.

Figure 12:
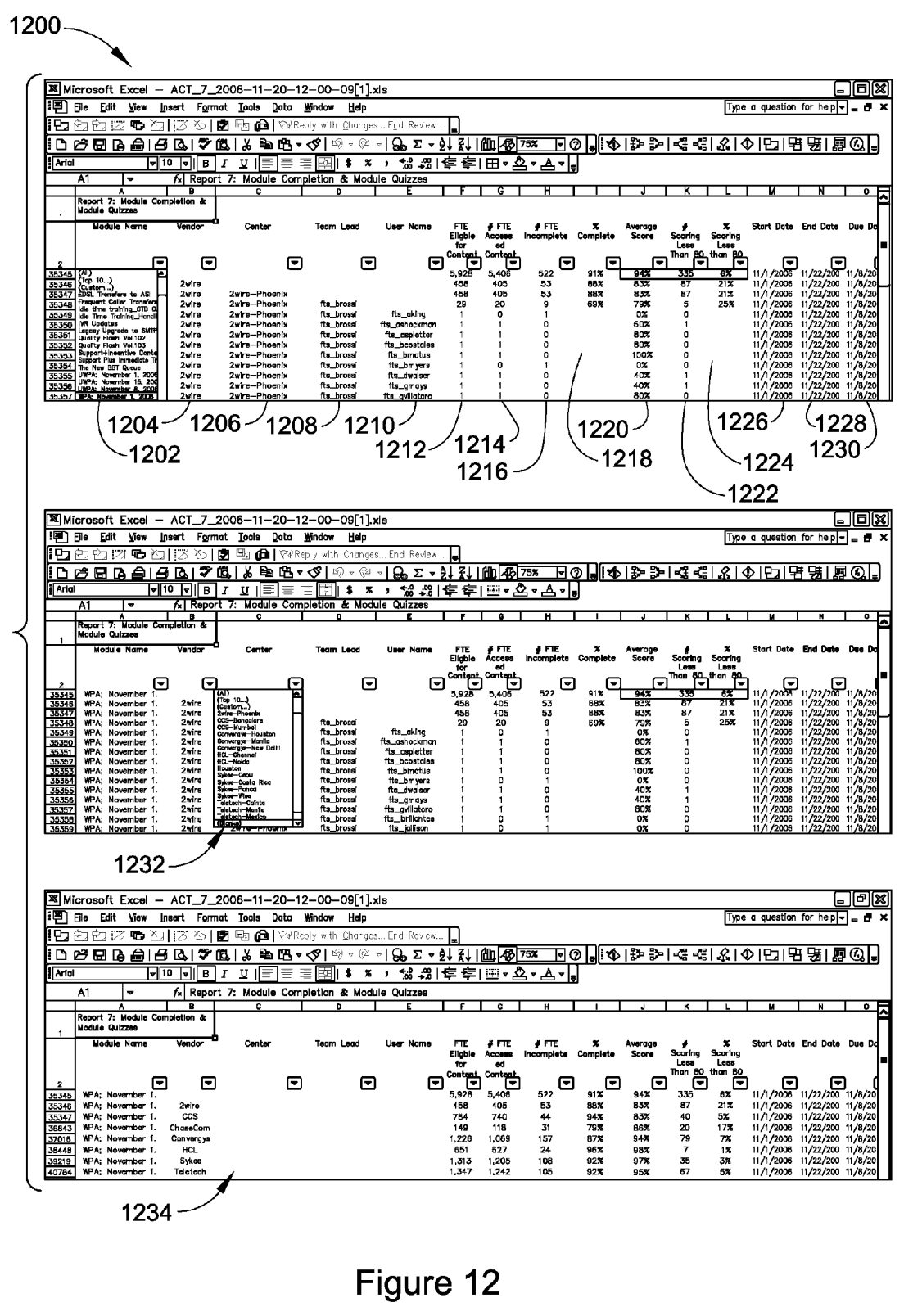

FIG. 12 illustrates an ACT report customization interface 1200. The one way to customize the agent view of the report is to apply a filter. Filters are available under the Tools>Filter>Auto Filter menu. Next, use the module filter 1202 to filter the view to a particular type of content. For example, in the report below, choose "WPA Nov. 1, 2006" in the module filter 1202. Next, depending on the agent preferences for viewing the reports, the filters in the remaining columns can be used to customize the agent report view based on personal preference or need, the filterable columns may include: vendor 1204; call center 1206; team lead 1208; user name (agent name) 1210; number of full-time equivalents (FTEs) eligible for content 1212; number of FTEs that accessed content 1214; number of FTEs that have not completed content 1216; % of FTEs completed content 1218; average score 1220; number of scores less than 80% 1222; % of scores less than 80% 1224; start date 1226; end date 1228; and due date 1230. The agent may select to view reports for a particular call center by selecting from the call center filter 1204. For example, if the agent wanted to view the report by Vendor level, the agent would choose "Blanks" in the list call center filter 1232 (e.g., "Blank" filter value 1234).

Figure 13:
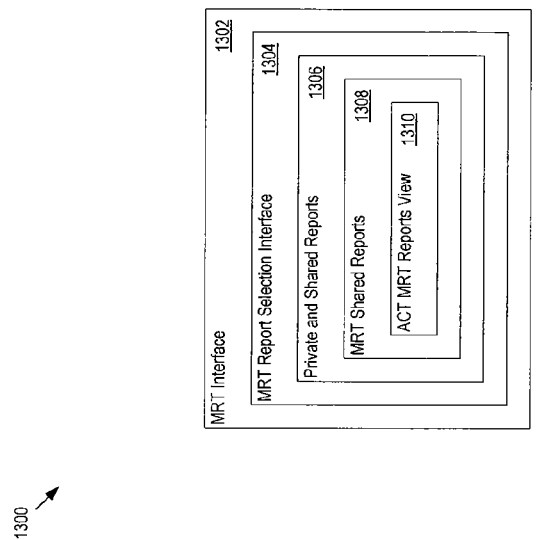
FIG. 13 shows the steps an agent may take to navigate to the ACT MRT reports 1300.

FIG. 13 shows the steps an agent may take to navigate to the ACT MRT reports 1300. From the MRT interface 1302, an agent may select the MRT report selection interface 1304 to select a call center. The agent may then view private and shared reports 1306 for a call center and select the shared reports. The agent may then view the MRT shared reports 1308 including the ACT reports, as well as the Agent certification, Agent Coaching and Agent Knowledge Challenge reports. The agent may then view ACT MRT Reports 1310.

Vendors can access the MRT Reports by going to the web site hosting the documents (e.g., http://www.exampletheMRTreports.com/>Doc Share>Vendor Name>Shared>ACT Reports).

Organization and the client can access the MRT Reports by going to the web site hosting the documents (e.g., http://www.exampletheMRTreports.com/>Doc Share>External>Shared>ACT Reports).

Note: The Organization and client reports differ from the vendor reports in that the client and Organization can see the results for all vendors, whereas the vendor reports only show the results for that particular vendor.

A favorite can be made in Step 5 so that agents can access MRT Reports with one click.

FIG. 14 through FIG. 28 show example reports, with content organized in the columns shown in each Figure. However, any other reports with any other content may instead be implemented, at any other frequency of posting.

Figure 14:
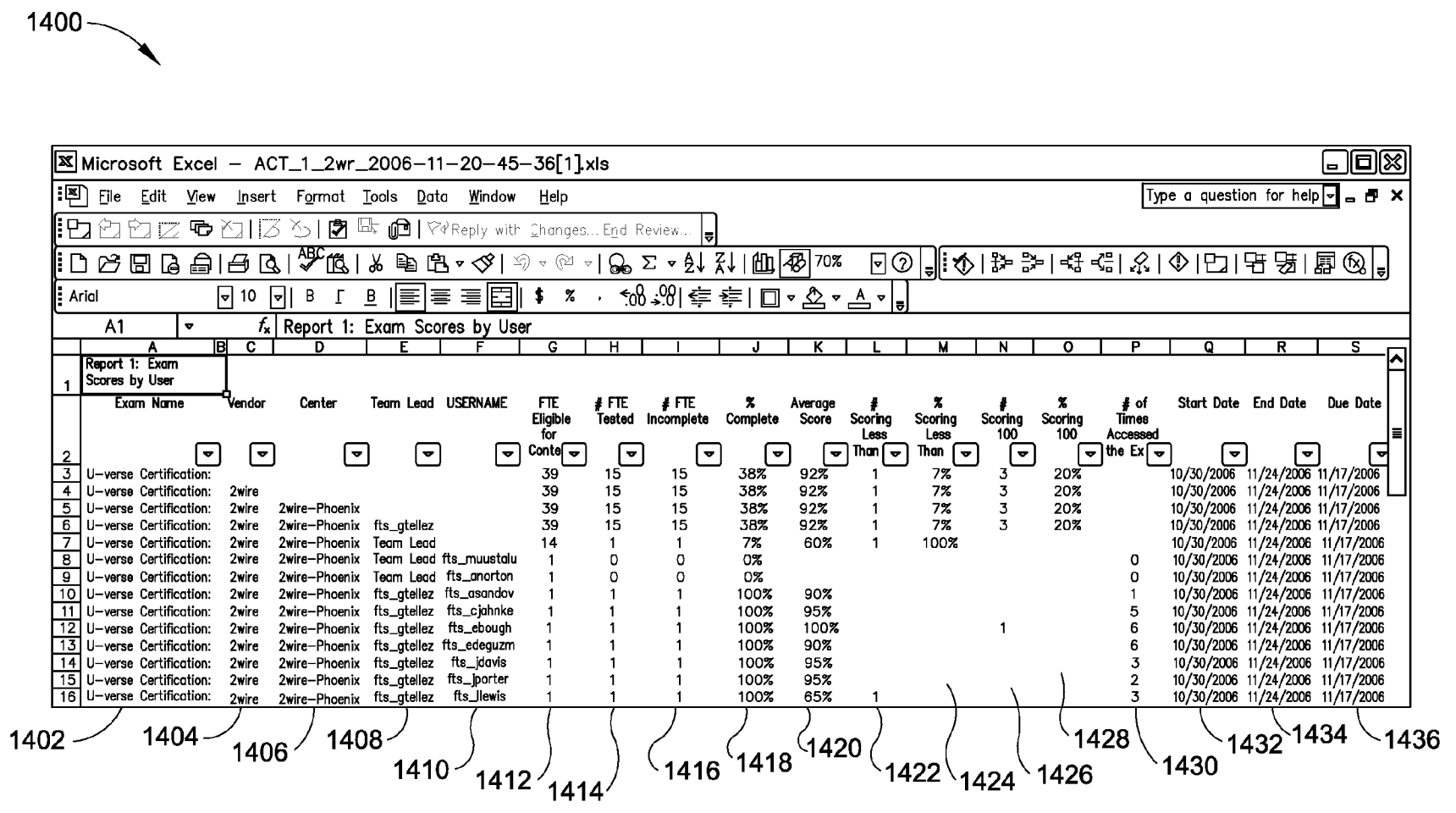

FIG. 14 illustrates Report 1: Exam by agent 1400 including the columns shown in FIG. 14. The Report 1: Exam by agent 1400 may comprise filterable columns including: exam name 1402; vendor 1404 to which the exam is directed; call center 1406 where the agent is assigned; team lead 1408 of the agent; user name (agent name) 1410; number of full-time equivalents (FTEs) eligible to take the exam 1412; number of FTEs that completed the exam 1414; number of FTEs that have not completed the exam 1416; % of FTEs that completed exam 1418; average score 1420 of the completed exams; number of exam scores less than 80% 1422; % of exam scores less than 80% 1424; number of exam scores with 100% correct answers 1426; % of exam scores with 100% correct answers 1428; number of times the agent accessed the exam 1430; start date 1432; end date 1434; and due date 1436. The start date 1432 identifies the date the exam was first accessed by the agent identified by the user name (agent name) 1410, the end date 1434 identifies the date the exam was completed by the agent, and the due date 1436 identifies targeted date for the agent to complete the exam. Purpose: Show exam completion status and score results by Vendor, Center, Team Lead, and agent.

Primary Audience: Team Leads

An Example of Use: Used by Team Leads to confirm the completion of an exam. Note: Only Exams hosted in ACT may appear on this report. All other exams may not appear in the MRT Reports.

Frequency of Posting: Daily

Figure 15:
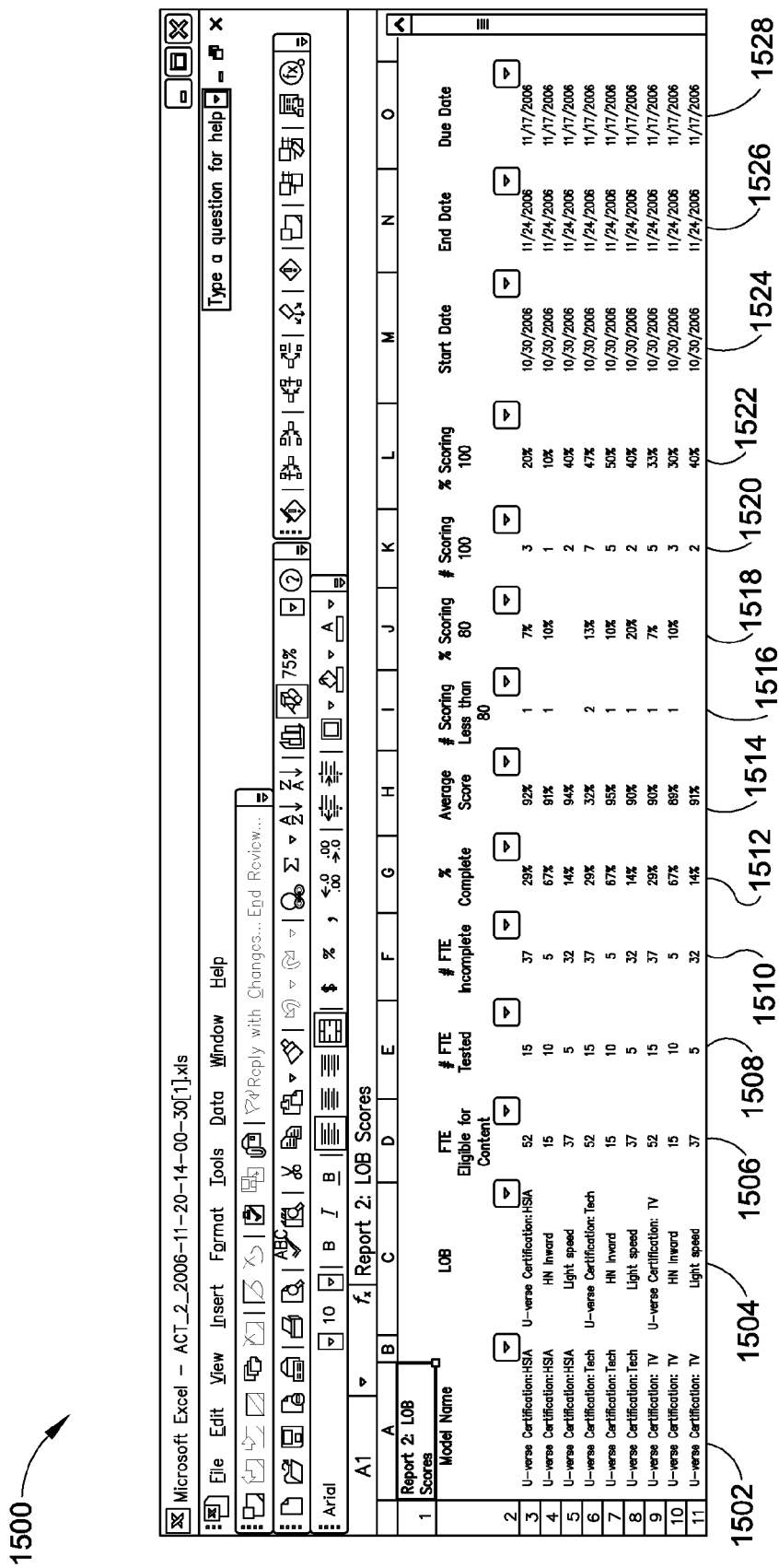
FIG. 15 illustrates Report 2—Exam by Line of Business (LoB).

FIG. 15 illustrates Report 2: Exam by LoB 1500 including the columns shown in FIG. 15. The Report 2: Exam by LoB 1500 may comprise filterable columns including: module name 1502; LOB 1504; number of full-time equivalents (FTEs) eligible for the content 1506 identified by the module name 1502; number of FTEs that completed the exam 1508; number of FTEs that have not completed the exam 1510; % of FTEs that completed exam 1512; average score 1514 of the completed exams; number of exam scores less than 80% 1516; % of exam scores less than 80% 1518; number of exam scores with 100% correct answers 1520; % of exam scores with 100% correct answers 1522; start date 1524; end date 1526; and due date 1528. The start date 1524 identifies the earliest date the exam was first accessed by an agent, the end date 1526 identifies the latest date the exam was completed by an agent, and the due date 1528 identifies targeted date for the agent to complete the exam.

Purpose: Show exam completion status and scores by LoB.

Primary Audience: Training Managers and Team Leads

An Example of Use: Used by a Training Manager to identify incomplete testing and examination scoring trends that cross lines of business.

Frequency of Posting: Daily

Figure 16:
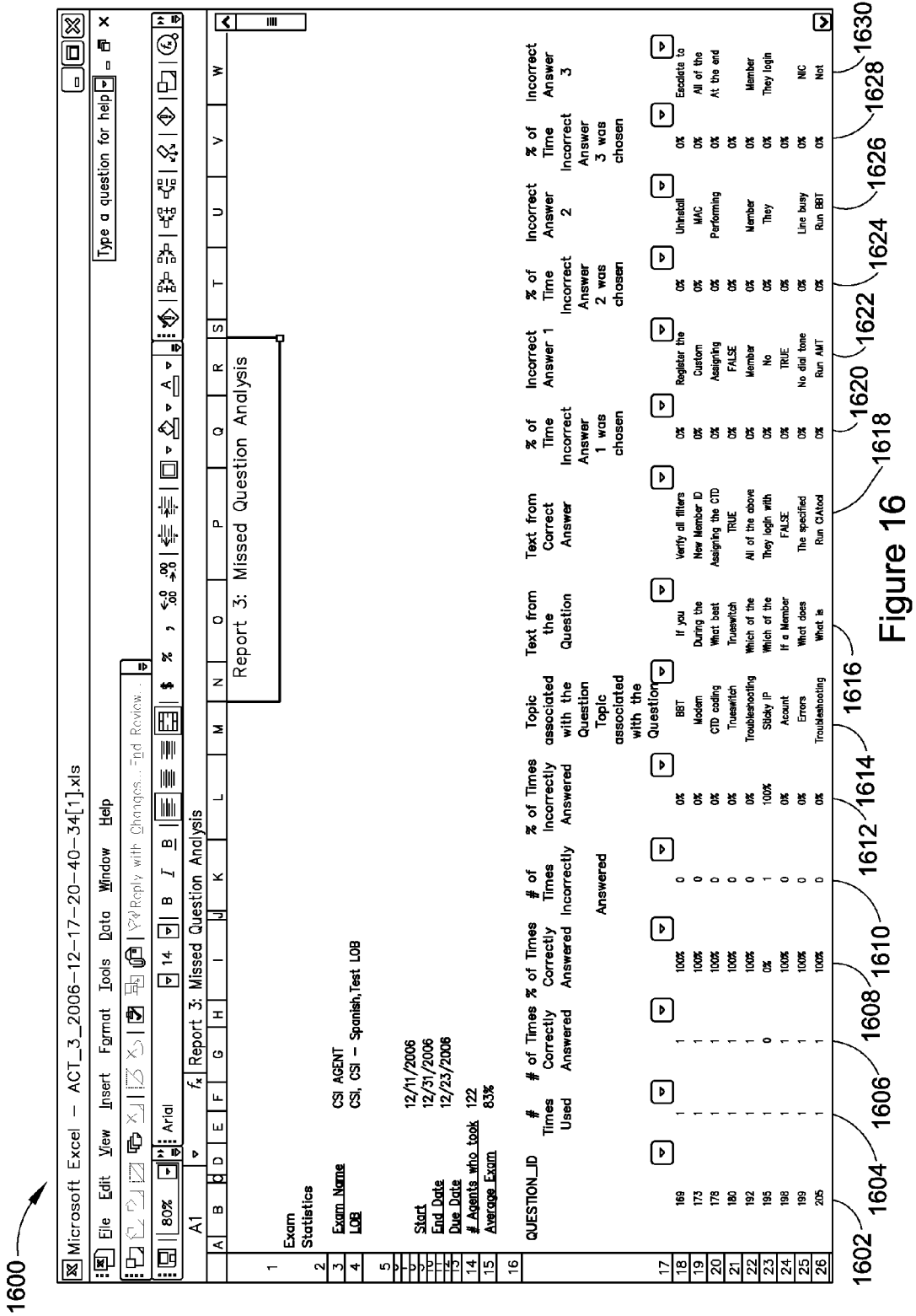
FIG. 16 shows Report 3—Missed Exam Questions.

FIG. 16 shows Report 3: Missed Exam Questions 1600 including the columns shown in FIG. 16. The Report 3: Missed Exam Questions 1600 may comprise filterable columns including: exam question identifier 1602; number of time the exam question was used 1604; number of times the question was answered correctly 1606; % of times the question was answered correctly 1608; number of times the exam question was answered incorrectly 1610; % of times the question was answered incorrectly 1612; topic identifier 1614 that identifies the topic associated with the exam question; the text from the exam question 1616; the text from the correct answer 1618; % of times incorrect answer 1 was chosen as the correct answer 1620; the text from incorrect answer 1 1622; % of times incorrect answer 2 was chosen as the correct answer 1624; the text from incorrect answer 2 1626; % of times incorrect answer 3 was chosen as the correct answer 1628; and the text from incorrect answer 3 1630.

Purpose: To view most frequently missed exam questions and identify areas of low comprehension among Agents.

Primary Audience: Training Manager

An Example of Use: To understand topics of low comprehension across an LOB and bridge the knowledge gap. For example, in Column L the agent can identify a question that was missed a certain % of the time as well as identify in Column M the proficiency of agents regarding certain topics.

Frequency of Posting: Weekly

FIG. 17 shows Report 4: Missed Exam Questions by agent 1700 including the columns shown in FIG. 17. The Report 4: Missed Exam Questions by agent 1700 may comprise filterable columns including: exam name 1702; vendor name 1704; call center 1706 where the agent is assigned; team lead 1708 of the agent; username (agent name) 1710; number of FTEs eligible to take the exam 1712; number of FTEs that have completed the exam 1714; number of FTEs that have not completed the exam 1716; % of FTEs that have completed the exam 1718; the average score 1720 of the completed exams; number of exam scores less than 80% 1722; % of exam scores less than 80% 1724; number of exam scores with 100% correct answers 1726; % of exam scores with 100% correct answers 1728; number of times the agent accessed the exam 1730.

Purpose: Show areas of low proficiency by agent by displaying missed questions by agent.

Primary Audience: Team Lead

An Example of Use: Team Leads may use this report to coach Agents on areas of low proficiency and performance. For those without access to the MRT, this report may be distributed by a POC at the agent center.

Frequency of Posting: Weekly

Figure 18:
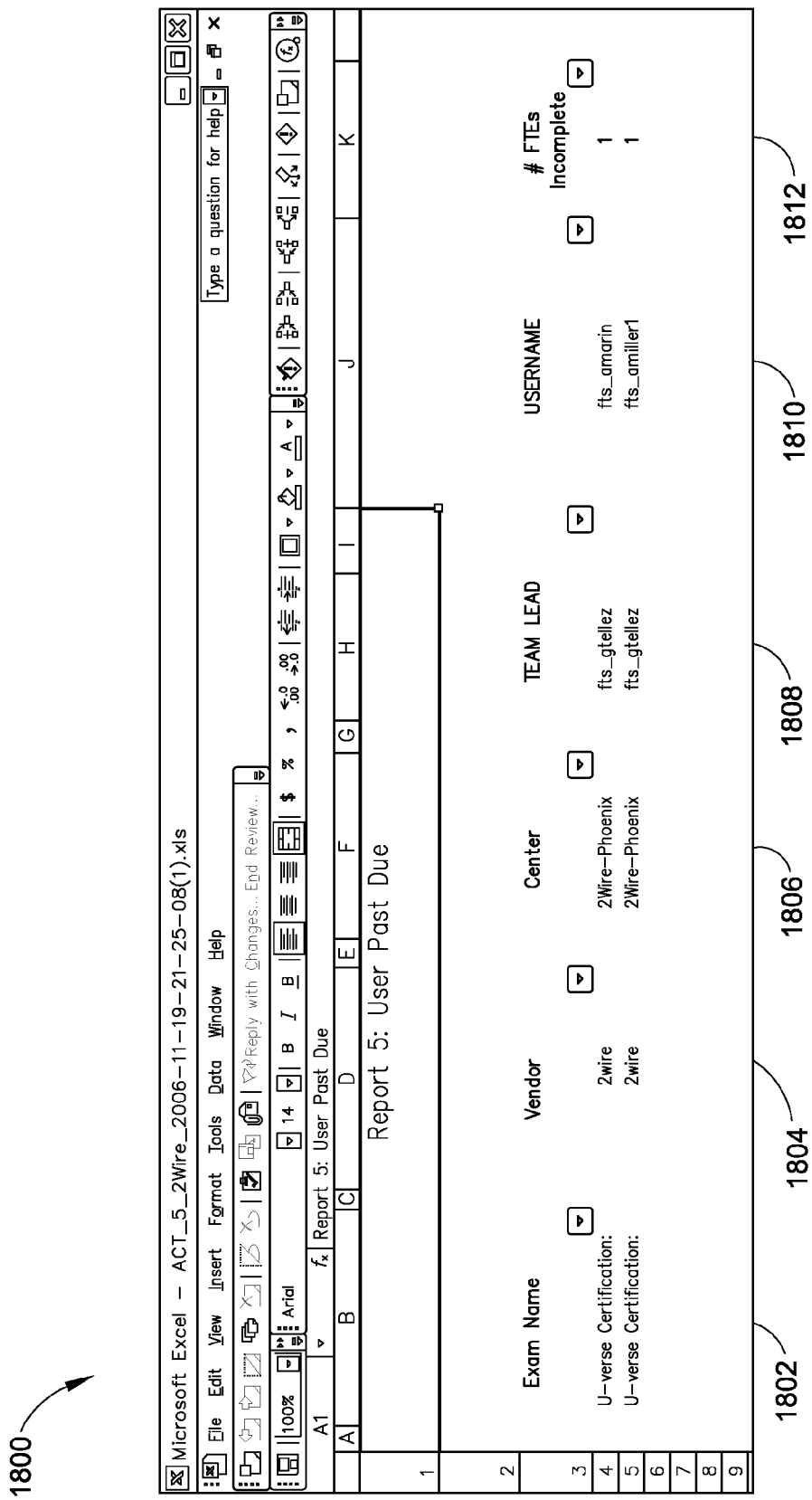
FIG. 18 shows Report 5—Exam agent Past Due.

FIG. 18 shows Report 5: Exam agent Past Due 1800 including the columns shown in FIG. 18. Report 5: Exam agent Past Due 1800 may comprise filterable columns including: exam name 1802; vendor name 1804; call center 1806 where the agent is assigned; team lead 1808 of the agent; username (agent name) 1810; and number of FTEs that have not completed the exam 1812.

Purpose: List agents past due for completion of an examination.

Primary Audience: Training Manager

An Example of Use: The Training Manager uses this report to identify the Agents that have not completed the exam and allows Training Managers to drive compliance. For those without access to the MRT, this report may be distributed by a POC at the agent center.

Frequency of Posting: Weekly

Report 6: Score and Performance Correlation. Purpose: To understand areas of low comprehension for Agents who have low performance scores and use this knowledge to improve Agent performance. The Report 6: Score and Performance Correlation may comprise filterable columns including: the exam name; the vendor name; the call center where the agent is assigned; team lead of the agent; the username (agent name); the average score of the completed exams; and the score of the agent. The Report 6: Score and Performance Correlation may filter the list of exams based on the exam scores of the agent that are below the average score for the respective exams.

Primary Audience: Training Manager

An Example of Use: Used by a Training Manager to flag topics to coach low performers on to improve their metrics.

Frequency of Posting: Adhoc

Figure 19:
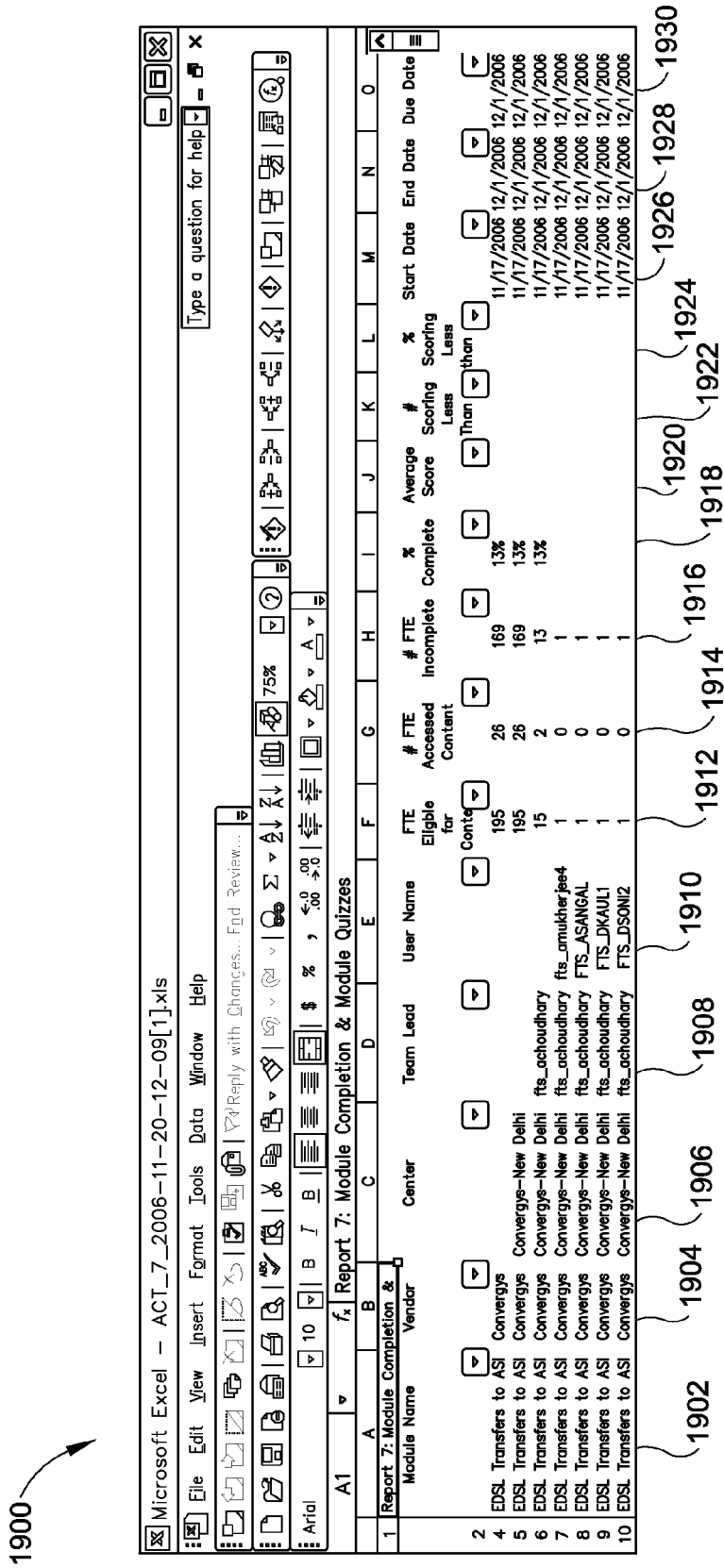
FIG. 19 shows Report 7—Module by agent.

FIG. 19 shows Report 7: Module by agent 1900 including the columns shown in FIG. 19. The Report 1: Module by agent 1900 may comprise filterable columns including: module name 1902; vendor 1904 to which the module is directed; call center 1906 where the agent is assigned; team lead 1908 of the agent; user name (agent name) 1910; number of full-time equivalents (FTEs) eligible to take the exam 1912; number of FTEs that completed the module 1914; number of FTEs that have not completed the module 1916; % of FTEs that completed the module 1918; average score 1920 of the modules completed; number of module scores less than 80%

1922; % of module scores less than 80% 1924; start date 1926; end date 1928; and due date 1930. The start date 1926 identifies the date the module was first accessed by the agent identified by the user name (agent name) 1910, the end date 1928 identifies the date the module was completed by the agent, and the due date 1930 identifies targeted date for the agent to complete the module.

Figure 20:
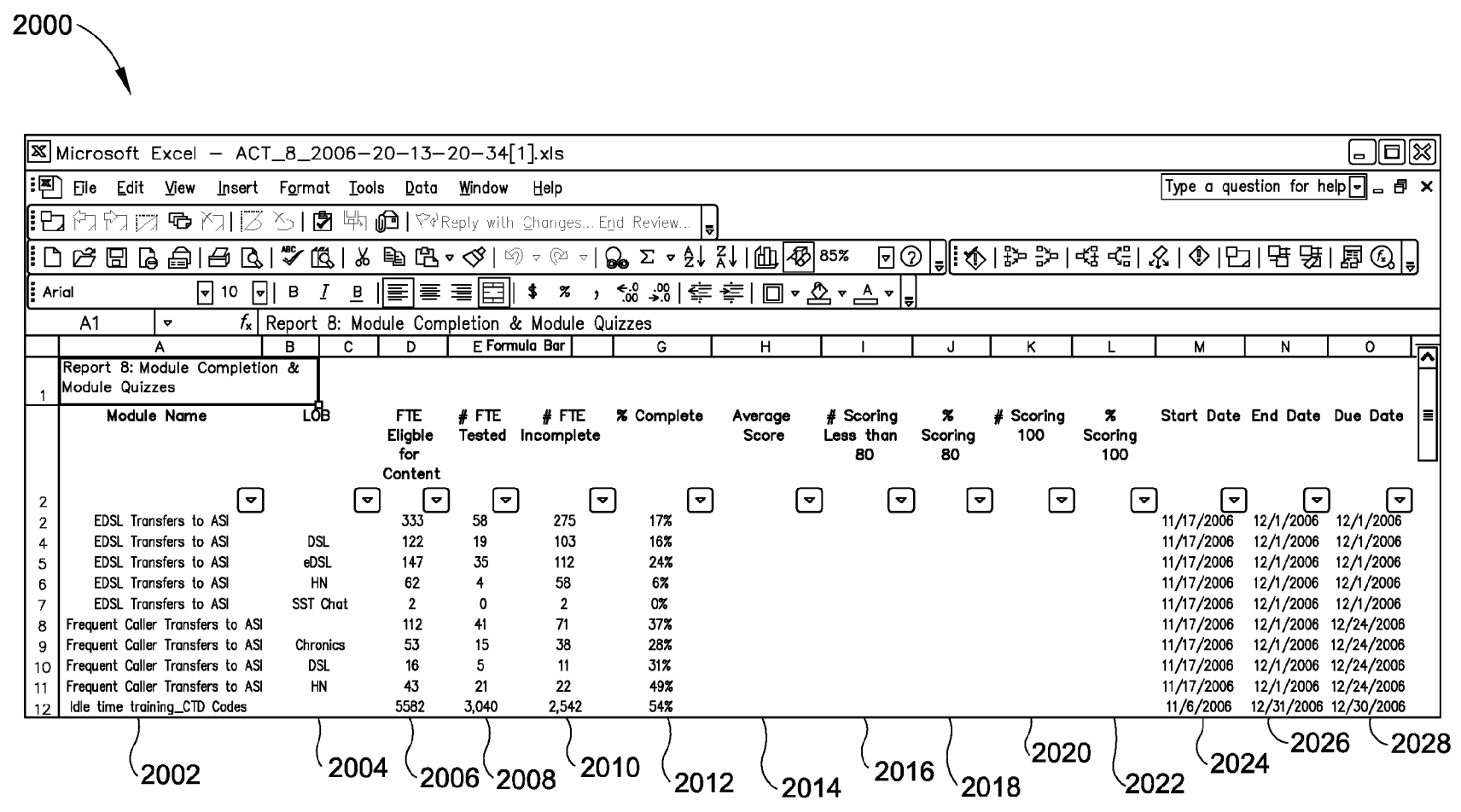

Purpose: Show module completion status and score results by Vendor, Center, and agent. As a reminder, Modules include WPAs, Deskdrops, Job Aids, and Quality Flashes.
 Primary Audience: Training Managers, Project Managers, and Team Leads
 An Example of Use: Used by a Training Manager to confirm the completion of the CTI Lite Deskdrop.
 Frequency of Posting: Daily FIG. 20 shows Report 8: Module by LOB 2000 including the columns shown in FIG. 20. The Report 8: Module by LOB 2000 may comprise filterable columns including: module name 2002; LOB 2004; number of full-time equivalents (FTEs) eligible for the content 2006 identified by the module name 2002; number of FTEs that completed the exam 2008; number of FTEs that have not completed the exam 2010; % of FTEs that completed exam 2012; average score 2014 of the completed exams; number of exam scores less than 80% 2016; % of exam scores less than 80% 2018; number of exam scores with 100% correct answers 2020; % of exam scores with 100% correct answers 2022; start date 2024; end date 2026; and due date 2028. The start date 2024 identifies the earliest date the exam was first accessed by an agent, the end date 2026 identifies the latest date the exam was completed by an agent, and the due date 2028 identifies the targeted date for the agent to complete the exam. Report 8: Module by LOB 2000, illustrated in FIG. 20, reflects filterable column values equal to "Blank" for the average score 2014 of the completed exams, number of exam scores less than 80% 2016, % of exam scores less than 80% 2018, number of exam scores with 100% correct answers 2020 and % of exam scores with 100% correct answers 2022.

Figure 21:
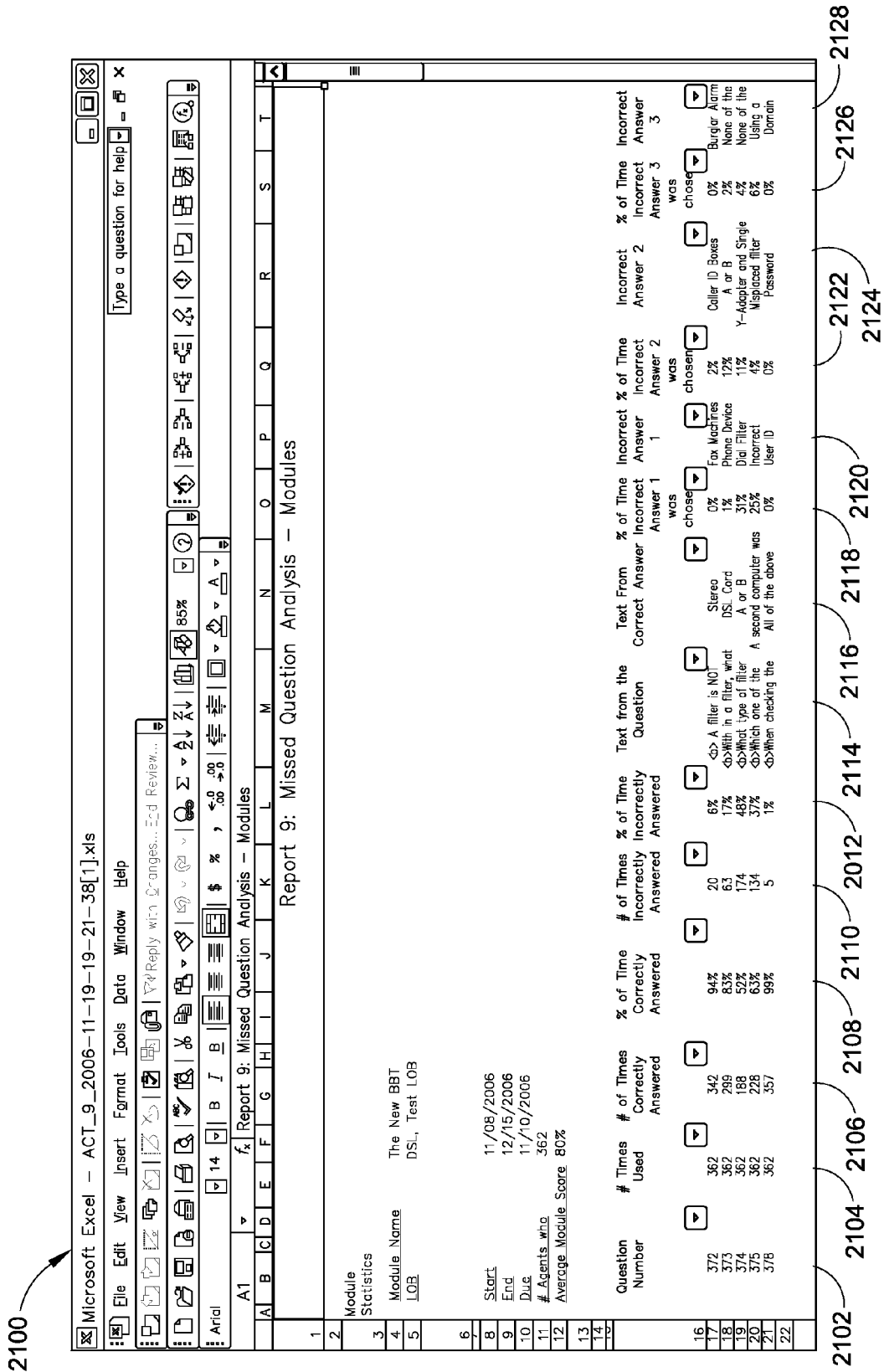
FIG. 21 shows Report 9—Missed Module Questions.

Purpose: Show module completion status and scores by LoB.
 Primary Audience: Training Managers and Team Leads
 An Example of Use: Used by a Training Manager to identify trends in module quiz scores across an LOB.
 Frequency of Posting: Daily FIG. 21 shows Report 9: Missed Module Questions 2100 including the columns shown in FIG. 21. The Report 9: Missed Module Questions 2100 may comprise filterable columns including: module question identifier 2102; number of time the module question was used 2104 in a module; number of times the question was answered correctly 2106; % of times the question was answered correctly 2108; number of times the module question was answered incorrectly 2110; % of times the question was answered incorrectly 2112; the text from the question 2114; the text from the correct answer 2116; % of times incorrect answer 1 was chosen as the correct answer 2118; the text from incorrect answer 1 2120; % of times incorrect answer 2 was chosen as the correct answer 2122; the text from incorrect answer 2 2124; % of times incorrect answer 3 was chosen as the correct answer 2126; and the text from incorrect answer 3 2128.

Figure 22:
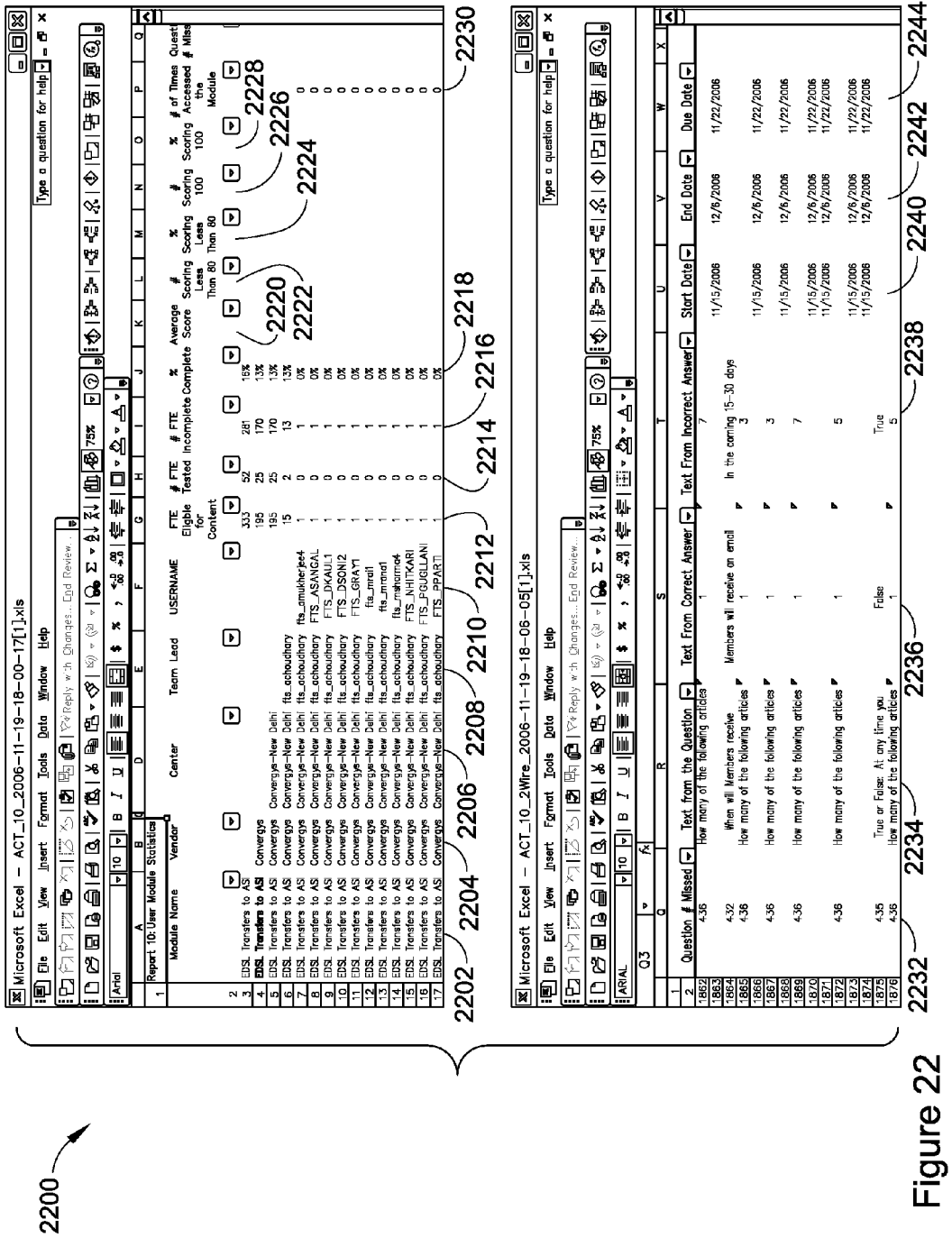
FIG. 22 shows Report 10—Missed Module Questions by agent.

Purpose: To view most frequently missed module quiz questions and identify areas of low comprehension among the Agents.
 Primary Audience: Training Manager
 An Example of Use: To understand topics of low comprehension across an LOB and bridge the knowledge gap.
 Frequency of Posting: Weekly FIG. 22 shows Report 10: Missed Module Questions by agent 2200 including the columns shown in FIG. 22. The Report 10: Missed Module Questions by agent 2200 may comprise filterable columns including: module name 2202; vendor 2204; call center 2206; team lead 2208; username (agent name) 2210; number of full-time equivalents (FTEs) eligible for the content 2212; number of FTEs that completed the module 2214; number of FTEs that have not completed the module 2216; % of FTEs that completed module 2218; average score 2220 of the completed module; number of scores less than 80% 2222; % of scores less than 80% 2224; number of scores with 100% correct answers 2226; % of scores with 100% correct answers 2228; number of time the agent accessed the module 2230; the question identifier 2232 of an incorrectly answered question; the text from the question 2234; the text from the correct answer to the question 2236; the text from the incorrect answer to the question 2238; start date 2240; end date 2242; and due date 2244. The start date 2240 identifies the earliest date the module was first accessed by the agent, the end date 2242 identifies the date the module was completed by the agent, and the due date 2244 identifies the targeted date for the agent to complete the module. Report 10: Missed Module Questions by agent 2200, illustrated in FIG. 22, reflects filterable column values equal to "Blank" for the average score 2220 of the completed module, number of scores less than 80% 2222, % of scores less than 80% 2224, number of scores with 100% correct answers 2226 and % of scores with 100% correct answers 2228.

Figure 23:
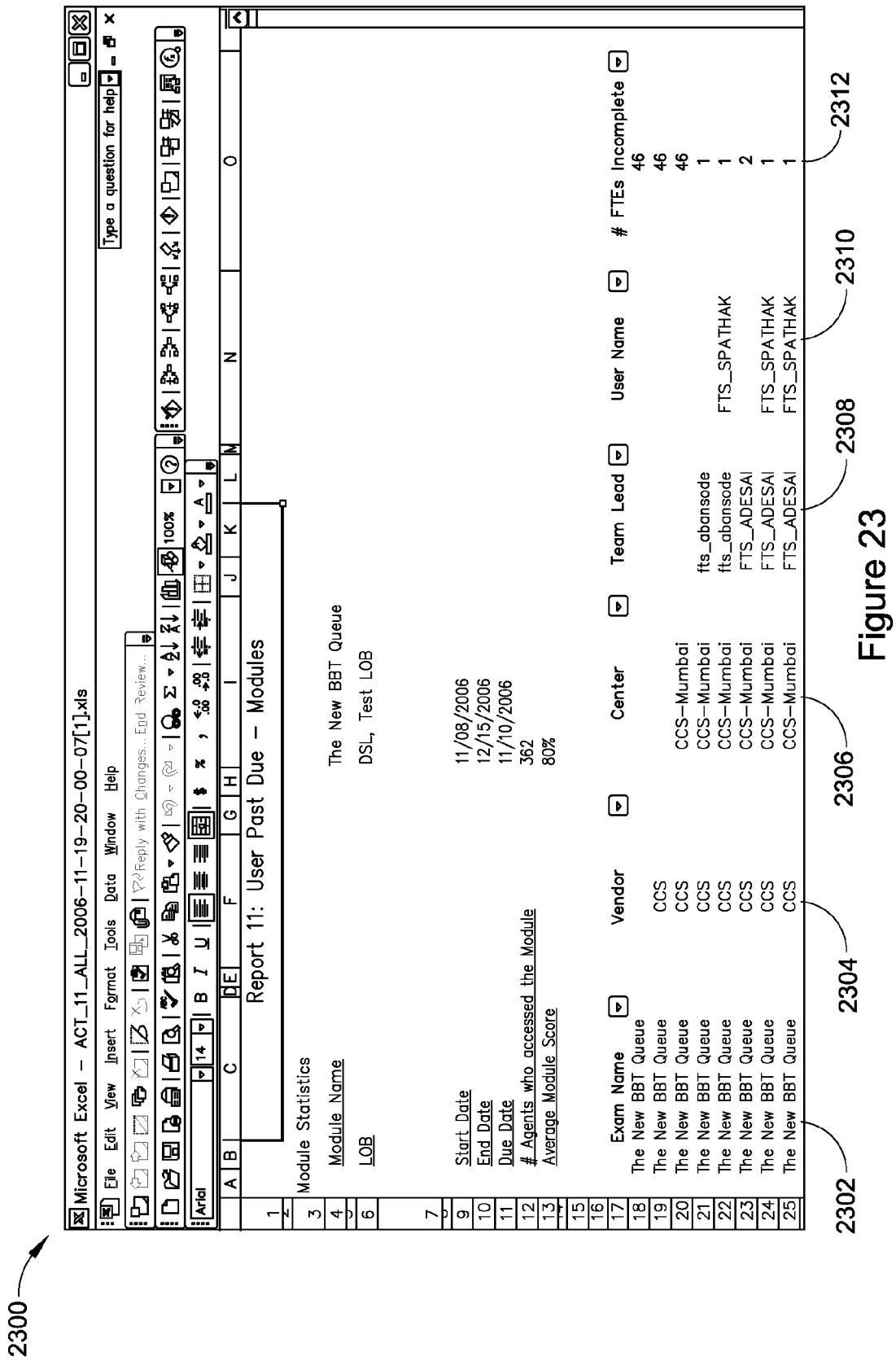
FIG. 23 shows Report 11—Module agent Past Due.

Purpose: Show areas of low proficiency by the agent by showing which questions an agent missed.
 Primary Audience: Team Lead and Training Manager
 An Example of Use: Team Leads may use this report to coach Agents on areas of low proficiency and performance. For those without access to the MRT, this report may be distributed by a POC at the agent center.
 Frequency of Posting: Weekly FIG. 23 shows Report 11: Module agent Past Due 2300 including the columns shown in FIG. 23. Report 11: Module agent Past Due 2300 may comprise filterable columns including: exam name 2302; vendor name 2304; call center 2306 where the agent is assigned; team lead 2308 of the agent; username (agent name) 2310; and number of FTEs that have not completed the exam 2312.

Figure 24:
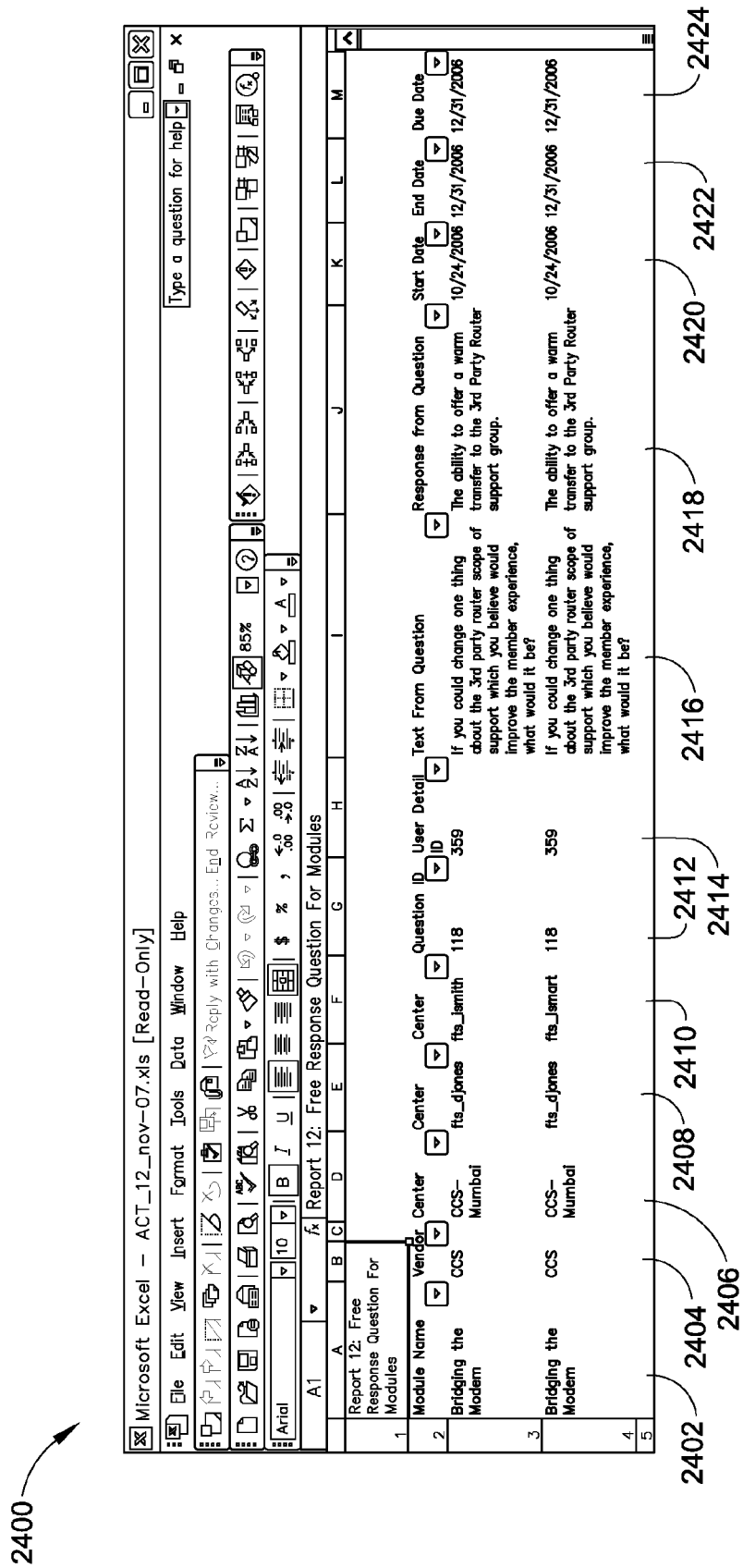
FIG. 24 shows Report 12—Free Response Questions for Modules.

Purpose: List agents past due for completion of a module.
 Primary Audience: Training Manager and Team Leads
 An Example of Use: The Training Manager uses this report to identify the Agents that have not completed the CTI Lite Deskdrop and allows training managers to drive compliance. For those without access to the MRT, this report may be distributed by a POC at the agent center.
 Frequency of Posting: Weekly FIG. 24 shows Report 12: Free Response Questions for Modules 2400 including the columns shown in FIG. 24. Report 12: Free Response Questions for Modules 2400 may comprise filterable columns including: module name 2402; vendor name 2404; call center 2406 where the agent is assigned; team lead 2408 of the agent; username (agent name) 2410; question identifier 2412; user detail identifier 2414 to uniquely identify the agent; the text from the question 2416; the free text response to the question 2418; start date 2420; end date 2422; and due date 2424. The start date 2420 identifies the date the module was first accessed by the agent identified by the user name (agent name) 2410, the end date 2422 identifies the date the module was completed by the agent, and the due date 2424 identifies the targeted date for the agent to complete the module.

Purpose: To provide all text entered for Free Response Questions within a module.

Primary Audience: Training Manager and Team Leads

An Example of Use: A Team Lead would use Report 12 to evaluate the responses provided on Module Free Response questions.

Frequency of Posting: Weekly

Figure 25:
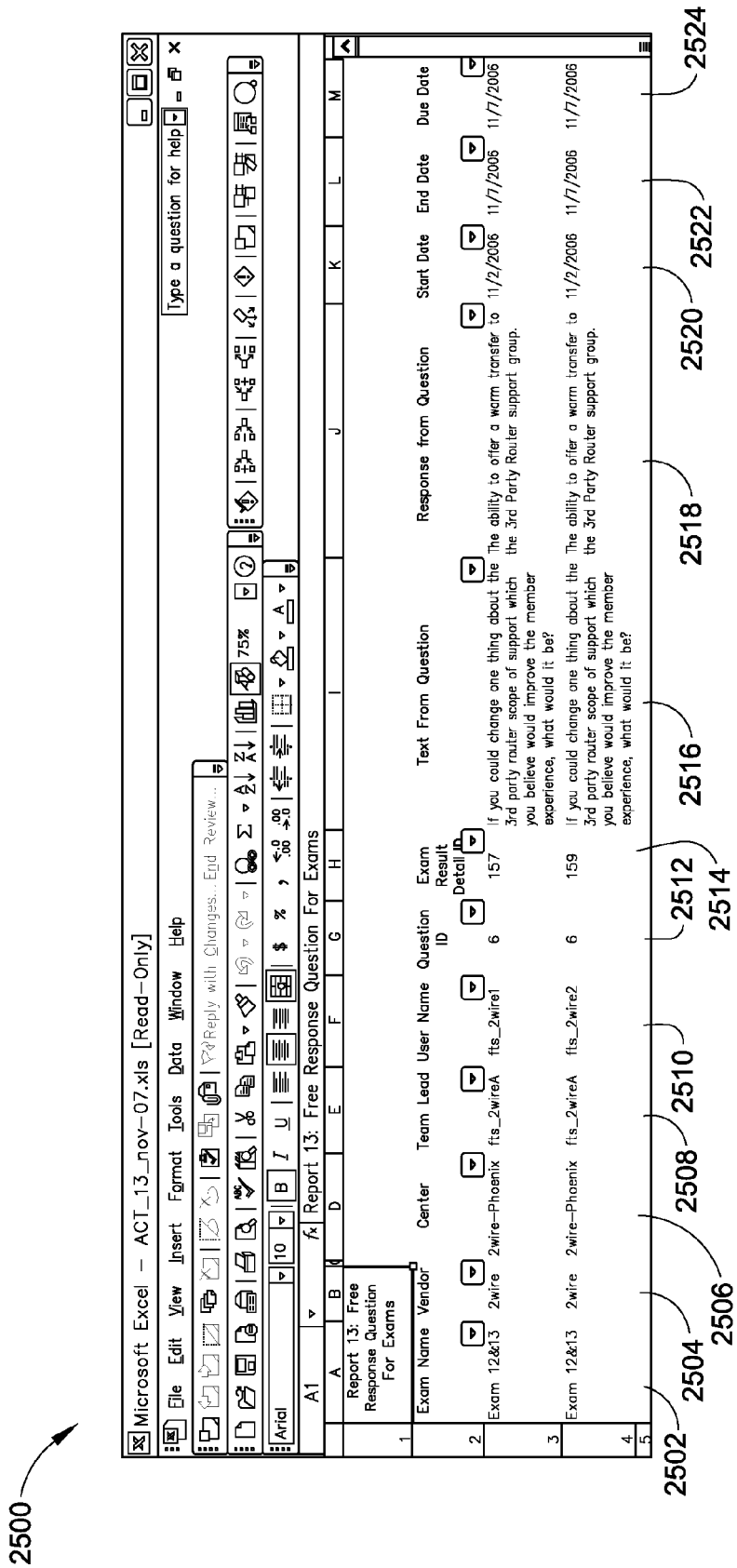
FIG. 25 shows Report 13—Free Response Questions for Exams.

FIG. 25 shows Report 13: Free Response Questions for Exams 2500 including the columns shown in FIG. 25. Report 13: Free Response Questions for Exams 2500 may comprise filterable columns including: module name 2502; vendor name 2504; call center 2506 where the agent is assigned; team lead 2508 of the agent; username (agent name) 2510; question identifier 2512; exam result detail identifier 2514 to uniquely identify the exam results of the agent; the text from the question 2516; the free text response to the question 2518; start date 2520; end date 2522; and due date 2524. The start date 2520 identifies the date the module was first accessed by the agent identified by the user name (agent name) 2510, the end date 2522 identifies the date the module was completed by the agent, and the due date 2524 identifies the targeted date for the agent to complete the module.

Purpose: To provide all text entered for Free Response Questions within an exam.

Primary Audience: Training Manager and Team Leads

An Example of Use: A Team Lead would use Report 13 to evaluate the responses provided on Exam Free Response questions.

Frequency of Posting: Weekly

FIG. 26 shows Report 14: Escalation Report 2600 including the columns shown in FIG. 26. Report 14: Escalation Report 2600 may comprise filterable columns including: module name 2602; vendor name 2604; call center 2606 where the agent is assigned; team lead 2608 of the agent; username (agent name) 2610; average score 2612 for modules completed by the agent; the date the scores for the agent were retrieved 2614.

Purpose: To provide an agent's score on the three most recently distributed WPAs.

Primary Audience: Training Manager and Team Leads

An Example of Use: To be used as a feeder document by which Agents are certified via the Escalation Certification Program Frequency of Posting: Daily FIG. 27 shows Online Team Lead Reports 2700 including the columns shown in FIG. 27. Online Team Lead Reports 2700 may include: the last name of the agent 2702; first name of the agent 2704; the score of the agent 2706; a completion indicator 2708; the content name 2710 to which the report corresponds; the type of content 2712; the start date 2714 identifies a date range begin date for the team report; the end date 2716 identifies a date range end date for the team report; the team lead last name 2718; the team lead first name 2720; and the team lead username 2722.

Purpose: Show module/exam completion status and score results by Team Lead and agent.

Primary Audience: Team Leads and Training Managers

An Example of Use: Team Leads would access this report daily to ensure their Agents have completed all applicable content. Based on the Agent scores the Team Lead would then coach Agents with low scores.

Frequency of Posting: Daily

Figure 28:
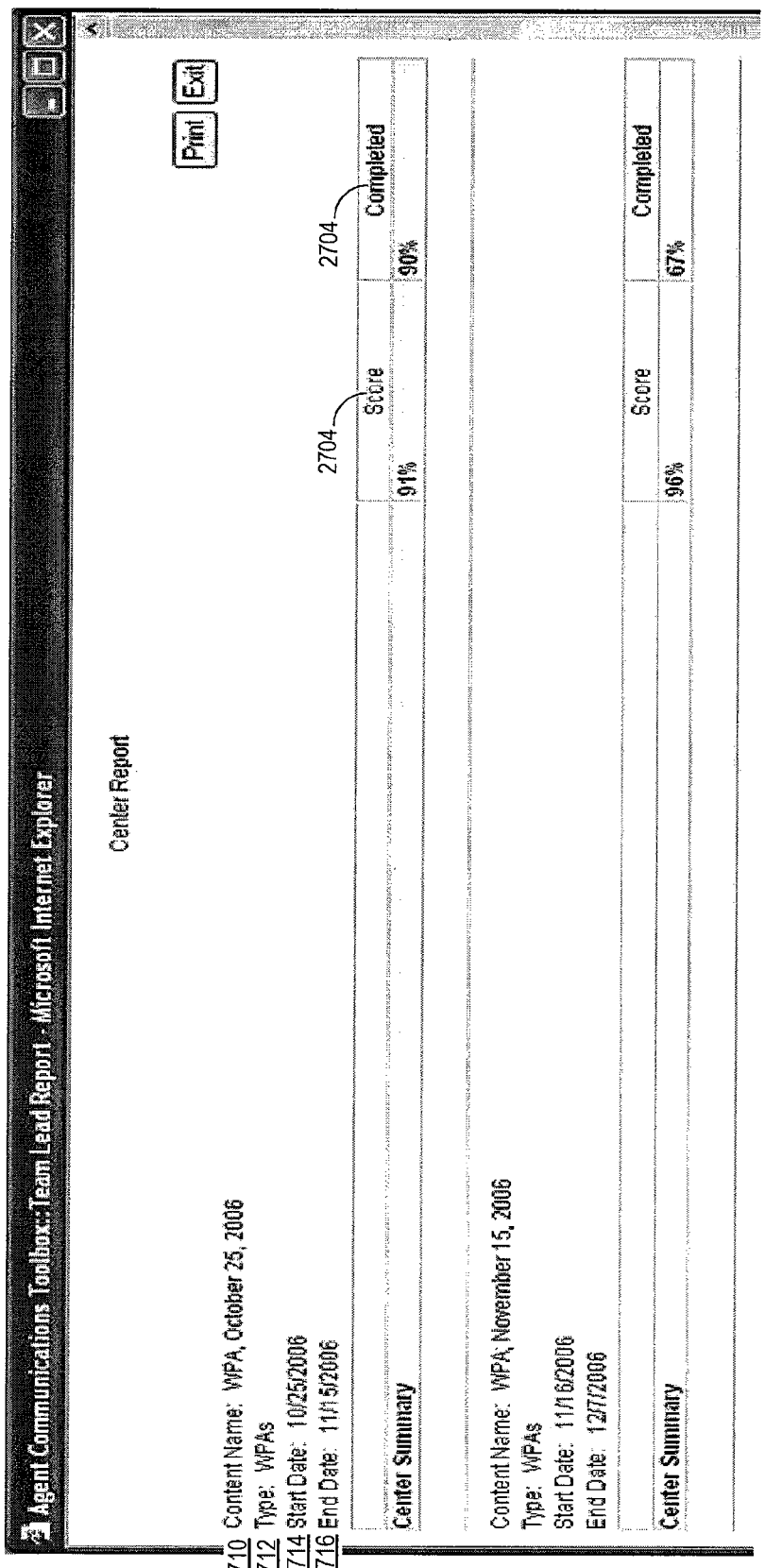
FIG. 28 shows Online Center Level Reports.

FIG. 28 shows Online Center Level Reports 2800 including the columns shown in FIG. 28. Online Center Level Reports 2800 may include: the content name 2802 of content made available to agents of a call center corresponding to the report; the type of content 2804; the start date 2806 identifies a date range begin date for the center report; the end date 2808 identifies a date range end date for the center report; the score 2810 indicates the average score 2812 for the agents of the call center for the content identified by the content name 2802; and the % of agents that have completed 2814 the content identified by the content name 2802.

Purpose: Show module/exam completion status and score results at the Center Level.

Primary Audience: Center Admins

An Example of Use: Center Admins would access this report daily to check the completion of the WPA.

Frequency of Posting: Daily

TABLE

ACT Reports Management
MRT Reports Key Fields Index

Overview: The following list defines the key fields present throughout the eleven MRT Reports.
Full-time equivalent (FTE) Eligible for Content: Count of agentnames who received the exam, from the ACT Inbox Table
FTE Tested: Count of agentnames with a value in the exam score field based on the ACT Exam Results Table
FTE Incomplete: Difference between FTE Eligible and FTE Tested
% Complete: #FTE Tested/FTE Eligible
Average Score: Average of the scores across all agentnames who took the exam
Scoring Less Than 80: Count of agentnames whose score was <80%
% Scoring Less Than 80: # Scoring Less than 80/# FTE Tested
Scoring 100: Count of agentnames whose score was equal 100%
% Scoring 100: # Scoring Less than 100/# FTE Tested
Question Number: All question numbers in the exam bank
Times Accessed: Number of times an exam or module is opened regardless of completion.
Times Used: Number of times a completed exam used that question *To account for the randomization of the question
# of Times Correctly Answered: Number of times the question was counted as correct
Question # Missed: The question number of those questions answered incorrectly
% of Times Correctly Answered: # of Times Answered Correctly/# of Times Used
# of Times Incorrectly Answered: Difference between # of Times Used less and # Times Correctly Answered
% of Times Incorrectly Answered: # of Times Answered Incorrectly/# of Times Used
Topic Associated with the Question: Topic tagged with the question
Text From the Question: The question text
Text From the Correct Answer: The correct answer text
Text From the Inaccurate Answer: The incorrect answer text
% of Time "Text from Incorrect Answer 1" was chosen: The first incorrect answer choice is populated into the header. The cell is a calculation of the amount of times the answer was chosen divided by the # of Times the answer was Used
% of Time "Text from Incorrect Answer 2" was chosen: The second incorrect answer choice is populated into the header. The cell is a calculation of the amount of times the answer was chosen divided by the # of Times the answer was Used
% of Time "Text from Incorrect Answer 3" was chosen: The third incorrect answer choice is populated into the header. The cell is a calculation of the amount of times the answer was chosen divided by the # of Times answer was Used

TABLE

ACT Reports Management - Reporting Points of Contact by Site

| Vendor | Center | File Status Reports POC | File Status E-mail |
|---|---|---|---|
| Vendor 1 | Center 1 | | |
| Vendor 2 | Center 2 | | |

ACT Reports Management—Reporting Points of Contact by Site—Overview—Reporting POCs are responsible for the weekly distribution of Reports 4, 5, 10, & 11 to a list of Team Leads. This combined with the Online Report enables those without access to the MRT to view all reports. Reach out to the Reporting POCs to find out more about the distribution method as well as how to add someone to the distribution list.

Figure 29:
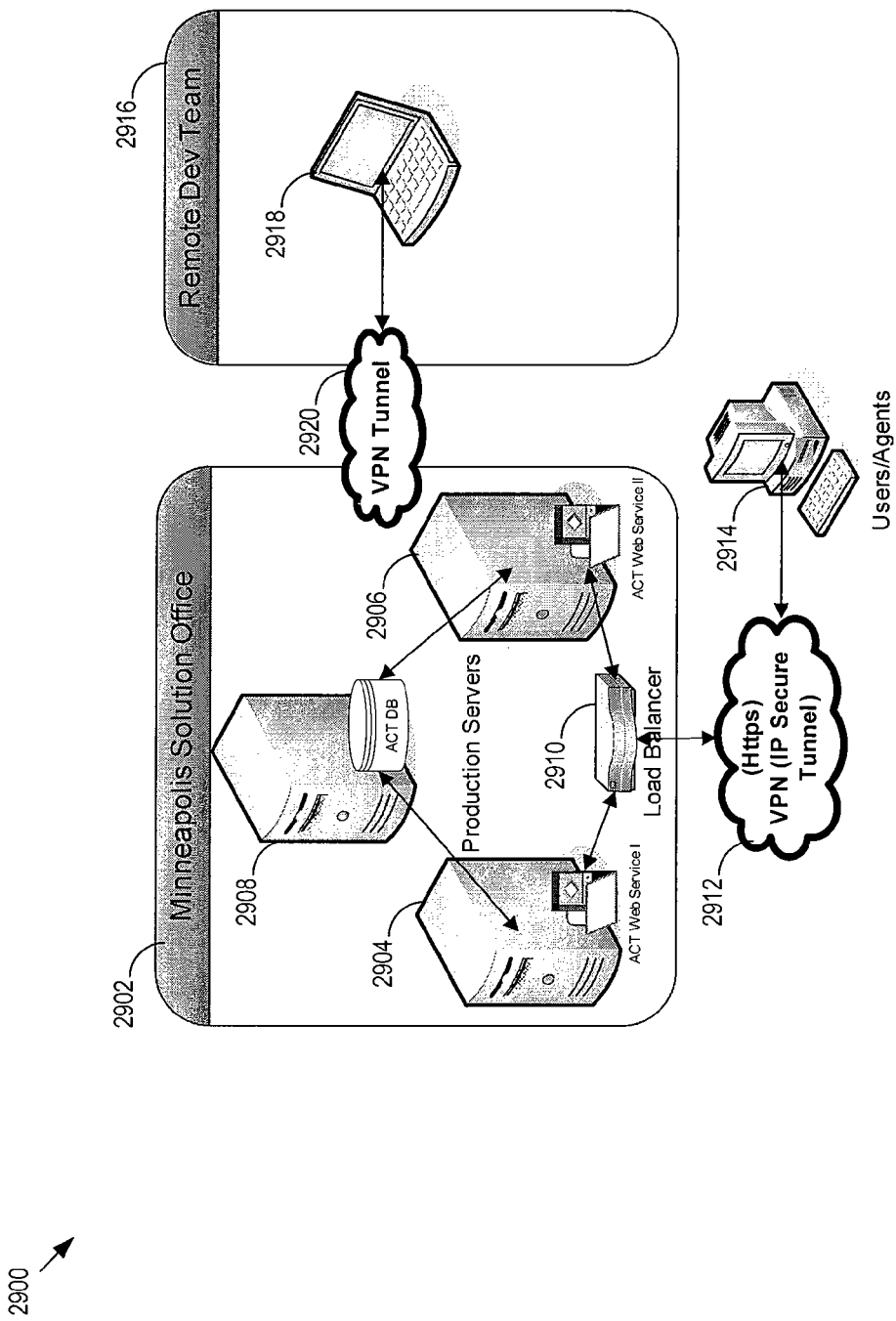
FIG. 29 shows an example of the ACT production environment.

FIG. 29 shows an example of the ACT production environment 2900. The ACT system implementation site 2902 (e.g., production environment) may be hosted on two distinct application servers (e.g, ACT application server 2904 and 2906, CRMMNT72 and CRMMNT73, respectively). The ACT system implementation site 2902 may include a database server 2908 (CRMMNT74) (e.g., located in Minneapolis, U.S). The ACT system implementation site 2902 may route communication through a load balancer 1910 in communication with other systems and devices through a network VPN 2912 connection (e.g., the internet). agent (e.g., agents) devices 2914 may communicate with ACT through the VPN 2912 in communication with the load balancer 1910. The ACT system implementation site 2902 may also be in communication with a remote development site 2916 where develop systems communicate with the ACT system implementation site 2902 through VPN 2920.

TABLE

| Server-I | |
| --- | --- |
| Location | The Control Center |
| Name | CRMMNT72 |
| IP Address | 149.122.52.14 |
| System | HP DL360 |
| Processor | Dual Processor - Intel Xeon 3.4 Ghz |
| Operating System | Windows Server 2003 Enterprise Edition Service Pack 1 |
| Memory | 4 GB |
| Network | |
| Hard Disk | 72 GB |
| Software Components | Internet Information Server (IIS 6.0) .NET 2.0 Framework Acrobat Reader Norton Antivirus 2006 |
| Base Directory (Application Source Code) | C:\Inetpub\wwwroot\ACT |

TABLE-continued

| Server-I |
| --- |

TABLE

| SERVER-II | |
| --- | --- |
| Location | The Control Center |
| Name | CRMMNT73 |
| IP Address | 149.122.52.16 |
| System | HP DL360 |
| Processor | Dual Processor - Intel Xeon 3.4 Ghz |
| Operating System | Windows Server 2003 Enterprise Edition Service Pack 1 |

TABLE-continued

| SERVER-II | |
| --- | --- |
| Memory | 4 GB |
| Network | |
| Hard Disk | 72 GB |
| Software Components | Internet Information Server (IIS 6.0) .NET 2.0 Framework Acrobat Reader Norton Antivirus 2006 |

TABLE

| DATABASE SERVER | |
| --- | --- |
| Location | The Control Center |
| Name | CRMMNT74 |
| IP Address | 149.122.52.77 |
| System | HP PROLIANT DL380R04 |
| Processor | Dual Processor - Intel Xeon 3.8 Ghz |
| Operating System | MS Windows Server 2003 Enterprise Edition |
| Memory | 6 GB |
| Network | 8 GB |
| Hard Disk | 584 GB (mirrored so only 384 GB available) |
| Software Components | MS SQL Server 2000 Norton Antivirus 2006 |

Figure 30:
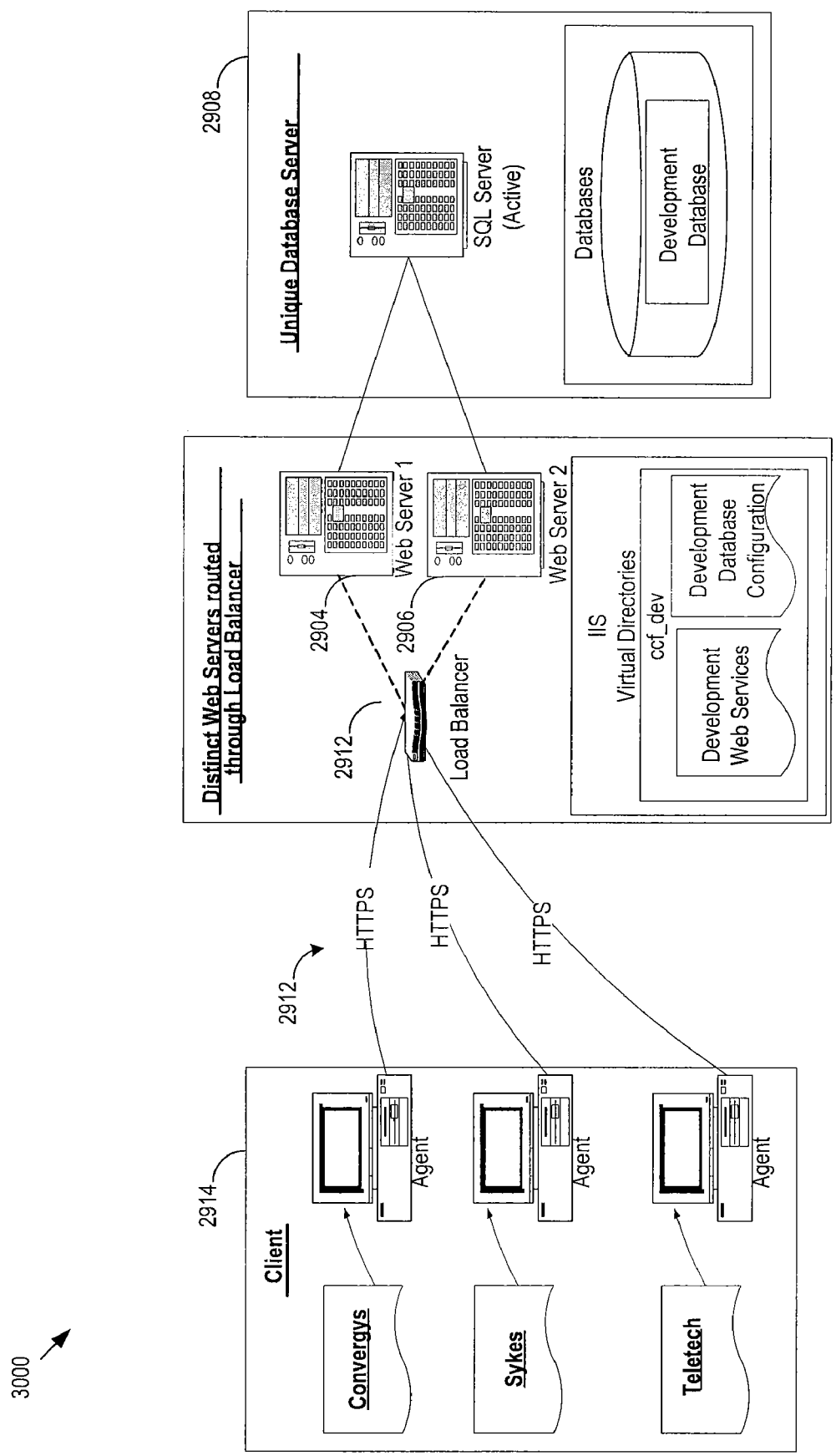
FIG. 30 shows a system logical overview of ACT.

FIG. 30 shows a system logical overview of ACT 3000. The system logical overview shows the ACT application servers 2904 and 2906 communicating through a load balancer 1910 to agent (e.g., agents) devices 2914. The system logical overview also shows the ACT application servers 2904 and 2906.

| Environment | Type | Virtual Name | Virtual Path | Physical Path | Database |
| --- | --- | --- | --- | --- | --- |
| Production | Web Service | ACT | https://xxx.xxx.xxx.xxx | C:\Inetpub\wwwroot\ACT | CCTDB002 |

Figure 31:
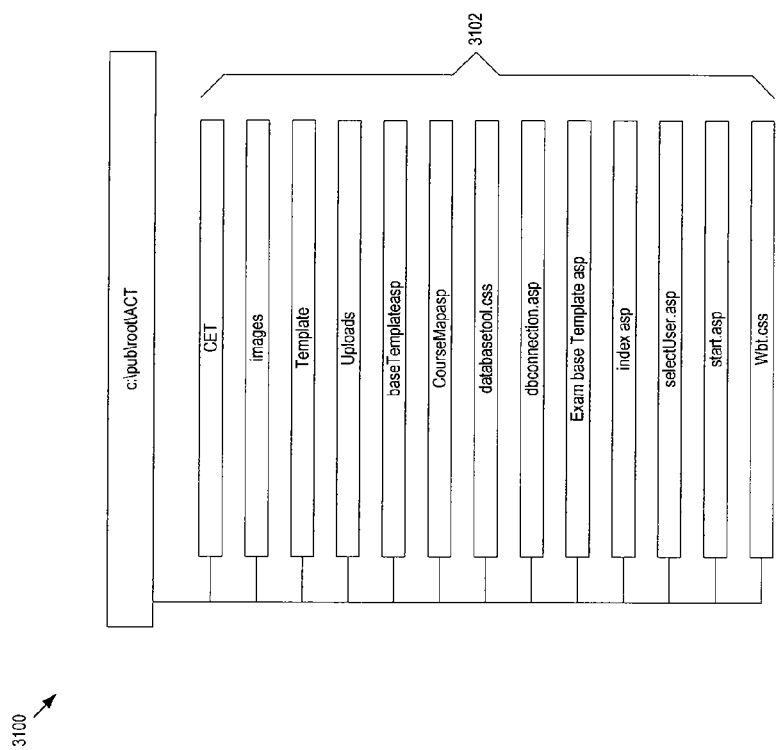
FIG. 31 shows an example of the ACT application directory structure categorized by various modules and supporting resources.

FIG. 31 shows an example of the ACT application directory structure 3100 categorized by various modules and supporting resources 3102.

TABLE

| Desktop Requirements | |
| --- | --- |
| Processor Speed | Intel Pentium 1.6 Ghz |
| Operating System | Microsoft Windows XP |
| Memory | 512 MB |
| Hard Disk | 10 GB |
| Network | Ethernet 10 Mb |
| Software | Microsoft Windows Internet Explorer 6.0 Acrobat Reader |

Figure 32:
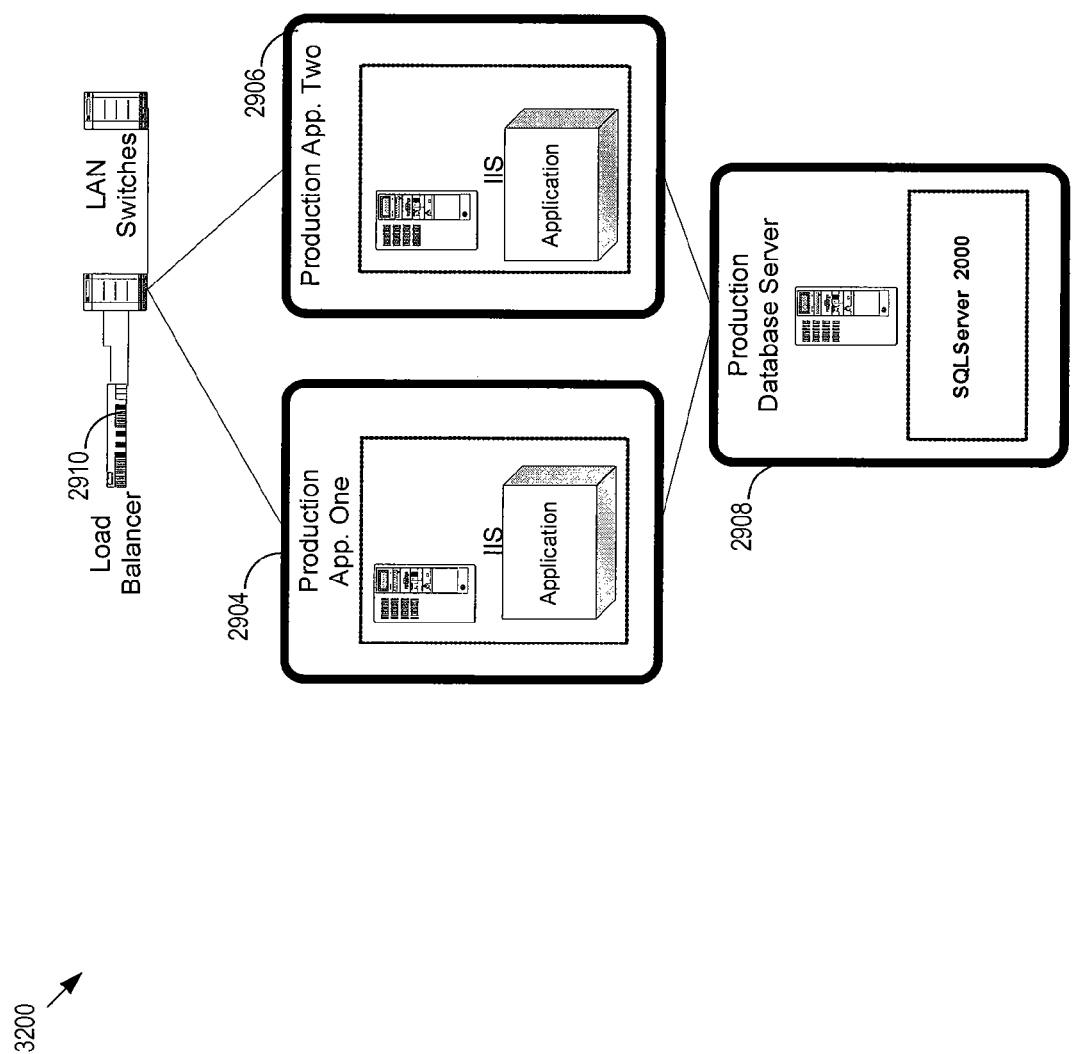
FIG. 32 shows an example of a network implementation design of the ACT.

FIG. 32 shows an example of a network implementation design of the ACT. In one implementation, ACT system implementation site 2902 (e.g., production environment) includes a server group with two load balanced using load balancer 2910 IIS web servers (e.g, ACT application server 2904 and 2906) and a SQL Database Server (e.g., database server 2908) clustered configuration. Both server may be utilized for production purposes as the application has the capability to route requests between two servers, thus no server is ever idle.

In one implementation, ACT may use a load balancer configuration described in the table below.

TABLE

| Load Balancer Configuration | |
|---|---|
| Device | Cisco 11501 Content Services Switch with Hard Disk SMARTNET 8X5XNBD Cisco 11501 Content |
| IP Address | 149.122.52.27 |
| Ports Balanced | Port 80 |
| Web Servers being balanced | CRMMNT72 (149.122.52.14) CRMMNT73 (149.122.52.16) |

In one implementation, the server specifications for an ACT configuration may use one of the three the sizing guidelines listed below.

TABLE

Server Specifications

| Component | 2,500 agent System | 5,000 agent System | 10,000 agent System |
|---|---|---|---|
| Content Switch | | | |
| Number of Switches | One | One | One |
| Switch | Cisco 11501[1] | Cisco 11501[1] | Cisco 11501[1] |
| Web Server | | | |
| Number of Servers | Two | Two | Four |
| Processor | Dual 3.4 GHz[3] | Dual 3.4 GHz[3] | Dual 3.4 GHz[3] |
| Memory | 4 GB RAM | 4 GB RAM | 4 GB RAM |
| Disk Space | 72 GB | 72 GB | 72 GB |
| Operating System | Windows Server 2003 | Windows Server 2003 | Windows Server 2003 |
| Software | Microsoft IIS Norton Antivirus | Microsoft IIS Norton Antivirus | Microsoft IIS Norton Antivirus |
| Database Server | | | |
| Number of Servers | One[2] | One[2] | One[2] |
| Processor | Dual 3.8 GHz | Dual 3.8 GHz | Quad 3.8 GHz |
| Memory | 6 GB RAM | 8 GB RAM | 16 GB RAM |
| Disk Space | 174 GB (Mirrored) | 384 GB (Mirrored) | 768 GB (Mirrored) |
| Operating System | Windows Server 2003 | Windows Server 2003 | Windows Server 2003 |
| Software | Microsoft SQL Server 2003 Enterprise Edition Norton Antivirus | Microsoft SQL Server 2003 Enterprise Edition Norton Antivirus | Microsoft SQL Server 2003 Enterprise Edition Norton Antivirus |

MRT DATA FEED may include steps where on a nightly basis the ACT Database back-up may be transferred over to the MRT Database for Production Reporting. In one implementation, for security reasons only a periodic push to the MRT database may be allowed, so replication or other database tools may not be allowed. ACT may provide an FTP process, using Serv-U software, in place that may push the ACT Production back-up into an ACT specific directory on the MRT server MPCWS 1101. From there an MRT process may load the data into the database for reporting. Outside of the Team Lead reports all of the ACT reporting may be done out of the MRT.

Database maintenance procedures and agent maintenance include the following sequence and process that an ACT administrator may use to delete agents from the ACT database when a delete file exists that has greater than 25 agents. If the file is less than or equal to 25 agents the ACT front-end delete function may be used to delete the agents.

TABLE agent Maintenance

| # | Process | Description | Automated/ Manual | Frequency |
|---|---|---|---|---|
| 1 | User Clean-up | Deletes the CCTT_USR_LOB records and sets agents to "Deleted" status | Manual | Varies |
| 2 | User Deletes | Deletes the CCTT_SCEN_USR, CCTT_SCEN_USR_DTL, CCTT_EXAM_RSLT_HDR, CCTT_EXAM_RSLT_DTL, CCTT_INBOX, and CCTT_USR records for those CCTT_USR records that are in "Deleted" status | Manual | Monthly |
| 5 | Batch Log Delete | Deletes Batch Log records that are older than 6 months | TBD | TBD |
| 6 | Error Log Delete | Deletes Error Log records that are older than 6 months | TBD | TBD |

The following is a sequence and a process to use for deleting contents from the ACT database. The content maintenance process may be automated with the use of stored procedures.

TABLE

Content Management

| # | Process | Description | Automated/ Manual | Frequency |
|---|---|---|---|---|
| 1 | Content Deactivation | DEACTIVATE SCEN: This stored procedure sets the CCTT_SCEN records to older by 30 days from today to "Deleted" status | Automated | Weekly |
| 2 | Content Delete | PURGE CONTENT and PURGE EXAM: These two stored procedures cascade deletes all of the related records from database for those CCTT_SCEN records that have a status of "Deleted" | Automated | Monthly |
| 3 | Batch Log Delete | Deletes Batch Log records that are older than 6 months | TBD | TBD |
| 4 | Error Log Delete | Deletes Error Log records that are older than 6 months | TBD | TBD |

User Clean-Up Process
1. Back-up the database before beginning any deletes.
2. Open the submission Excel file and selected the column containing all of the Active FTS ids to be deleted for a single center.
3. Copy all of the ID's
4. Open the "ACT Delete-string conversion.xls" spreadsheet
5. Paste the copied FTS ids into column A of the "Conversion" tab.

6. Make sure that the formula in column B is copied down so that each row in column A is converted.
7. Copy the values from column B.
8. Remote desktop to CRMMNT74.
9. Open SQL Query Analyzer to run SQL against the CCTDB002 database.
1. Determine the number of CCTT_USR_LOB records to be deleted. Enter the following SQL and paste in the FTS ids into the query:

```
SELECT      count(b.USR_LOB_ID)
FROM        CCTT_USR a,
            CCTT_USR_LOB b
WHERE       a.USR_ID = b.USR_ID AND
            a.CENTER_ID = [enter the center id for the agents being deleted] AND
            a.USER_NAME in (
            [paste agent names here]
            )
```

2. Determine the number of CCTT_USR records to be deleted. Enter the following SQL and paste in the FTS ids into the query:

```
SELECT      count(*)
FROM        CCTT_USR
WHERE       CENTER_ID = [enter the center id for the agents being deleted] AND
            USER_NAME in (
            [paste agent names here]
            )
```

Note: the number of CCTT_USR_LOB records should be greater than or equal to the number of CCTT_USR records 1. Make sure that deletes are done using transactions (BEGIN TRAN, COMMIT TRAN, ROLLBACK TRAN). That way if the agent needs to rollback a delete the agent can do that. After each delete is executed verify that the number of records impacted matches the query counts that were determined in the prior steps before committing the transaction.

Delete the CCTT_USR_LOB records. Use the following query:

```
DELETE   CCTT_USR_LOB
WHERE    USR_LOB_ID in (
         SELECT   b.USR_LOB_ID
         FROM     CCTT_USR a,
                  CCTT_USR_LOB b
         WHERE    a.USR_ID = b.USR_ID AND
                  a.CENTER_ID = [enter the center id for the agents being deleted] AND
                  a.USER_NAME in ([paste agent names here]
                  ))
```

2. Make sure that updates are done using transactions (BEGIN TRAN, COMMIT TRAN, ROLLBACK TRAN). That way if the agent needs to rollback a delete the agent can do that. After each delete is executed verify that the number of records impacted matches the query counts that were determined in the prior steps before committing the transaction.

Set the agents to Deleted Status. Use the following query:

```
UPDATE   CCTT_USR
SET      STATUS_CD = 'Deleted'
WHERE    CENTER_ID = [enter the center id for the agents being deleted] AND
         a.USER_NAME in ([paste agent names here]
         )
```

Once the CCTT_USR_LOB records have been deleted the agent may no longer receive any Content or Exams. At this point the ID is effectively deleted from use in the system. The remaining records may be cleaned up in the during the Periodic agent Clean-up process.

Periodic Agent Clean-Up

On a monthly/quarterly basis the agent records in the ACT should be deleted to ensure the application performance is not impacted by the volume of data that may be generated.

The cleanups should probably be done by Center to limit the size of the transaction.

1. Determine the number of CCTT_USR records to be deleted.

```
SELECT      count(*)
FROM        CCTT_USR
WHERE       CENTER_ID = [enter the center id for the agents being deleted] AND
            STATUS_CD = 'Deleted'
```

2. Determine the number of CCTT_INBOX records to be deleted.

```
SELECT      count(b.INBOX_ID)
FROM        CCTT_USR a,
            CCTT_INBOX b
WHERE       a.USR_ID = b.USR_ID AND
            a.CENTER_ID = [enter the center id for the agents being deleted] AND
            a.STATUS_CD = 'Deleted'
```

Note: the number of CCTT_INBOX records should be greater than or equal to the number of CCTT_USR records 3. Determine the number of CCTT_SCEN_USR_DTL records to be deleted. Enter the following SQL and paste in the FTS ids into the query:

```
SELECT      count(b.SCEN_USR_DTL_ID)
FROM        CCTT_USR a,
            CCTT_SCEN_USR b,
            CCTT_SCEN_USR_DTL c
WHERE       a.USR_ID = b.USR_ID AND
            b.SCEN_USR_ID = c.SCEN_USR_ID AND
            a.CENTER_ID = [enter the center id for the agents being deleted] AND
            a. STATUS_CD = 'Deleted'
```

4. Determine the number of CCTT_SCEN_USR records to be deleted. Enter the following SQL and paste in the FTS ids into the query:

```
SELECT      count(b.SCEN_USR_ ID)
FROM        CCTT_USR a,
            CCTT_SCEN_USR b
```

-continued

```
WHERE    a.USR_ID = b.USR_ID AND
         a.CENTER_ID = [enter the center id for the agents
being deleted] AND
         a. STATUS_CD = 'Deleted'
```

Note:
the number of CCTT_SCEN_USR_DTL records should be greater than or equal to the number of CCTT_SCEN_USR records 5. Determine the number of CCTT_EXAM_RSLT_DTL records to be deleted. Enter the following SQL and paste in the FTS ids into the query:

```
SELECT   count(b.EXAM_RSLT_DTL_ID)
FROM     CCTT_USR a,
         CCTT_EXAM_RSLT_HDR b,
         CCTT_EXAM_RSLT_DTL c
WHERE    a.USR_ID = b.USR_ID AND
         b.EXAM_RLST_HDR_ID = c.EXAM_RSLT_HDR_ID
         AND
         a.CENTER_ID = [enter the center id for the agents being
deleted] AND
         a. STATUS_CD = 'Deleted'
```

6. Determine the number of CCTT_EXAM_RSLT records to be deleted. Enter the following SQL and paste in the FTS ids into the query:

```
SELECT   count(b.EXAM_RSLT_HDR_ ID)
FROM     CCTT_USR a,
         CCTT_EXAM_RSLT_HDR b
WHERE    a.USR_ID = b.USR_ID AND
         a.CENTER_ID = [enter the center id for the agents
being deleted] AND
         a. STATUS_CD = 'Deleted'
```

Note:
the number of CCTT_EXAM_RSLT_DTL records should be greater than or equal to the number of CCTT_EXAM_RSLT_HDR records 7. Once the counts have been determined delete of the data can be started. The administrator should ensure that each of the following deletes are done using transactions (BEGIN TRAN, COMMIT TRAN, ROLLBACK TRAN) so that if the administrator needs to rollback a delete the administrator can do so. After each delete is executed verify that the number of records impacted matches the query counts that were determined in the prior steps before committing the transaction.
Note: The order that the deletes are done matter because of foreign key constraints.

8. Delete the CCTT_EXAM_RSLT_DTL records. Use the following query:

```
DELETE   CCTT_EXAM_RSLT_DTL
WHERE    EXAM_RSLT_DTL_ID in (
         SELECT   EXAM_RSLT_DTL_ID
         FROM     CCTT_USR a,
                  CCTT_EXAM_RSLT_HDR b,
                  CCTT_EXAM_RSLT_DTL c
         WHERE    a.USR_ID = b.USR_ID AND
                  b.EXAM_RLST_HDR_ID =
         c.EXAM_RSLT_HDR_ID AND
                  a.CENTER_ID = [enter the center id for the
                  agents being deleted] AND
                  a. STATUS_CD = 'Deleted'
                  )
```

9. Delete the CCTT_EXAM_RSLT_HDR records. Use the following query:

```
DELETE   CCTT_EXAM_RSLT_HDR
WHERE    EXAM_RSLT_HDR_ID in (
         SELECT   b.EXAM_RSLT_HDR_ ID
         FROM     CCTT_USR a,
                  CCTT_EXAM_RSLT_HDR b
         WHERE    a.USR_ID = b.USR_ID AND
                  a.CENTER_ID = [enter the center id for the
                  agents being deleted] AND
                  a. STATUS_CD = 'Deleted'
                  )
```

10. Delete the CCTT_SCEN_USR_DTL records. Use the following query:

```
DELETE   CCTT_SCEN_USR_DTL
WHERE    SCEN_USR_DTL_ID in (
         SELECT   b.SCEN_USR_DTL_ID
         FROM     CCTT_USR a,
                  CCTT_SCEN_USR b,
                  CCTT_SCEN_USR_DTL c
         WHERE    a.USR_ID = b.USR_ID AND
                  b.SCEN_USR_ID = c.SCEN_USR_ID AND
                  a.CENTER_ID = [enter the center id for the
                  agents being deleted] AND
                  a. STATUS_CD = 'Deleted'
                  )
```

11. Delete the CCTT_SCEN_USR records. Use the following query:

```
DELETE   CCTT_SCEN_USR
WHERE    SCEN_USR_ID in (
         SELECT   b.SCEN_USR_ ID
         FROM     CCTT_USR a,
                  CCTT_SCEN_USR b
         WHERE    a.USR_ID = b.USR_ID AND
                  a.CENTER_ID = [enter the center id for the
                  agents being deleted] AND
                  a. STATUS_CD = 'Deleted'
                  )
```

12. Delete the CCTT_INBOX records. Use the following query:

```
DELETE   CCTT_INBOX
WHERE    USR_ID in (
         SELECT   USR_ ID
         FROM     CCTT_USR a,
                  CCTT_INBOX b
         WHERE    a.USR_ID = b.USR_ID AND
                  a.CENTER_ID = [enter the center id for the
                  agents being deleted] AND
                  a. STATUS_CD = 'Deleted'
                  )
```

13. Delete the CCTT_USR records. Use the following query:

```
DELETE   CCTT_USR
WHERE    CENTER_ID = [enter the center id for the agents being
deleted] AND
```

-continued

STATUS_CD = 'Deleted'.

The system includes administrative capabilities, examples of which are described below.
Overview
Login Instructions
An agent may use a virtual private network (VPN) to connect to a specific site, such as "Mpls Solution Office" and/or a specific URL such as https://act.acc.com. The agent may then Login with an assigned agentname and Password.
ID Management:
Add an agent
Overview:
The system allows agents to be created, edited, or deleted based on, for example, the following four levels of access shown in the Table ACCESS below.

TABLE ACCESS

| User Type | User Type Description |
|---|---|
| Admin | May create, edit, and delete a User at any level and at any vendor or center. |
| VendorAdmin | May edit any User at or below the VendorAdmin level at any center within that vendor. |
| CenterAdmin | May edit any User at or below the CenterAdmin level at their own vendor and center. |
| User | May not create new users. |

In one implementation, the following apply:
All levels can be designated as a Team Leader.
All agents at all levels may be linked to a Vendor, Center, and Primary LOB.
The process is:
Fill out the agent details and assign permissions.
Assign the agent to a Primary LOB, any secondary LOBs, and enter in associated CRM IDs.
Step by Step Process for Adding an agent:
From the home page 102, Click on the "Admin" button 312.
Select "Add" from the dropdown.
Input the following attributes in the fields on the Add agent page:
User Type—At the Admin's discretion, select whether the new agent may be an Admin, VendorAdmin, CenterAdmin, or agent.
Username—Enter the agent's Active Login ID. Their ACT ID may be the same as their Active Login ID. Note, the ID is preferably less than or equal to 50 characters.
Password—Enter a password consistent with the following requirements:
Passwords are preferably between six and twenty (6-20) characters in length.
Passwords preferably contain at least one (1) number.
Special characters may be disallowed.
Passwords are preferably not blank.
First Name—Enter in the agent's first name.
Last Name—Enter in the agent's last name.
Vendor—Assign a Vendor.
Center—Assign a Center.
Team Lead—It is optional to make the new agent a Team Leader by clicking on the checkbox. This provides the ability to see reports and scores of assigned agents. This should only be given to management.
Team Leader—Assign the new agent to the appropriate team lead using the dropdown. This is necessary for reporting accuracy.
Click the "Insert agent" button.
Press the "OK" button on the "The agent Successfully Added" box.
In the "User LOB Assignment" window, select an LOB using the dropdown.
Select the "Primary" check box by clicking on it. A primary LOB is required. For cross-trained agents, choose the LOB the agents support most often, and/or the LOB the center supports most often. Make their other LOBs secondary (described below).
For reporting purposes, add the associated CRM IDs for each LOB. At a minimum, a CRM ID for the Primary LOB should be provided.
Press the "Add" button and in the table the agent may see the Primary LOB and a "Y" next to it in the table.
Add "Secondary" LOBs using the dropdown menu and the "Add" button. If an LOB is not listed, the agent may not have access to that LOB's Modules or Exams.
Press the "Done" button.
Import agent
Overview:
To import agent profile en masse.
The 9 Step Process for Importing agents is:
Review the upload requirements on the "Import agent" screen.
Launch each Excel Import File and populate it using the dropdowns.
Save each file as a comma separated values (CSV) file.
Upload the Team Lead file.
Check the Error Log Report for upload errors and resolve.
Upload the agent file.
Check the Error Log Report for upload errors and resolve.
Upload the LOB file.
Check the Error Log Report for upload errors based on the Time Stamp and validate the presence of new agents and LOBs.
Process 1: Set up a Team Lead file:
Open the "TeamLead.xls" template, which includes the example fields shown below in Table agentEXAMPLE.
Before proceeding to format the file, sort the file by agentname and check for the following:
Check that there is an agentname for each agent.
Check for duplicate agentnames.
Ensure each agent has a vendor and center.
Enter a new last name, first name, agentname, and password in columns A1, B1, C1, and D1.
Select the Status, agent Type, Vendor, and Center, using the excel dropdowns in cells E1, F1, G1, and H1. Example values are shown below in Table VALUES.

TABLE VALUES

| E1 Values | F1 Values | G1 Values | H1 Values |
|---|---|---|---|
| Active | Admin | Vendor 1 | Center 1 |
|  | VendorAdmin | Vendor 2 | Center 2 |
|  | CenterAdmin | Vendor 3 | Center 3 |
|  | User | Vendor 4 | Center 4 |
|  |  | Vendor 5 | Center 5 |
|  |  | Vendor 6 | Center 6 |
|  |  | Vendor 7 | Center 7 |
|  |  |  | Center 8 |
|  |  |  | Center 9 |
|  |  |  | Center 10 |
|  |  |  | Center 11 |
|  |  |  | Center 12 |
|  |  |  | Center 13 |
|  |  |  | Center 14 |
|  |  |  | Center 15 |

TABLE VALUES-continued

| E1 Values | F1 Values | G1 Values | H1 Values |
|---|---|---|---|
| | | | Center 16 |

The agent information includes in "Row 1":
Last Name
First Name
User ID
Password
Status
User Type
Vendor
Center The end result should look similar to the following agent information in Table agentEXAMPLE:

TABLE agentEXAMPLE

| User | Joe | JUser1 | Password1 | Active | User | "Vendor" | "Center" |
|---|---|---|---|---|---|---|---|

Save the file as file type "CSV" with a filename of "TeamLead.csv" and close it.

Process 2: Set up an agent file:

Open the "user.xls" file below, which includes the example fields shown below in Table agentINFO Before proceeding to format the file, sort the file by agentname and check for the following:
Check that there is an agentname for each agent
Check for duplicate agentnames
Ensure each agent has a vendor, center, and team lead
Sort the file by agentname Enter a new last name, first name, agentname, password, and team lead in columns A1, B1, C1, D1, and I1.

Select the Status, agent Type, Vendor, and Center, using the excel dropdowns in cells E1, F1, G1, and H1.

Enter the Team Lead ID in I1

The agent information should include the following in "Row 1":
Last Name
First Name
User ID
Password
Status
User Type
Vendor
Center
Team Lead ID The end result should look similar to the following agent information:

TABLE agentINFO

| User | Bubba | BUser1 | Password1 | Active | User | "Vendor" | "Center" | JUser1 |
|---|---|---|---|---|---|---|---|---|

Save the file as file type "CSV" with a filename of "user.csv" and close it.

Process 3: Set up an Lob file:

Open the "userlob.xls" template, which includes the fields noted below in Table LOB Before proceeding to format the file, take the following rules into consideration:
Check that there is a primary LOB for each new agent
Check that there are not multiple primary LOBs
LOBs other than what is in the template are preferably approved by an ACT Admin. For example, a Pilot.

Enter a new agentname, Name of the LOB, CRM ID and Y or N to indicate if the LOB being submitted is the primary LOB.

The agent information should include of the following in "Row 1":
User ID
Name of the LOB
CRM ID
Y or N to indicate if the LOB being submitted is the primary LOB The end result should look similar to the following agent information:

TABLE LOB

| BUser1 | DSL | bcr8923 | Y |
|---|---|---|---|

Save the file as file type "CSV" with a filename of "userlob.csv" and close it.

Process 4: Import Files:

From the home page 102, Click on the "Admin" button 312.

Select "Import agent" from the dropdown.

Check the "Select Box" next to the Team Lead Field and attach a "TeamLead.csv" file.

Check the "Select Box" next to the agent Field and attach a "user.csv" file.

Check the "Select Box" next to the agent LOB Field and attach a "userlob.csv" file.

Press the "Upload" button.

After uploading the files, verify that the "File Uploaded" message appears.

Exit the "Import agent" page by pressing the "Exit" button.

Using the Admin dropdown, select the "Reports" action.

In the "Start Date" field, choose today's date.

In the "Log" field, choose the "Error Log Report".

Press the "Run Report" button.

In the "Error Log Report", check to ensure there were no errors that resulted from the upload based on the Time Stamp within the report.

If there were any errors resolve these errors. *The most recent errors are located at the bottom of the report.

Exit the "Error Log Report" and exit the "Report Selection Screen"

Using the "Search agent" action from the dropdown, validate the presence of the new agents or team leads with the appropriate Vendor, Center, and LOB. *See Process 5 "Search agent" for more information.

Process 5: Search agent

Overview:

The Search agent option allows the Admin to access the profiles of all ACT agents. Once an agent's profile is open, the Admin may view or edit the profile.

Step by Step Process for Searching for an agent:

From the home page 102, Click on the "Admin" button 312.

Select "Search agent" from the dropdown.

Select the appropriate Vendor and Center using the dropdown.

Press the "Submit" button.

Select the agent the agent wish by checking the "Select" box next to their ID.

The Admin can now edit the agent

Edit agent

Overview:

Agents can be edited by another agent at the following agent Type levels shown in Table agentTYPE:

TABLE agentTYPE

| User Type | Overview | User Type Description |
|---|---|---|
| Admin | Ability to Add New, Edit, or Delete for all Vendors | Can edit all fields within the "Edit Profile Page" |
| VendorAdmin | Ability to edit certain features of a user's profile within one Vendor. | Can edit the following fields within the "Edit Profile Page": User Type Status Password First Name Last Name Center Team Lead LOB |
| CenterAdmin | Ability to edit certain features of a user's profile within one Vendor and Center. | Can edit the following fields within the "Edit Profile Page": User Type Status Password First Name Last Name Team Lead LOB |
| User | May only change their own password from the "User Change Password" screen. Users may also view their own profile. | |

The 2 Step Process for Editing agents is as follows:

Select the "Search agent" option from the "Admin Page" and find the agent to edit.

Edit the agent.

Step by Step Process for Editing an agent:
1. From the home page 102, Click on the "Admin" button 312.
2. Select "Search agent" from the dropdown.
3. The Admin may now select the appropriate Vendor or Center using the dropdowns.
4. Press the "Submit" button.
5. Select the agent the agent wish to edit by checking the "Select" box next to their ID.
6. Press the "Edit" button.
7. The agent's profile can now be edited per the above table.
8. If items on the left side of the Edit agent screen have been changed, press the "Update agent" button to save the agent changes and then press the "Exit" button.
9. If items on the right side of the Edit agent Screen have been changed press the "Done" button when finished in order to save the agent changes.

1. Delete an Agent

Overview:

The need to delete agents in ACT often occurs due to HR changes at the Vendor-Center level. Therefore, agents may be deleted by Admins in the following two ways.

Step by Step Process for Individual Deletes:
1. From the home page 102, Click on the "Admin" button 312.
2. Select "Search agent" from the dropdown.
3. The Admin may now select the appropriate Vendor or Center using the dropdowns.
4. Press the "Submit" button.
5. Select the agent the agent wish to edit by checking the "Select" box next to their ID.
6. Press the "Edit" button.
7. Within the "Status" dropdown select "Deleted"
8. Press the "Update agent" button to save the agent changes and then press the "Exit" button.

Step by Step Process for en masse Deletes:
1. From the home page 102, Click on the "Admin" button 312.
2. Select "Search agent" from the dropdown.
3. The Admin may now select the appropriate Vendor or Center using the dropdowns.
4. Press the "Submit" button.
5. Select the all agents the agent wish to edit by checking the "Select" box next to their ID.
6. Press the "Delete" button.
7. Click the "OK" button on the pop-up box.
8. The "Agents Successfully Deleted" message may then appear at the bottom of the screen.

2. Purge De-Activated Agent

Overview:

Any agent profiles with a status of "Delete" can be permanently removed from the ACT database using the "Purge De-Activated agent" function. After purging the de-activated agent, the Admin can no longer make any amendments to that agent's profile. The agentname is now available for re-use.

Step by Step Process for Purge De-Activated agent:
1. From the home page 102, Click on the "Admin" button 312.
2. Select "Purge De-Activated agent" from the dropdown.
3. Press the "Purge All" button at the bottom of the "Purge De-Activated agent" screen.
4. Press the "OK" button on the Pop-Up Box.
5. Verify the following message appears "Successfully Purged Deactivated agents."

3. Agent Change Password

Overview:

The agent Change Password option provides the Admin and all other agent's with the ability to reset their password, once logged into the tool.

Step by Step Process for Changing an agent Password:
1. From the home page 102, Click on the "Admin" button 312.
2. Select "User Change Password" from the dropdown.
3. With the "User Confirm Password" screen open, enter the agent old password in the "Current Password" field.
4. Enter the agent new password in the "New Password" field. When entering the agent new password keep the following rules in mind:

Passwords are preferably between six and twenty (6-20) characters in length

Passwords preferably contain at least one (1) number

New Password preferably differ by 2 positions from the agent last password

Special characters are not allowed

Passwords preferably are not blank

Passwords preferably are not be the same as any of the agent five (5) previous passwords 5. After entering the agent new password in the "New Password" field, type the agent new password again in the "Confirm Password" field.
6. Press the "Change" button.

7. The "Successfully Changed" message may then appear at the bottom of the "Confirm Password" field.

4. User View Profile

Overview:

The "View Profile" option allows agents to see (but not edit) what their profile settings are at the present time. For example, agents may go in to check and see what LOBs the agents are assigned to as well as the current team lead of the agent. This option within the dropdown may only be available for those agents who are not CenterAdmins, VendorAdmins, or Admins. Admins, VendorAdmins, and CenterAdmins should use the Search and Edit functionality instead.

Step by Step Process for Changing an agent Password:

1. From the home page 102, Click on the "Admin" button 312.
2. Select "View Profile" option from the dropdown.

Content Development:

5. LOB Modification

Overview:

Any current LOBs may be modified or amended using the LOB Modification function. These amendments include changing the LOB's status, its name, or its description. The LOB Modification may also be used to add or delete any number of LOBs to the current list.

Step by Step Process for Adding an LOB:

1. From the home page 102, Click on the "Admin" button 312.
2. Select "LOB Modification" from the dropdown.
3. Expand the "LOB Search" Page.
4. Press the "Add" button on the bottom right side of the "LOB Search" page.
5. Write in a name for the LOB by entering it in the "LOB Name" field.
6. The following options can be selected using the "Status" dropdown:
   Active—LOB that agents can be assigned to and content pushed to.
   Inactive—LOB that agents cannot be assigned to and content cannot be pushed to.
7. Write in a description of the LOB in the "Description Field".
8. Press the "Insert LOB" button.
9. A message may then appear below the "Description" field which says following: "Inserted Successfully"

Step by Step Process for Modifying an LOB:

1. From the home page 102, Click on the "Admin" button 312.
2. Select "LOB Modification" from the dropdown.
3. Expand the "LOB Search" Page.
4. Press the "Search" button.
5. Select the LOB the agent wish to edit by checking the "Select box" next to their ID.
6. Press "Edit" button.
7. The agent can now make any modifications to the chosen LOB.
8. After changes have been made, press the "Update LOB" button.
9. A message may then appear below the "Description" field which says the following: "Successfully edited"

Step by Step Process for Deleting an LOB:

1. Before any LOBs are deleted, an export of the agents mapped to that LOB should be gathered and reassigned as appropriate. This can be requested from the Tool Developer.
2. From the home page 102, Click on the "Admin" button 312.
3. Select "LOB Modification" from the dropdown.
4. Expand the "LOB Search" Page.
5. Press the "Search" button.
6. Select the LOB the agent wish to edit by checking the "Select box" next to their ID.
7. Press "Delete" button.
8. A message box may then appear asking if the agent is sure the agent wants to delete selected records. Press the "Ok" button.
9. Verify in the "Results" table that the chosen LOB's status has changed from "Active" to "Deleted".

Note: If content is pushed to an LOB and the LOB is deleted, the agent may remove it from the agent's inbox by making it "Inactive". The agent can then create new content with the desired distribution and release it.

6. Create a Module and Module Quiz

Overview

Modules can be WPAs, Desk Drops, Quality Flashes or Job Aids

Modules can be text only or can include questions

Modules can have the look and feel of one of the first four templates:

The 5 Step Process for Module Creation is as follows:

1. Create a new Module by assigning basic attributes
2. Create a section within that module
3. Apply a template to the section
4. Add pages to that section
5. Add content to each page (either questions or text)

Step by Step Process for Module and Module Quiz Development

1. From the home page 102, Click on the "Admin" button 312.
2. Select "Content" from the drop-down
3. Click on the "Module Development" link
4. Click on the "Add" button to add the Module
5. Input the following attributes:

Version Number: This field in combination with the name makes a module unique. Version number is for internal references only and should be used to version the module. For example, the version number may be used where an exam or piece of content needs to be revised but not renamed.

Name: Module name as it appears to the agent. An example module name is "The Weekly Process Announcement—April 11$^{th}$"

Start and End dates: These correspond with the dates that the module may display on the home page 102. After these dates, the content may no longer display on the home page 102, but may be available for the agent to search from the library. For example "Apr. 4, 2006-Apr. 18, 2006" may automatically move from the home page 102 to the archive on Apr. 19, 2006. These dates also represent when the module may display within the MRT Reports.

Due Date: This date corresponds to the date that the module must be completed by. It is not displayed to the agent but is used to turn the hyperlink red to remind the agent to complete the module. The due date must be greater than or equal to the start date or less than or equal to the end date.

Status: When creating content, place all items in "Design" status. For reference all other available status types have been noted below.

Released—Module in queue to be pushed to the home page 102.

Deleted—Keeps the module in the database but prevents it from being reactivated. May be purged periodically.

Inactive—Module not viewable by the agent in the home page 102 or the archive, but can be edited or released by the Admin. An inactive module can be re-activated the same day.

6. Tracking Enabled: The checkmark enables detailed tracking of all responses. Ensure that the "Tracking" checkbox is selected for all content. If tracking is not selected, all content taken may be given a score of 0% on the MRT Reports leaving no way to change this retroactively. Additionally, feedback questions may not be captured.
7. Click "Insert Module"
8. Assign the module to Vendors: ProjectName and click "Next"
9. Assign the module to Centers: ProjectName and click "Next"
10. Assign the module to LOBs: Test LOB and click "Update"
11. Click "Add Section" to add a section
12. Input the following attributes:

Edit the "Section Name" Field *May be visible to the agent.

Add a "Comment" *Optional and may only be seen by the Admin

Assign a template to the section. Template Choices are as follows:

Template 1: Image Upload
    Template 2: 75% Page Text and Small Image
    Template 3: 50% Page Text, 25% Screenshot and 1 Question
    Template 4: 25% Page Text, 50% Screenshot and 1 Question
    *Template 5 is only available for exams Click the "More Info" button to be reminded of the visual representation of the templates Click "Insert Section"

Click "Exit" to return to the "Edit Module" page.

13. Select the section the agent wish to edit by clicking on the "Select" box.
14. Click "Edit Section" to edit the section.
15. Click "Add Page" to add a Page
16. Input the following Page attributes:

Edit the "Page Title" field *May only be seen by the Admin

The "Page Picture" field can be utilized by pressing "Attach" to upload an image. File Types allowed are JPEG, PDF, and GIF:

Recommended sizes are as follows (Width X Height):
    *Image sizes may represent the size as they appear in a particular application. The image size may not represent the size of the image display in the content and exam windows. Minor size adjustments may need to be made due to differences in screen size. Authors should also aim not to exceed a file size of 200-300 KB.

Template 1: 9.59 in.×5.79 in.
    Template 2: 4.54 in.×5.73 in.
    Template 3: 4.60 in.×3.60 in.
    Template 4: 4.69 in.×5.93 in.

A repository of images pre-sized to the measurements given above can be found at the following url:Image Repository Once the Portal has opened, click on the "Agent Communications Toolbox" folder.

Click on the "Resources for Content Developer" folder.

Click on the "Image Repository" folder.

Choose the template the agent wish to upload an image for and save it to the agent computer. *When saving the image, each image should be saved with a unique identifier. For example, "Template 1_Image 1"

The "Audio File" field can be utilized by pressing "Attach" to upload an audio file. File Types allowed are MP3 and WAV. Authors should aim not to exceed an audio file size of 300 KB.

Note: The "Question Type" field may default to "Pass" if the agent is using Templates 1 or 2.

The following three "Question Types" may also be selected using Templates 3 and 4.

Sprinkler—Gives content creators the ability to create multiple choice and true false questions using answer choices A through D.

Feedback—A free response question. Answers to free response questions are not scored or calculated in the overall Module score.

Remedial—Gives content creators the ability to provide agents with additional information and context whenever the previous question was answered incorrectly. This page is not scored or calculated in the overall Module score.

Enter Text into the "Question Text" field. *Does not have to be a question.

17. Click "Add Page" to save the agent pages
18. Click "Update Section"
19. Click "Exit" to return to the main "Edit Module" Page
20. To apply a new template, add a new section. Otherwise, continue to add new pages until complete.
21. When the agents are ready to send the module to the agent queue for publication, choose "Released" from the Status drop-down. Note: Before placing the module in "Released" status, ensure that the only Vendors, Centers, and LOBs chosen are ProjectName, ProjectName, and Test LOB. Also ensure that the "Tracking" checkbox is selected. If tracking is not selected, all content taken may be given a score of 0% on the MRT Reports leaving no way to change this retroactively. Additionally, feedback questions may not be captured.
22. Click the "Update Module" button on the left side. Note: If "Update Module" is not clicked, the "Released" status may not be saved.
23. Click the "Active" button on the right side of the "Status" dropdown. Note: The "Active" button may only be selectable if the module is placed in "Released" status.
24. Once the agent has reached the "Activate Distribution" page, press the "Activate Distribution" button and the name of the module may then appear below the "Activate Distribution" and "Recently Activated Modules" buttons as recently activated.
25. Click the "Exit" button to return to the "Edit Module" page.
26. Click the "Exit" button to return to the "Content Search" page.
27. Click the "Exit" button to return to the "Content Menu" page.
28. Select the "Go Back to the Admin Page" to return to the main "Admin" page. This content is now viewable to ProjectName personnel assigned to the Test LOB.
29. From the "Admin" dropdown, select the "Reports" action.
30. Insert today's date in the "Start Date" field.

31. Choose the "Batch Log" report.
32. Press the "Run Report" button and verify the presence of the agent downloads in the "Batch Log" Report. Verify the accuracy of the Time Stamp based on CST and verify that the number of agents who received the content is close to the number expected. *The most recent downloads are located at the bottom of the report.
33. Exit the report and the "Admin" page.
34. Press the "Refresh" button and verify the Module on the home page 102.
35. Click on the "Exit" button.

EXAMPLE I

Uploading a QualityFlash

Process 1: Converting Content Text to HTML from an MS Word Document
1. Open the file the agent wish to upload in its Word format.
2. Using the "File" menu, select the "Save As" option.
3. Save the file as an "HTML" document.
4. Close the file.
5. Proceed to where the new "HTML" file is located and right click on it.
6. From the menu, select open with "WordPad"
7. After the "HTML" file has opened, select all HTML Code using the "Select All" option in the "Edit" menu.
8. Using the "Edit" menu, select the "Copy" option.
9. When necessary, the agent can now paste the HTML content into Templates 2, 3, and 4 by pressing "CTRL-V". *The only way to paste into the Text field is using CTRL-V. The agent cannot right click on any BiSiDet pages. BiSiDet is an administrative part of ACT.

Process 2: Creating a JPEG from an MS Word Document
*If the file is already a JPEG, skip to Process 5
1. Open the file the agent wish to upload in its Word format.
2. Using the "Edit" menu, choose the "Select All" option.
3. Using the "Edit" menu, press the "Copy" button.
4. From the agent computer's "Start Menu", press the "Run" button.
5. Type "MSPaint" in the open field
6. Press "OK"
7. Using the "Edit" menu, press the "Paste" button.
8. Re-size the object appropriately using the cursor.
9. Save the file as file type "JPEG" *When saving the image, each individual image should be saved with a unique identifier For example, "Template 1_QF 1"
10. Close the new "JPEG" file and MSPaint.

Process 3: Creating a JPEG Image from a PowerPoint slide. *If the File is Already a JPEG, Skip to Process 5
1. Open the file the agent wish to upload in its Powerpoint format.
2. Size the slide to "9.59×5.79" using the page setup function and make any necessary adjustments to the formatting.
3. Select the slide the agent wish to upload and do a File/Save As. *When saving the slides, each individual slide should be saved with a unique identifier. For example, "Template 1_QF 1"
4. Save "Every Slide" or the "Current Slide Only" as file type JPEG.

Process 4: Creating a JPEG Image from any Other Image Type. *If the file is already a JPEG, skip to Process 5
1. Open a blank MS Powerpoint slide.
2. Size the slide to "9.59×5.79" using the page setup function.
3. Go to the file database where the image the agent wish to upload is located.
4. Select this image and press CTRL-C
5. Return to the MS Powerpoint slide, press CTRL-V, and the copied image should now appear in Powerpoint.
6. Size the image to "9.59×5.79" using the cursor and the PowerPoint template as a guide.
7. Save "Every Slide" or the "Current Slide Only" as file type JPEG. *When saving the slides, each individual slide should be saved with a unique identifier. For example, "Template 1_QF 1"

Process 5: Creating the QualityFlash
1. From the home page 102, Click on the "Admin" button 312.
2. Select "Content" from the drop-down
3. Click on the "Module Development" link.
4. Press the "Add" button on the right side of the BiSiDET screen.
5. Under the "File Type" dropdown, select "QualityFlash".
6. Enter profile details and press the "Insert Module" button.
7. Assign the module to Vendors: ProjectName and click "Next"
8. Assign the module to Centers: ProjectName and click "Next"
9. Assign the module to LOBs: Test LOB and click "Update"
10. Click "Add Section" to add a section
11. Input the following attributes:
    Edit the "Section Name" Field *May be visible to the agent.
    Add a "Comment" *Optional and may only be seen by the Admin
    Assign a "Template 1" to the section.
    Click "Insert Section"
    Click "Exit" to return to the "Edit Module" page.
12. Select the section the agent wish to edit by checking the "Select Box".
13. Click "Edit Section" to edit the section.
14. Click "Add Page" to add a Page
15. Attach and upload the agent "JPEG" created in Processes 2, 3, or 4 above.
16. The "Audio File" field can be utilized by pressing "Attach" to upload an audio file. File Types allowed are MP3 and WAV. Authors should aim not to exceed an audio file size of 300 KB.
17. Click "Add Page"
18. Click "Update Section"
19. Click "Exit" to return to the main "Edit Module" Page
20. To apply a new template, add a new section. Otherwise, continue to add new pages until complete.
21. When the agent is ready to send the module to the agent queue for publication, choose "Released" from the Status drop-down. Note: Before placing the module in "Released" status, ensure that the only Vendors, Centers, and LOBs chosen are ProjectName, ProjectName, and Test LOB. Also, ensure that the "Tracking" checkbox is selected. If tracking is not selected, all content taken may be given a score of 0% on the MRT Reports leaving no way to change this retroactively. Additionally, feedback questions may not be captured.
22. Click the "Update Module" button on the left side. Note: If "Update Module" is not clicked, the "Released" status may not be saved.
23. Click the "Active" button on the right side of the "Status" dropdown. Note: The "Active" button may only be selectable if the module is placed in "Released" status.

24. Once the agent has reached the "Activate Distribution" page, press the "Activate Distribution" button and the name of the module or exam may then appear below the "Activate Distribution" and "Recently Activated Modules" buttons as recently activated.
25. Click the "Exit" button to return to the "Edit Module" page.
26. Click the "Exit" button to return to the "Content Search" page.
27. Click the "Exit" button to return to the "Content Menu" page.
28. Press "Go Back to the Admin Page" to return to the main "Admin" page. This content is now viewable to ProjectName personnel assigned to the Test LOB.
29. From the "Admin" dropdown, select the "Reports" action.
30. Insert today's date in the "Start Date" field.
31. Choose the "Batch Log" report.
32. Press the "Run Report" button 316 and verify the presence of the agent downloads in the "Batch Log" Report. Verify the accuracy of the Time Stamp based on CST and verify that the number of agents who received the content is close to the number expected. *The most recent downloads are located at the bottom of the report.
33. Exit the report and the "Admin" page.
34. Press the "Refresh" button and verify the Module on the home page 102.

EXAMPLE II

Uploading a WPA and WPA Quiz Using the "Sprinkler" Question Functionality

1. From the home page 102, Click on the "Admin" button 312.
2. Select "Content" from the drop-down
3. Click on the "Module Development" link.
4. Press the "Add" button on the right side of the BiSiDET screen.
5. Under the "File Type" dropdown, select "WPA".
6. Enter the remaining information and press the "Insert Module" button.
7. Assign the module to Vendors: ProjectName and click "Next"
8. Assign the module to Centers: ProjectName and click "Next"
9. Assign the module to LOBs: Test LOB and click "Update"
10. Click "Add Section" to add a section
11. Input the following attributes:
    Edit the "Section Name" Field *May be visible to the agent.
    Add a "Comment" *Optional and may only be seen by the Admin
    Assign a "Template 2" to the section.
    Click "Insert Section"
    Click "Exit" to return to the "Edit Module" page.
12. Select "Section 1" to edit by checking the "Select Box".
13. Click "Edit Section" to edit the section.
14. Click "Add Page" to add a Page
15. Upload an image for the New WPA with a size of "4.54×5.73" using Processes 2, 3, or 4 referenced on pages 14-15 of the "Admin Guide".
16. The "Audio File" field can be utilized by pressing "Attach" to upload an audio file. File Types allowed are MP3 and WAV. Authors should aim not to exceed an audio file size of 300 KB.
17. In the "Text" field, type in the content of the Module using the HTML code referenced on pages 25-30 of the "Admin Guide." The agent may also paste the HTML code into the "Text" field using Process 1 referenced on page 14 of the "Admin Guide"
18. Click "Add Page"
19. Click "Update Section"
20. Click "Exit"
21. Click "Add Section" to add a section for the "WPA Quiz"
22. Input the following attributes:
    Edit the "Section Name" Field *May be visible to the agent
    Add a "Comment" *Optional and may only be seen by the Admin
    Assign "Template 3 or 4" to the section.
    Click "Insert Section"
    Click "Exit" to return to the "Edit Module" page.
23. Select "Section 2" to edit by checking the "Select Box".
24. Click "Edit Section" to edit the section.
25. Click "Add Page" to add a Page for each question in the "WPA Quiz"
26. The agent can now use "Template 3 or 4" to add each question along with the correct and incorrect answers. Each field on "Template 3 or 4" serves the following purpose:
    Page Number: The # of the page in that particular section
    Page Title: The title of the current page.
    Page Picture: The picture to be displayed alongside the question in the quiz. This picture should be attached with a size of "4.6×3.6" for Template 3 or "4.69× 5.93" for Template 4 using Processes 2, 3, or 4 referenced on pages 14-15 of the "Admin Guide".
    Audio File: File Types allowed are MP3 and WAV. Authors should aim not to exceed an audio file size of 300 KB. These files can be uploaded by pressing the "Attach" button.
    Page Title: The title of the current page.
    Question Type: The following three question types may be chosen. In this scenario choose "Sprinkler":
        Sprinkler—Gives content creators the ability to create multiple choice and true/false questions using answer choices A through D.
        Feedback—A free response question. Answers to Free Response Questions are not scored or calculated in the overall Module score.
        Remedial—Gives content creators the ability to provide agents with additional information and context whenever the previous question was answered incorrectly. This page is not scored or calculated in the overall Module score.
    Question Text: The actual question the agents are to answer.
    Responses Box: This may be the correct or incorrect answer choice to the question.
    Responses Dropdown: The "Responses Dropdown" may include the following choices:
        Correct: Notifies the application this answer choice is right.
        Incorrect: Notifies the application this answer choice is wrong.
        Possible: Notifies the application this answer choice is close, but not quite right.
        Not Applicable: De-activates the response altogether.
    Feedback: This represents the message that appears when a particular choice is chosen.
27. The agent may not be required to use all four responses.

28. If the agent desire to use less than four responses, select "Not Applicable" in the additional dropdowns. *Comments are not required.
29. After submitting a question, click "Add Page"
30. When the agent have finished adding all of the agent questions, Click "Update Section"
31. Click "Exit"
32. When the agent is ready to send the "WPA" to the agent queue for publication, choose "Released" from the Status drop-down. Note: Before placing the module in "Released" status, ensure that the Vendors, Centers, and LOBs chosen are ProjectName and Test LOB. Also, ensure that the "Tracking" checkbox is selected. If tracking is not selected, all content taken may be given a score of 0% on the MRT Reports and may leave no way to change this retroactively. Additionally, feedback questions may not be captured.
33. Click the "Update Module" button on the left side. Note: If "Update Module" is not clicked, the "Released" status may not be saved.
34. Click the "Active" button on the right side of the "Status" dropdown. Note: The "Active" button may only be selectable if the module is placed in "Released" status.
35. Once the agent has reached the "Activate Distribution" page, press the "Activate Distribution" button and the name of the module or exam may then appear below the "Activate Distribution" and "Recently Activated Modules" buttons as recently activated.
36. Click the "Exit" button to return to the "Edit Module" page.
37. Click the "Exit" button to return to the "Content Search" page.
38. Click the "Exit" button to return to the "Content Menu" page.
39. Press "Go Back to the Admin Page" to return to the main "Admin" page. This content is now viewable to ProjectName personnel assigned to the Test LOB.
40. From the "Admin" dropdown, select the "Reports" action.
41. Insert today's date in the "Start Date" field.
42. Choose the "Batch Log" report.
43. Press the "Run Report" button 316 and verify the presence of the agent downloads in the "Batch Log" Report. Verify the accuracy of the Time Stamp based on CST and verify that the number of agents who received the content is close to the number expected. *The most recent downloads are located at the bottom of the report.
44. Exit the report and the "Admin" page.
45. Press the "Refresh" button and verify the Module on the home page 102.

EXAMPLE III

Uploading a Deskdrop and Deskdrop Quiz with Remedial Page Functionality

1. From the home page 102, Click on the "Admin" button 312.
2. Select "Content" from the drop-down
3. Click on the "Module Development" link.
4. Press the "Add" button on the right side of the BiSiDET screen.
5. Under the "File Type" dropdown, select "Deskdrop".
6. Enter the remaining information and press the "Insert Module" button.
7. Assign the module to Vendors: ProjectName and click "Next"
8. Assign the module to Centers: ProjectName and click "Next"
9. Assign the module to LOBs: Test LOB and click "Update"
10. Click "Add Section" to add a section
11. Input the following attributes:
    Edit the "Section Name" Field *May be visible to the agent.
    Add a "Comment" *Optional and may only be seen by the Admin
    Assign a "Template 2" to the section.
    Click "Insert Section"
    Click "Exit" to return to the "Edit Module" page.
12. Select "Section 1" to edit by checking the "Select Box".
13. Click "Edit Section" to edit the section.
14. Click "Add Page" to add a Page
15. Upload an image for the New Deskdrop with a size of "4.54×5.73" using Processes 2, 3, or 4 referenced on pages 14-15 of the "Admin Guide".
16. Audio File: File Types allowed are MP3 and WAV. Authors should aim not to exceed an audio file size of 300 KB. These files can be uploaded by pressing the "Attach" button.
17. In the "Text" field, type in the content of the Module using the HTML code referenced on pages 25-30 of the "Admin Guide." The agent may also paste the HTML code into the "Text" field using Process 1 referenced on page 14 of the "Admin Guide"
18. Click "Add Page"
19. Click "Update Section"
20. Click "Exit"
21. Click "Add Section" to add a section for the "Deskdrop Quiz"
22. Input the following attributes:
    Edit the "Section Name" Field *May be visible to the agent.
    Add a "Comment" *Optional and may only be seen by the Admin
    Assign "Template 3 or 4" to the section.
    Click "Insert Section"
    Click "Exit" to return to the "Edit Module" page.
23. Select "Section 2" to edit by checking the "Select Box".
24. Click "Edit Section" to edit the section.
25. Click "Add Page" to add a Page for each question in the "Deskdrop Quiz". The Remedial page can be designated for any page within the module except page 1. To utilize the Remedial Page functionality, select the "Remedial" button within Templates 3 and 4.
26. The agent can now use "Template 3 or 4" to add each question along with the correct and incorrect answers. Each field on "Template 3 or 4" serves the following purpose:
    Page Number: The # of the page in that particular section
    Page Title: The title of the current page.
    Page Picture: The picture to be displayed alongside the question in the quiz. This picture should be attached with a size of "4.6×3.6" for Template 3 or "4.69×5.93" for Template 4 using Processes 2, 3, or 4 referenced on pages 14-15 of the "Admin Guide".
    Audio File: File Types allowed are MP3 and WAV. Authors should aim not to exceed an audio file size of 300 KB. These files can be uploaded by pressing the "Attach" button.
    Question Type: The following three question types may be chosen. In this particular scenario, choose "Srinkler":

Sprinkler—Gives content creators the ability to create multiple choice and true/false questions using answer choices A through D.

Feedback—A free response question. Answers to Free Response Questions are not scored or calculated in the overall Module score.

Remedial—Gives content creators the ability to provide agents with additional information and context whenever the previous question was answered incorrectly. This page is not scored or calculated in the overall Module score.

Question Text: The actual question the agents are to answer.

Responses Box: This may be the correct or incorrect answer choice to the question.

Responses Dropdown: The "Responses Dropdown" may include the following choices:

Correct: Notifies the application this answer choice is right.

Incorrect: Notifies the application this answer choice is wrong.

Possible: Notifies the application this answer choice is close, but not quite right.

Not Applicable: De-activates the response altogether.

Feedback: This represents the message that appears when a particular choice is chosen.

Direct to Page: This field represents what page an agent taking the content may be taken to once an answer choice is chosen. This field allows content creators to direct agents to the remedial page based on whether the "Correct" or "Incorrect" answer choice is selected. The following represents a "Direct to Page" scenario when the Remedial functionality is utilized.

Choice A: Correct—Direct to Page: 3

Choice B: Incorrect—Direct to Page: 2 (Remedial Page)

Choice C: Incorrect—Direct to Page: 2 (Remedial Page)

Choice D: Incorrect—Direct to Page: 2 (Remedial Page)

27. The agent may not be required to use all four responses.
28. If the agent desires to use less than four responses, select "Not Applicable" in the additional dropdowns. *Comments are not required.
29. After submitting a question, click "Add Page"
30. When the agent have finished adding all of the agent questions, Click "Update Section"
31. Click "Exit"
32. When the agent is ready to send the "Deskdrop" to the agent queue for publication, choose "Released" from the Status drop-down. Note: Before placing the module in "Released" status ensures that the Vendors, Centers, and LOBs chosen are ProjectName, and Test LOB. Also ensure that the "Tracking" checkbox is selected. If tracking is not selected, all content taken may be given a score of 0% on the MRT Reports and may leave no way to change this retroactively. Additionally, feedback questions may not be captured.
33. Click the "Update Module" button on the left side. Note: If "Update Module" is not clicked, the "Released" status may not be saved.
34. Click the "Active" button on the right side of the "Status" dropdown. Note: The "Active" button may only be selectable if the module is placed in "Released" status.
35. Once the agent has reached the "Activate Distribution" page, press the "Activate Distribution" button and the name of the module or exam may then appear below the "Activate Distribution" and "Recently Activated Modules" buttons as recently activated.
36. Click the "Exit" button to return to the "Edit Module" page.
37. Click the "Exit" button to return to the "Content Search" page.
38. Click the "Exit" button to return to the "Content Menu" page.
39. Press "Go Back to the Admin Page" to return to the main "Admin" page. This content is now viewable to ProjectName personnel assigned to the Test LOB.
40. From the "Admin" dropdown, select the "Reports" action.
41. Insert today's date in the "Start Date" field.
42. Choose the "Batch Log" report.
43. Press the "Run Report" button and verify the presence of the agent downloads in the "Batch Log" Report. Verify the accuracy of the Time Stamp based on CST and verify that the number of agents who received the content is close to the number expected. *The most recent downloads are located at the bottom of the report.
44. Exit the report and the "Admin" page.
45. Press the "Refresh" button and verify the Module on the home page 102.

7. Create an Exam Question

Overview:

Before creating an exam, in one implementation the questions may be created separately. The questions are created using the "Exam Question Development" link from the Admin page.

Step by Step Process for Creating an Exam Question:
1. From the home page 102, Click on the "Admin" button 312.
2. Select "Content" from the dropdown.
3. Press the "Exam Question Development" link.
4. Press the "Add New" button.
5. Fill out the following fields for Sprinkler questions:

Question Number—Question ID number as it may appear in the chart.

Subject—For easy recall when re-using the exam question. Subject should be consistent and broad. For example: "BBT" or "5100B"

Category—Should provide a description of what type of module or exam this question is for. For example: "WPA" or "Technical Certification".

Question Type: The following three question types may be chosen. In this case choose "Sprinkler":

Sprinkler—Gives content creators the ability to create multiple choice and true false questions using answer choices A through D.

Feedback—A free response question. Answers to Free Response Questions are not scored or calculated in the overall Exam score.

Remedial—Not to be used in Template 5. The question won't appear.

Question Text—The actual question to be answered by all test takers.

Responses Box: This may be the correct or incorrect answer choice to the question.

Responses Dropdown: The "Responses Dropdown" may include the following choices:

Correct: Notifies the application this answer choice is right.

Incorrect: Notifies the application this answer choice is wrong.

Possible: Notifies the application this answer choice is close, but not quite right.

Not Applicable: De-activates the response altogether.
Feedback: This represents the message that appears when a particular choice is chosen.
The agent may not be required to use all four responses. If the agent desire to use less than four responses, select "Not Applicable" in the additional dropdowns.
*Comments are not required.
6. Fill out the following fields for Feedback questions:
Question Number—Question ID number as it may appear in the chart.
Subject—For easy recall when re-using the exam question. Subject should be consistent and broad. For example: "BBT" or "5100B"
Category—Should provide a description of what type of module or exam this question is for. For example: "WPA" or "Technical Certification".
Question Type: The following three question types may be chosen. In this case chose Feedback:
Sprinkler—Gives content creators the ability to create multiple choice and true false questions using answer choices A through D.
Feedback—A free response question. Answers to Free Response Questions are not scored or calculated in the overall Exam score.
Remedial—Not to be used in Template 5. The question won't appear.
Question Text—The actual question to be answered by all test takers.
7. Press the "Save" button at the bottom of the page.
8. Notes: When creating or editing Exam questions please take note of the following:
a. Ensure only one question is open at a time
b. Ensure the agents are not creating an exact duplicate of another questions
c. Ensure that the agent press "Save Changes" rather than "Exit"
8. Create an Examination
Overview
Examinations are built by creating pages and adding one question to each page.
The 3 Step Process for Exam Creation is as follows:
1. Create a new Exam by assigning basic attributes
2. Add pages to that Exam
3. Add a question to each Page
Step by Step Process for Exam Development
1. From the home page 102, Click on the "Admin" button 312
2. Select "Content" from the drop-down
3. Click on the "Add" button to add the Exam
4. Input the following attributes:
Version Number: This field in combination with the name makes a module unique. Version number is for internal references only and should be used to version the module. For example, the version number may be used where an exam or piece of content needs to be revised but not renamed.
Name: Module name as it appears to the agent. An example module name is "DSL Exam". *Make sure to put DSL or CSI in front of the exam so the agents may know which one to complete.
Start and End dates: These correspond with the dates that the module may display on the home page 102. After these dates, the content may no longer display on the home page 102, but may be available for the agent to search from the library. For example "Apr. 11, 2006-Apr. 18, 2006" may automatically move from the home page 102 to the archive on Apr. 19, 2006. These dates also represent when the module may display within the MRT Reports.
Due Date: This date corresponds to the date that the module must be completed by. It is not displayed to the agent but is used to turn the hyperlink red to remind the agent to complete the module. The due date must be greater than or equal to the start date or less than or equal to the end date.
Status: When creating content, place all items in "Design" status. For reference all other available status types have been noted below.
Released—Exam in queue to be pushed to the home page 102.
Deleted—Keeps the exam in the database but prevents it from being reactivated. May be purged periodically.
Inactive—Exam not viewable by the agent in the home page 102 or the archive, but can be edited or released by the Admin. An inactive module can be re-activated the same day.
Tracking Enabled: A checkmark enables detailed tracking of all the responses. Ensure that the "Tracking" checkbox is selected for all content. If tracking is not selected, all content taken may be given a score of 0% on the MRT Reports leaving no way to change this retroactively. Additionally, feedback questions may not be captured.
Exam Type:
1-Standard:—All agents may see the same questions in the exact same order.
2-Random Order:—agents may see the same questions in a different sequence.
Retake Exam: Checkmark enables the agent to retake the exam. If the agent takes the exam more than once, the reports may show the last time the agent took the exam.
Number of Questions:
Standard Mode:—If the "Exam Type" is set to "Standard", the number the agent enter in this field represents the number of questions the agent may see in the same order every time the exam is accessed.
Random Order Mode:—If the "Exam Type" is set to "Random Order", the number the agent enter in this field may represent the number of questions the agent may see in a different order every time the exam is accessed. If the agent add more questions than the number placed in this field, the agent may see different questions in a different order each time the exam is accessed.
Click "Insert Exam"
5. Click "Update Distribution"
6. Assign the exam to Vendors: ProjectName and click "Next"
7. Assign the exam to Centers: ProjectName and click "Next"
8. Assign the exam to LOBs: Test LOB and click "Update"
9. Click "Insert"
10. Click "Add" to add an Exam Page
11. Input the following Page attributes:
Edit the "Page Name" field *This may not appear.
The "Template Dropdown" may already be defaulted to "Template 5".
12. Click "Add Page" to save the agent pages
13. Click "Exit"
14. Select the page the agent wish to edit by checking the "Select" box 15. Press "Edit"
16. Click "Add" to search for a question and add it to the agent exam
17. The following attributes can be used to search for a question:
    Question Number—Question ID number as it may appear in the chart.
    Subject—For easy recall when re-using the exam question. Subject should be consistent and broad. For example: "BBT" or "5100B"
    Category—Should provide a description of what type of module or exam this question is for. For example: "WPA" or "Technical Certification".
    Question Text—The actual question to be answered by all test takers.
18. Click "Search" to search for the question
19. Based on the short descriptions provided, determine which questions to select. Check the "Select" box
20. Click "Add"
21. Click "Exit" to go back to the "Edit Exam" page
22. Click "Update Changes"
23. Click "Exit" to go back to the "Edit Exam" page.
    1. To add a new question, add a new section and repeat this process until the exam is complete.
    2. When the agent is ready to send the Exam to the agent queue for publication, choose "Released" from the Status drop-down. Note: Before placing the exam in "Released" status ensures that the Vendors, Centers, and LOBs chosen are ProjectName, and Test LOB. Also ensure that the "Tracking" checkbox is selected. If tracking is not selected, all content taken may be given a score of 0% on the MRT Reports and may leave no way to change this retroactively. Additionally, feedback questions may not be captured.
    3. Click the "Update Changes" button on the left side. Note: If this "Update Changes" is not clicked, the "Released" status may not be saved.
    4. Click the "Active" button on the right side of the "Status" dropdown. Note: The "Active" button may only be selectable if the exam is placed in "Released" status.
    5. Once the agent has reached the "Activate Distribution" page, press the "Activate Distribution" button and the name of the exam may then appear below the "Activate Distribution" and "Recently Activated Exams" buttons as recently activated.
    6. Click the "Exit" button to return to the "Edit Exam" page.
    7. Click the "Exit" button to return to the "Exam Search" page.
    8. Click the "Exit" button to return to the "Content Menu" page.
    9. Press "Go Back to the Admin Page" to return to the main "Admin" page. This content is now viewable to ProjectName personnel assigned to the Test LOB.
    10. From the "Admin" dropdown, select the "Reports" action.
    11. Insert today's date in the "Start Date" field.
    12. Choose the "Batch Log" report.
    13. Press the "Run Report" button and verify the presence of the agent downloads in the "Batch Log" Report. Verify the accuracy of the Time Stamp based on CST and verify that the number of agents who received the content is close to the number expected. *The most recent downloads are located at the bottom of the report.
    14. Exit the report and the "Admin" page.
    15. Press the "Refresh" button and verify the Exam on the home page 102.
9. Activate Distribution
    Overview:
    In order to see and access Released Modules and Exams on the ACT home page 102, the Admin distributes them using the "Activate Distribution" function. This function also makes the Exams and Modules accessible to all other agents based on their Vendor, Center, and LOB. The "Activate Distribution" function works in two ways as described below.
    Step by Step Process for one by one Activate Distribution:
    1. Within the "Edit Module Page" click the "Update Module" button on the left side. Note: If this "Update Module" is not clicked, the "Released" status may not be saved.
    2. Click the "Active" button on the right side of the "Status" dropdown. Note: The "Active" button may only be selectable if the module is placed in "Released" status.
    3. Once the agent has reached the "Activate Distribution" page, press the "Activate Distribution" button and the name of the module may then appear below the "Activate Distribution" and "Recently Activated Modules" buttons as recently activated.
    4. Click the "Exit" button to return to the "Edit Module" page.
    5. Click the "Exit" button to return to the "Module Search" page.
    6. Click the "Exit" button to return to the "Content Menu" page.
    7. Press "Go Back to the Admin Page" to return to the main "Admin" page.
    8. From the "Admin" dropdown, select the "Reports" action.
    9. Insert today's date in the "Start Date" field.
    10. Choose the "Batch Log" report.
    11. Press the "Run Report" button and verify the presence of the agent downloads in the "Batch Log" Report. Verify the accuracy of the Time Stamp based on CST and verify that the number of agents who received the content is close to the number expected. *The most recent downloads are located at the bottom of the report.
    12. Exit the report.
    13. Press the "Refresh" button and verify the Module on the home page 102.
    14. Click on the "Exit" button.
    Step by Step Process for en masse Activate Distribution Caution: Only to be used by Content Reviewers as this process may activate all Modules or Exams currently In "Released" Status:
    1. From the home page 102, Click on the "Admin" button 312.
    2. Select "Activate Distribution" from the dropdown.
    3. Press the "Activate Distribution" button at the top of the "Activate Distribution" page.
    4. The agent may then receive the following message "Successfully Executed New Distributions" and the agent module should appear as a "Recently Activated Module". *Any module or exam activated in the past hour may display.
    5. Click "Exit"
    6. From the "Admin" dropdown, select the "Reports" action.
    7. Insert today's date in the "Start Date" field.
    8. Choose the "Batch Log" report.
    9. Press the "Run Report" button and verify the presence of the agent downloads in the "Batch Log" Report. This can be done by verifying the Time Stamp next to the content name within the report. Additionally, the number of agents *The most recent downloads are located at the bottom of the report.
10. Exit the report.
11. Press the "Refresh" button and verify the Module on the home page 102.
12. Click on the "Exit" button.

10. HTML Guide:

When using templates 1-4, HTML can make the document visually appealing.

Figure 33:
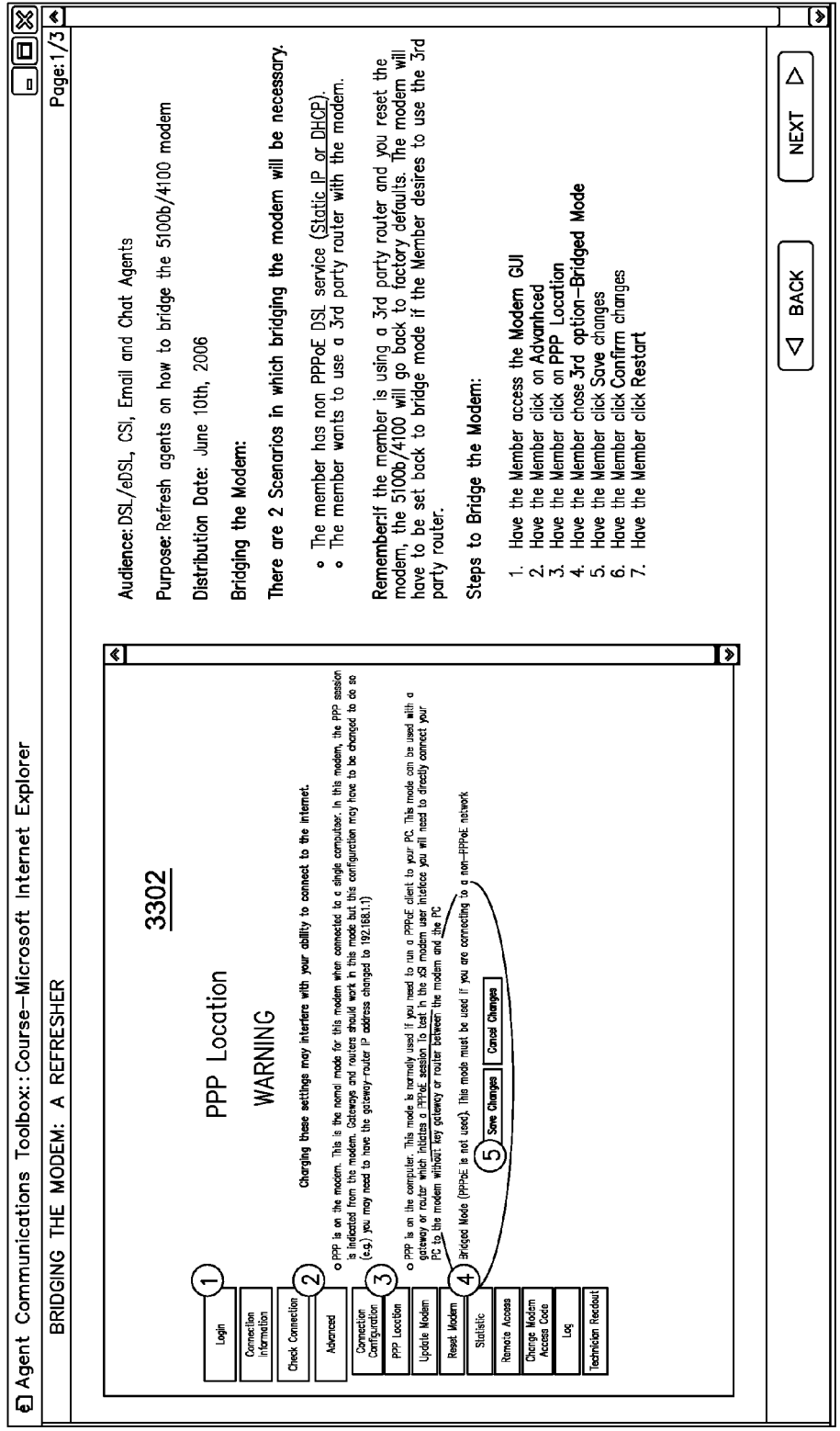
FIG. 33 illustrates an example of an electronic desk drop.

Most Frequently Used:
    <A HREF="url">Name of Website as it appears in the text</A>
    <AHREF="http://espn.go.com/">ESPN</A>
    Inserts a hyperlink
    <b></b>
    <b>The</b>
    Creates bold text
    <i></i>
    <i>The</i>
    Creates italic text
    <br>
    Inserts a line break
    <ol></ol>
    <OL>
    <LI>Blue
    <LI>White
    <LI>Red
    </OL>
    Creates a numbered list
    <ul></ul>
    <UL>
    <LI>Blue
    <LI>White
    <LI>Red
    </UL>
    Creates a bulleted list
    <li></li>
    <OL>
    <LI>Blue
    <LI>White
    <LI>Red
    </OL>
    Precedes each list item, and adds a number
Text Tags:
    <pre></pre>
    Creates preformatted text
    <h1></h1>
    Creates the largest headline
    <h6></h6>
    Creates the smallest headline
    <b></b>
    Creates bold text
    <i></i>
    Creates italic text
    <tt></tt>
    Creates teletype, or typewriter-style text
    <cite></cite>
    Creates a citation, usually italic
    <em></em>
    Emphasizes a word (with italic or bold)
    <strong></strong>
    Emphasizes a word (with italic or bold)
    <font size=?></font>
    Sets size of font, from 1 to 7)
    <font color=?></font>
    Sets font color, using name or hex value
Formatting:
    <p></p>
    Creates a new paragraph
    <p align=?>
    Aligns a paragraph to the left, right, or center
    <br>
    Inserts a line break
    <blockquote>
    </blockquote>
    Indents text from both sides
    <dl></dl>
    Creates a definition list
    <dt>
    Precedes each definition term
    <dd>
    Precedes each definition
    <ol></ol>
    Creates a numbered list
    <li></li>
    Precedes each list item, and adds a number
    <ul></ul>
    Creates a bulleted list
    <div align=?>
    A generic tag used to format large blocks of HTML, also used for stylesheets
Graphical Elements:
    <img src="name">
    Adds an image
    <img src="name" align=?>
    Aligns an image: left, right, center; bottom, top, middle
    <img src="name" border=?>
    Sets size of border around an image
    <hr>
    Inserts a horizontal rule
    <hr size=?>
    Sets size (height) of rule
    <hr width=?>
    Sets width of rule, in percentage or absolute value
    <hr noshade>
    Creates a rule without a shadow FIG. 33 shows an example of an electronic desk drop 3300. The electronic desk drop 3300 includes call center agent content 3302. The HTML used to generate the electronic desk drop 3300 follows:

<B>Audience: </B> DSL/eDSL, CSI, Email and Chat Agents<BR>
<BR>
<B>Purpose: </B> Refresh agents on how to bridge the 5100b/4100 modem
<BR>
<BR>
<B>Distribution Date: </B>June 10th, 2006<BR>
<BR>
<B>Bridging the Modem:</B><BR>
<BR>
<B>There are 2 Scenarios in which bridging the modem may be necessary.
</B><BR>
<UL>
<LI>The member has non PPPoE DSL service (<A HREF="http://support.microsoft.com/">Static IP or DHCP</A>).
<LI>The member wants to use a 3rd party router with the modem.
</UL>
<B>Remember: </B>If the member is using a 3rd party router and the agent reset the modem, the 5100b/4100 may go back to factory defaults. The modem may have to be set back to bridge mode if the Member desires to use the 3rd party router. <BR>
<BR>
<B>Steps to Bridge the Modem:</B><BR>
<OL>
<LI> Have the Member access the <B>Modem GUI</B>
<LI> Have the Member click on <B>Advanced</B>
<LI> Have the Member click on <B>PPP Location </B>
<LI> Have the Member chose <B>3rd option - Bridged Mode</B>
<LI> Have the Member click <B>Save</B> changes
<LI> Have the Member click <B>Confirm</B> changes
<LI> Have the Member click <B>Restart</B>
</OL>

11. PDF Creation for Document Upload:
1. It is recommended that the agent convert images and other files for upload to PDF Format using a tool such as PDF995.

12. Vendor-Center LOB Job Aid:
   Overview: In ACT, all content is published based on a chosen distribution pattern chosen. A job aid may be consulted to provide a map of which LOBs exist at a particular Vendor and Center. Content can then be targeted for a specific vendor-center based on the LOB. Examples of lines of business (LOBs) include CSI, Dial, DSL, eDSL, DSL-spanish, CSI-spanish, DSL chat, Dial Chat, SST Chat, DSL email, Dial email, Dial Billing email, Dial Billing phone, MAC, Language EPC, Language OLD, HN, HN L2, HN IV, Chronics, LiveOps, Non-Technical, Lightsped, RR-Tec Billing Spanish, and Select.
13. Content Development Best Practices:
   Overview: Within ACT, it is preferable that all content be created and uploaded based on the criteria listed below.
   Best Practices for Creating Content:
   1. Developers should distribute to ProjectName>ProjectName>Test LOB only
   2. After creating the agent content, please inform the designated content reviewers who may review all aspects of the content including the message, language and formatting prior to distribution. The designated content reviewers are the following:
      a. Content Reviewer for Deskdrops
      b. Content Reviewer for WPAs/Quality Flashes
      c. Content Reviewer for Exams and Job Aids
   3. Content should be built in word/ppt, and go through the regular client and Organization sign-off process before being entered into ACT.
   4. Desk drops may be requested 1 week in advance of distribution via ITG. The agent should join the Monday VSPOC the week of the agent desk drop. Please reach out to Content Reviewer for Deskdrops with any questions/concerns on the ALCM process or requesting desk drops.
   5. Text should never require horizontal scrolling. If this formatting appears, something was wrong with the agent import so reach out to a reviewer.
   6. Content should not be In-activated if small edits are being made. Small edits can be made in Active status.
   7. "Tracking" should be checked at final distribution, otherwise, the MRT reports may display 0% readership
   8. All content should have a minimum of a one week end date. Here are the guidelines:
      a. Desk drops should have a one-week end date. Due date should be one day. If readership is low, the end date should be extended.
      b. QF, WPAs, Job Aids should have a two-week end date. Due date should be one week.
      c. Exams should comply with that month's exam timeframe
   9. Monitor readership of the agent content on the MRT daily by 1 pm CST. If readership of the agent content is low, ask Content Reviewer for Deskdrops to join the VSPOC so the agent can speak to the agent desk drop again, collect feedback and drive readership.

Another example of system ID management follows:
ACT ID Management
—ID POC Checklist—
Request File Creation:
1. Populate the cells in a provided template. This includes:
Last Name
First Name
Active Login ID
Active or Inactive status
   Inactive is for those on Leave of Absence, Maternity, and/or other forms of absence.
Team Lead
   Choose Yes if the person serves as a Team Lead with agents reporting directly to them
   Team Leads may be responsible for the readership of content for any agent assigned to them
   Team Leads may have the ability access to "Reports" in the top right hand corner of ACT
Level of Access
   Center Lead are those who may edit profiles (including passwords) for all agents in their Center
   Vendor Lead are those who may edit profiles (including passwords) for all agents in their Vendor
Vendor
Site
   Team Lead's Active Login ID (e.g., fts_jsmith)
   The Team Lead's active login id must exist as an agent within ACT
   This field is needed for accurate Team Lead reporting
   This field is only needed for agents
Primary LoB
   CRM ID for all applicable Lines of Business (LOB) in Columns in the provided template. Examples of lines of business (LOBS) include CSI, Dial, DSL, eDSL, DSL-spanish, CSI-spanish, DSL chat, Dial Chat, SST Chat, DSL email, Dial email, Dial Billing email, Dial Billing phone, MAC, Language EPC, Language OLD, HN, HN L2, HN IV, Chronics, LiveOps, Non-Technical, Lightsped, RR-Tec Billing Spanish, and Select.
   Note if that LoB does not have a CRM ID (such as an LoB which uses Clarify), enter "Yes" in the cell An additional example of system management follows, with regard to editing an agent.

Figure 34:
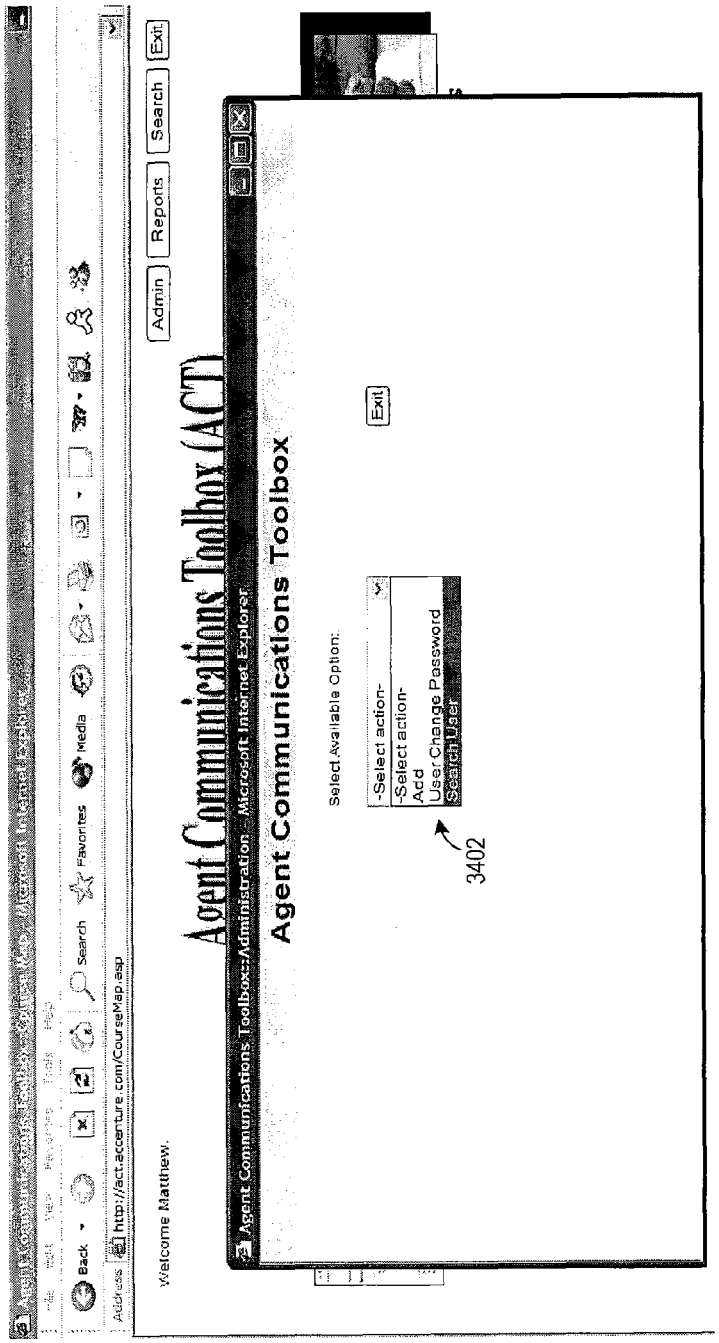
FIG. 34 shows an administration interface.
Figure 35:
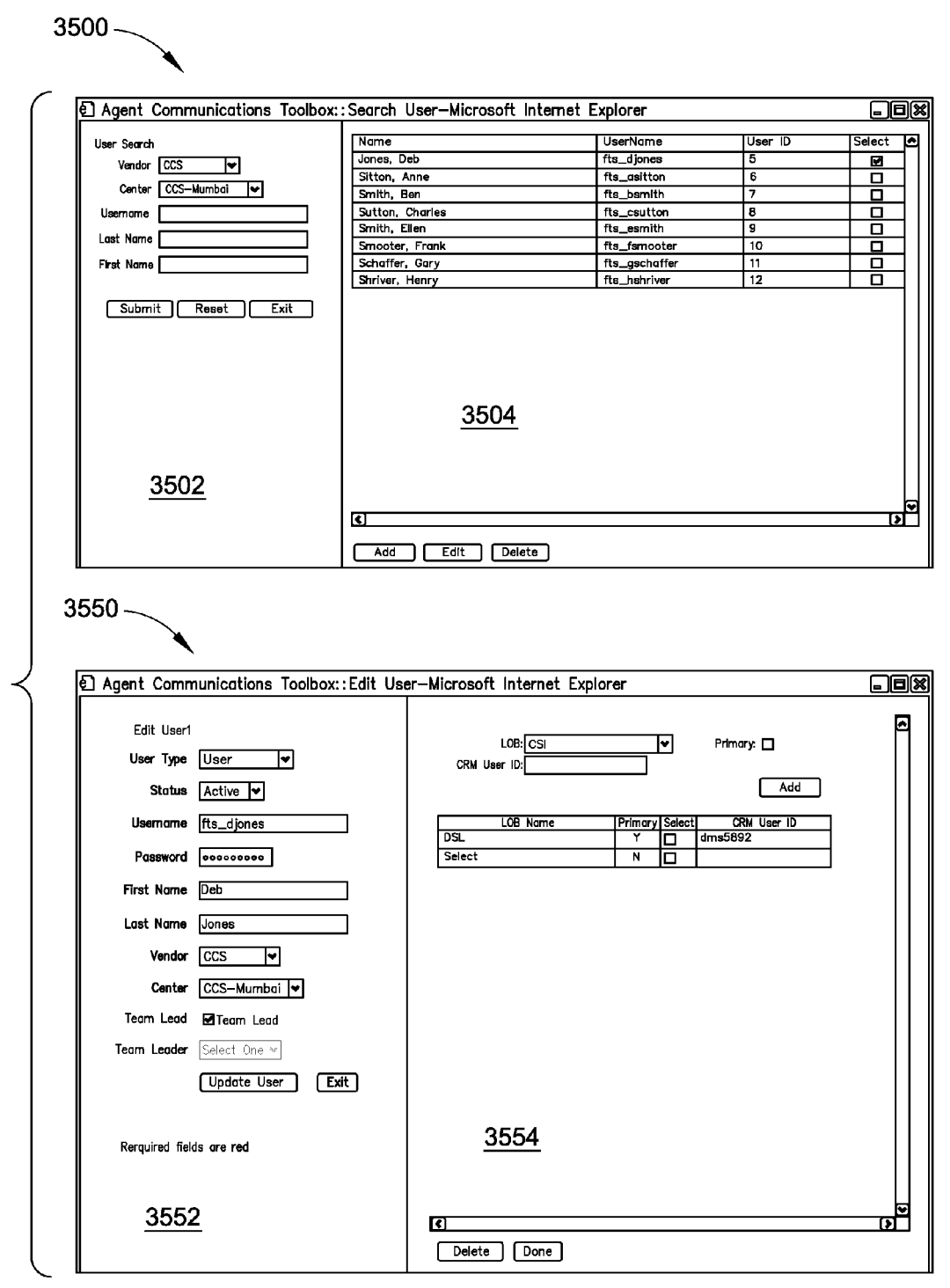

FIG. 34 shows an administration interface 3400. The interface 3400 provides several drop down option selections 3402, including Add, agent Change Password, and Search agent.
   Objective
   Center and Vendor ID POCS are responsible for editing an agent's profile in the system, including resetting passwords.
   Overview
   The Search agent option allows the Admin to access the profiles of all system agents. Once an agent's profile is open, the Admin may view or edit the profile.
   Process:
   From the home page 102, Click on the "Admin" button 312
   Select "Search agent" from the dropdown.
   Select the appropriate Vendor and Center using the dropdown.
   Press the "Submit" button.
   FIG. 35 illustrates a search agent administration interface 3500 that shows the results of the searching based on the vendor and center. The search agent administration interface 3500 includes a search criteria interface 3502 and search result interface 3504.
   Select the agent by checking the "Select" box next to their ID.
   Press the "Edit" button.
   FIG. 35 also shows an edit agent administration interface 3550 that the system generates in response to selecting an agent for editing. The edit agent administration interface 3550 includes an agent profile interface 3552 and a LoB assignment interface 3554. The Admin may edit any portion of the agent's profile, including agent type, status, password, agentname, first name, last name, vendor, center, team lead, team leader, or any other profile data.

Note: Marking an agent Inactive may remove them from the reports. This may be done if the agent is on a leave of absence. Note that this may lock the agent out of the tool.

If items on the left side of the Edit agent screen have been changed, press the "Update agent" button to save the agent changes and then press the "Exit" button.

If items on the right side of the Edit agent Screen have been changed press the "Done" button when finished in order to save the agent changes.

Overview:

If an agents' password is not locked, the agent can change their own password. Example instructions follow.

Process:

From the home page 102, Click on the "Admin" button 312

Select "User Change Password" from the dropdown.

With the "User Confirm Password" screen open, enter old password in the "Current Password" field.

Figure 36:
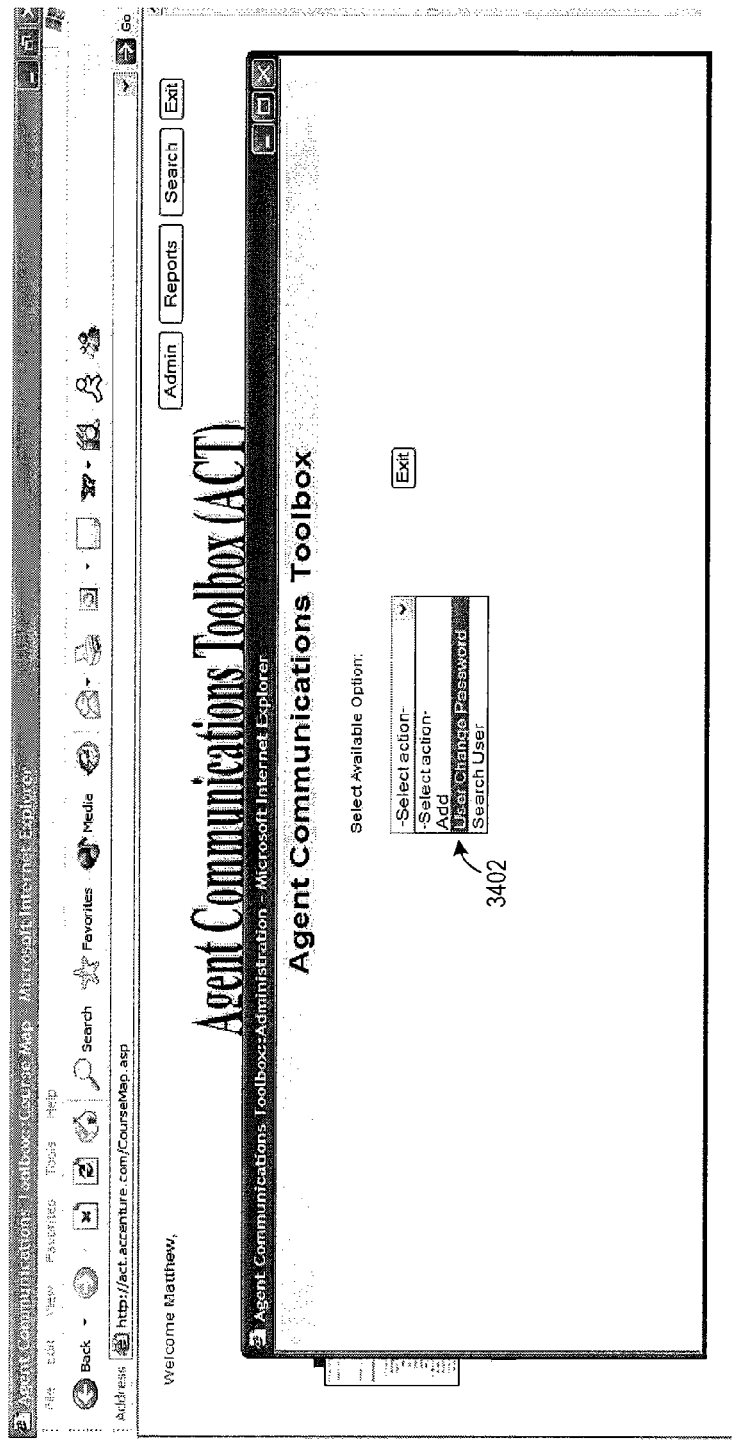
FIG. 36 shows a change password administration interface.

FIG. 36 shows a change password administration interface 3600 with an example of the agent confirm password screen. The change password administration interface 3600 provides several drop down option selections 3402

Enter new password in the "New Password" field. When entering the agent new password keep the following rules in mind:

Passwords preferably are between six and twenty (6-20) characters in length

Passwords preferably contain at least one (1) number

Special characters are preferably not allowed

Passwords preferably are not blank

After entering new password in the "New Password" field, type new password again in the "Confirm Password" field.

Press the "Change" button.

The "Successfully Changed" message may then appear at the bottom of the "Confirm Password" field.

Regarding creating or deleting an agent request, the system may implement and respond to the following:

Request File Creation:

Populate the cells in a template document, including, as examples:

Last Name

First Name

Active Login ID

Active or Inactive status

Inactive is for those on Leave of Absence, Maternity, and/or other forms of absence.

Team Lead

Choose Yes if the person serves as a Team Lead with agents reporting directly to them Team Leads may be responsible for the readership of content for any agent assigned to them Team Leads may have the ability access to "Reports" in the top right hand corner of ACT Level of Access Center Lead are those who may edit profiles (including passwords) for all agents in their Center Vendor Lead are those who may edit profiles (including passwords) for all agents in their Vendor Vendor Site Team Lead's Active Login ID (e.g., fts_jsmith)

The Team Lead's active login id must exist as an agent within ACT

This field is needed for accurate Team Lead reporting

This field is only needed for agents

Primary LoB

CRM ID for all applicable Lines of Business in Columns K-AH.

Note if that LoB does not have a CRM ID (such as an LoB which uses Clarify), enter "Yes" in the cell.

Send the file to an administrator for processing.

The system may also provide module and quiz development capability. For example, the system may implement and respond to the following:

1) Create a Module
   1. From the home page, Click on the "Admin" button 312
   2. Select "Content" from the drop-down
   3. Click on the "Module Development" link
   4. Click on the "Add" button to add the Module
   5. Input the following attributes:

Version Number: This field in combination with the name makes a module unique. Version number is for internal references only and should be used to version the module. For example, the version number may be used where an exam or piece of content needs to be revised but not renamed.

Module Name: Module name as it appears to the agent. All module names should include the LOB e.g. "HSI Broadband Tool or Dial Transfer Process or Sykes Tier 2 Pilot Update" If there is no prefixed LOB, it is understood that the communication applies to all LOBs e.g. "WPA: Jun. 6, 2007"

Module Approver: List the client and/or Quality personnel who signed off on the content Module Owner: This is the name of the person who uploaded the module Comment: This is space to type any notes (Example would be context "Emailed by client First Name Last Name due to call driver issue.")

Start and End dates: These correspond with the dates that the module may display on the home page 102. After these dates, the content may no longer display on the home page, but may be available for the agent to search from the library. For example "Jul. 11, 2007-Jul. 28, 2007" may automatically move from the home page to the archive on Jul. 29, 2007. These dates also represent when the module may display within the MRT Reports.

Note: As a convention, make the end date either 15$^{th}$ or the 28$^{th}$ as long as it is at least 5 business days after the DUE date.

Examples:

| Start Date | Due Date | End Date |
| --- | --- | --- |
| May 5 | May 7 | May 15 |
| May 10 | May 15 | May 28 |
| May 22 | May 27 | June 15 |

Due Date: This date corresponds to the date that the module must be completed by. It is not displayed to the agent but is used to turn the hyperlink red to remind the agent to complete the module. The due date must be greater than or equal to the start date or less than or equal to the end date.

Status: When creating content, place all items in "Design" status. For reference all other available status types have been noted below.

Released—Module in queue to be pushed to the home page.

Deleted—Keeps the module in the database but prevents it from being reactivated. May be purged periodically.

Inactive—Module not viewable by the agent in the home page or the archive, but can be edited or released by the Admin. An inactive module can be re-activated the same day.
6. Click "Insert Module"
7. Assign the module to all affected Vendors and click "Next"
8. Assign the module to all affected Centers click "Next"
9. Assign the module to all targeted LOBs including Test LOB click "Update". Refer to the most current Vendor LOB MatrixYYYYMMDD.xls file in Sharepoint
10. Click "Add Section" to add a section
11. Input the following attributes:
    Edit the "Section Name" Field *May be visible to the agent. (Examples are Content, Checkpoint, Feedback, and Summary)
    Add a "Comment" *Optional and may only be seen by the Admin
    Assign a template to the section. Template Choices are as follows:
        Template 1: Image Upload
        Template 8: 75% Free Text/HTML & Image
        Template 9: 100% Free Text/HTML
        Template 10: Checkpoint Question & Image
        *Template 5 is only available for exams
    Click the "More Info" button to be reminded of the visual representation of the templates
    Click "Insert Section"
    Click "Exit" to return to the "Edit Module" page.
12. Select the section the agent wish to edit by checking the "Select" box.
13. Click "Edit Section" to edit the section.
14. Click "Add Page" to add a Page
15. Input the following Page attributes:
    Edit the "Page Title" field *May only be seen by the Admin
    The "Page Picture" field can be utilized by pressing "Attach" to upload an image. File Types allowed are JPEG, PDF, and GIF:
    The "Audio File" field can be utilized by pressing "Attach" to upload an audio file. This is good for script changes. It also varies the communication and makes it more interesting. File Types allowed are MP3 and WAV. Owners should not exceed an audio file size of 300 KB.
    The following "Question Types" may also be selected using Templates 10.
        Multiple Choice or T/F—Gives content creators the ability to create multiple choice and true false questions using answer choices A through D. *Default and most commonly used.
        Feedback—A free response question. Answers to free response questions are not scored or calculated in the overall Module score.
    Enter Text into the "Question Text" field. *Does not have to be a question.
    Note: Do not change the number in the Direct to Page field
16. Click "Add Page" to save the agent pages
17. Click "Update Section". If the agent wishes to add more pages of the same template, continue to add and edit the pages.
18. Click "Exit" to return to the main "Edit Module" Page
19. To apply a new template, add a new section and repeat the steps above to add and edit pages.
20. Click on the Preview Module link on the Edit Module page to see how the agent module may appear.
21. When the agent i ready to publish the module, email the ACT Business Owner for review and activation.
22. Click the "Exit" button to return to the "Content Search" page.
23. Click the "Exit" button to return to the "Content Menu" page.
24. Press "Go Back to the Admin Page" to return to the main "Admin" page.

a) Example I

Uploading a Desk Drop i) Process 1: Converting Content Text to HTML from an MS Word Document
1. Open the file the agent wish to upload in its Word format.
2. Open an MS FrontPage application.
3. Click on "Design" tab on the lower left hand corner.
4. Copy and paste the content as the agent see it in Word onto the Design page of Frontpage.
5. Click on the "Code" tab. Select All by clicking Edit then Select All or Ctrl+A.
6. Using the "Edit" menu, select the "Copy" option.
7. When necessary, the agent can now paste the HTML content into Templates 8, 9, and 10 by pressing "CTRL-V". *The only way to paste into the Text field is using CTRL-V. The agent cannot right click on any BiSiDet pages.

ii) Process 2: Creating a JPEG from an MS Word Document
*If the file is already a JPEG, skip to Process 5
1. Open the file the agent wish to upload in its Word format.
2. Using the "Edit" menu, choose the "Select All" option.
3. Using the "Edit" menu, press the "Copy" button.
4. From the agent computer's "Start Menu", press the "Run" button.
5. Type "MSPaint" in the open field
6. Press "OK"
7. Using the "Edit" menu, press the "Paste" button.
8. Re-size the object appropriately using the cursor.
9. Save the file as file type "JPEG" *When saving the image, each individual image should be saved with a unique identifier. For example, "Template 1_QF 1"
10. Close the new "JPEG" file and MSPaint.

Process 3: Creating a JPEG Image from a PowerPoint slide.
*If the file is already a JPEG, skip to Process 5
1. Open the file the agent wish to upload in its PowerPoint format.
2. Size the slide to "9.59×5.79" using the page setup function and make any necessary adjustments to the formatting.
3. Select the slide the agent wish to upload and do a File/Save As. *When saving the slides, each individual slide should be saved with a unique identifier. For example, "Module Name_Page 1"
4. Save "Every Slide" or the "Current Slide Only" as file type JPEG.

Process 4: Creating a JPEG Image from any other Image Type.
*If the file is already a JPEG, skip to Process 5
1. Open a blank MS PowerPoint slide.
2. Size the slide to "9.59×5.79" using the page setup function.
3. Go to the file database where the image the agent wish to upload is located.
4. Select this image and press CTRL-C 5. Return to the MS PowerPoint slide, press CTRL-V and the copied image should now appear in PowerPoint.
6. Size the image to "9.59×5.79" using the cursor and the PowerPoint template as a guide.
7. Save "Every Slide" or the "Current Slide Only" as file type JPEG. *When saving the slides, each individual slide should be saved with a unique identifier. For example, "Module Name_Page 2"

iii) Process 5: Creating the Desk Drop
1. From the home page, Click on the "Admin" button 312
2. Select "Content" from the drop-down
3. Click on the "Module Development" link.
4. Press the "Add" button on the right side of the BiSiDET screen.
5. Under the "Module Type" dropdown, select "Desk-Drops".
6. Enter profile details and press the "Insert Module" button.
7. Assign the module to all affected Vendors click "Next"
8. Assign the module to all affected Centers click "Next"
9. Assign the module to all targeted LOBs including Test LOB click "Update". Refer to the most current Vendor LOB MatrixYYYYMMDD.xls file in Sharepoint.
10. Click "Add Section" to add a section
11. Input the following attributes:
    Edit the "Section Name" Field *May be visible to the agent. (Examples are Content, Checkpoint, Feedback, and Summar)
    Add a "Comment" *Optional and may only be seen by the Admin
    Assign a "Template 1: Image Upload" to the section.
    Click "Insert Section"
    Click "Exit" to return to the "Edit Module" page.
12. Select the section the agent wish to edit by checking the "Select Box".
13. Click "Edit Section" to edit the section.
14. Click "Add Page" to add a Page
15. Attach and upload the agent "JPEG" created in Processes 2, 3, or 4 above.
16. The "Audio File" field can be utilized by pressing "Attach" to upload an audio file. File Types allowed are MP3 and WAV. Owners should aim not to exceed an audio file size of 300 KB.
17. Click "Add Page"
18. Click "Update Section"
19. Click "Exit" to return to the main "Edit Module" Page
20. To apply a new template, add a new section. Otherwise, continue to add new pages until complete.
21. Click on the Preview Module link on the Edit Module page to see how the agent module may appear.
22. When the agent is ready to publish the module, email the ACT Business Owner for review and activation.
23. Click the "Exit" button to return to the "Content Search" page.
24. Click the "Exit" button to return to the "Content Menu" page.
25. Press "Go Back to the Admin Page" to return to the main "Admin" page.

2) Create a Module with Quiz a) Example II

Uploading a WPA and WPA Quiz

1. From the home page, Click on the "Admin" button 312
2. Select "Content" from the drop-down
3. Click on the "Module Development" link.
4. Press the "Add" button on the right side of the BiSiDET screen.
5. Under the "Module Type" dropdown, select "WPA".
6. Enter the remaining information and press the "Insert Module" button.
7. Assign the module to all affected Vendors click "Next"
8. Assign the module to all affected Centers click "Next"
9. Assign the module to all targeted LOBs including Test LOB click "Update". Refer to the most current Vendor LOB MatrixYYYYMMDD.xls file in Sharepoint.
10. Click "Add Section" to add a section
11. Input the following attributes:
    Edit the "Section Name" Field *May be visible to the agent (Examples are Content, and Summary)
    Add a "Comment" *Optional and may only be seen by the Admin
    Assign a "Template 9: 100% Free Text/HTML" to the section.
    Click "Insert Section"
    Click "Exit" to return to the "Edit Module" page.
12. Select the section the agent wish to edit by checking the "Select Box".
13. Click "Edit Section" to edit the section.
14. Click "Add Page" to add a Page
15. Attach and upload the agent "JPEG" created in Processes 2, 3, or 4 above.
16. The "Audio File" field can be utilized by pressing "Attach" to upload an audio file. File Types allowed are MP3 and WAV. Owners should aim not to exceed an audio file size of 300 KB.
17. Click "Add Page"
18. Click "Update Section"
19. Click "Exit" to return to the main "Edit Module" Page
20. Click "Add Section" to add a section for the "WPA Quiz"
21. Input the following attributes:
    Edit the "Section Name" Field to read WPA Quiz*May be visible to the agent.
    Add a "Comment" Indicate number of Questions *Optional and may only be seen by the Admin
    Assign "Template 10: Checkpoint Question & Image" to the section.
    Click "Insert Section"
    Click "Exit" to return to the "Edit Module" page.
22. Check the select box beside "WPA Quiz" to edit that section.
23. Click "Edit Section" to edit the section.
24. Click "Add Page" to add a Page for each question in the "WPA Quiz"
25. The agent can now add a question along with the correct and incorrect responses and feedback for the option agent chose. Each field on "Template 10: Checkpoint Question & Image" serves the following purpose:
    Page Number: The # of the page in that particular section
    Page Title: Label as Question 1, etc.
    Page Picture: The picture to be displayed alongside the question in the quiz. This picture should be attached with a size of "4.6×3.6" using Processes 2, 3, or 4 above.
    Audio File: File Types allowed are MP3 and WAV. Owners should aim not to exceed an audio file size of 300 KB. These files can be uploaded by pressing the "Attach" button.
    Question Details: The actual question the agents are to answer. Use HTML code to format.
    Responses Box: This may be the correct or incorrect answer choice to the question.

Responses Dropdown: The "Responses Dropdown" may include the following choices:
    Correct: Notifies the application this answer choice is right.
    Incorrect: Notifies the application this answer choice is wrong.
    Not Applicable: De-activates the response altogether.
    Feedback: This represents the message that appears when a particular choice is chosen. Use this field to reinforce what the correct answer is and any references the agent can review. agents may remember what they read here.
26. The agent may not be required to use all four responses.
27. If the agent desires to use less than four responses, select "Not Applicable" in the additional dropdowns. *Comments are not required.
28. After submitting a question, click "Add Page"
29. When the agent have finished adding all of the agent questions, Click "Update Section"
30. Click "Exit"
31. Click on the Preview Module link on the Edit Module page to see how the agent module may appear.
32. When the agent is ready to publish the module, email the ACT Business Owner for review and activation.
33. Click the "Exit" button to return to the "Content Search" page.
34. Click the "Exit" button to return to the "Content Menu" page.
35. Press "Go Back to the Admin Page" to return to the main "Admin" page.

Table VENDORIDENTIFIED shows an example process for reporting a vendor identified network outage.

TABLE VENDORIDENTIFIED

| | |
|---|---|
| Description | This M&P defines the process required for reporting and resolving a vendor identified network outage in the Agent Communications Toolbox. |
| Key Players | Vendor Team Leads, Vendor IDO NOC, Organization IDO POC, Tool Developer, Tool Admin, the Control Center, and GNOC |
| Triggering Events | The Vendor Team Lead may receive verbal notification of an outage from an Agent. |
| Assumptions | Agents may inform the Team Lead whenever an outage occurs. |
| Inputs/Tools | Agent Communications Toolbox<br>Ping (to verify network connection)<br>Tracert (to verify network connection) |
| Procedure | |
| 1. | Notifies Organization IDO of outage via chat. |
| 2.<br>(Hardware Issue Path) | IDO is unable to get into the application.<br>Organization IDO POC determines which other vendors are affected by this outage.<br>Organization IDO POC contacts the The Control Center Center<br>Tool Admin receive notification of the application error.<br>The Control Center receives notification of the hardware issue and resolves it.<br>The Control Center tests and confirms the issue has been resolved.<br>The Control Center notifies IDO of the hardware issue resolution.<br>Organization IDO POC tests and confirms the hardware issue resolution.<br>Organization IDO POC notifies the Vendor ID NOC, and Tool Admin of hardware issue resolution via email or phone if phone contact was established.<br>Vendor IDO NOC notifies Team Lead of hardware issue resolution.<br>Team Lead notifies Agents of hardware issue resolution. |
| 3.<br>(Network Outage Path) | If IDO is able to get into the application, but multiple vendors cannot, then the issue is a network outage as opposed to an application error. |

TABLE VENDORIDENTIFIED-continued

| | |
|---|---|
| | The outage occurred during normal business hours<br>Organization IDO POC calls The Control Center for a resolution and the Tool Admin as an FYI<br>The Control Center receives notification of the connectivity issue and resolves it.<br>The Control Center tests and confirms the issue has been resolved.<br>The Control Center notifies IDO of the outage resolution.<br>Organization IDO POC tests and confirms the outage resolution.<br>Organization IDO POC notifies the Vendor ID NOC, and Tool Admin of outage resolution via email or phone if phone contact was established.<br>Vendor IDO NOC notifies Team Lead of outage resolution.<br>Team Lead notifies Agents of outage resolution.<br>The outage occurred outside of normal business hours<br>Organization IDO POC notifies GNOC of an issue with the The Control Center Solution Office Data Center.<br>GNOC receives notification of connectivity issue<br>GNOC opens a ticket and assigns it<br>GNOC notifies IDO of outage resolution<br>Organization IDO POC tests and confirms the outage resolution.<br>Organization IDO POC notifies the Vendor ID NOC, and Tool Admin of outage resolution via email or phone if phone contact was established.<br>Vendor IDO NOC notifies Team Lead of outage resolution.<br>Team Lead notifies Agents of outage resolution. |
| 4.<br>(Application Error Path) | The Organization IDO POC has determined this is an application error as opposed to network outage.<br>Organization IDO POC determines if other vendors are affected.<br>Organization IDO POC notifies Tool Admin, and Tool Developer of error with application<br>Tool Admin receives notification of the error<br>Tool Developer resolves application error and tests<br>Tool Developer notifies IDO POC and Tool Admin of error resolution<br>Organization IDO POC tests and confirms error resolution<br>Organization IDO POC notifies the Vendor ID NOC, Tool Admin, and Tool Developers of error resolution via email or phone if phone contact was established.<br>Vendor IDO NOC notifies Team Lead of error/outage resolution.<br>Team Lead notifies Agents of error/outage resolution. |
| Outputs | |

Table INTERNALLYIDENTIFIED shows an example process for reporting a vendor identified network outage.

TABLE INTERNALLYIDENTIFIED

| | |
|---|---|
| Description | This M&P defines the process required for reporting and resolving an internally identified network outage in the Agent Communications Toolbox. |
| Key Players | Control Center, Organization IDO POC, and Tool Admin |
| Triggering Events | A network outage is internally identified by the Control Center. |
| Assumptions | Control Center is able to identify a network outage. Sunday from 3am CST to 4am CST we cannot guarantee the Tool may be online due to routine maintenance procedures. |
| Inputs/Tools | Agent Communications Toolbox |
| Procedure | |
| 1.<br>(The Control Center) | Identifies issue with hardware through automated monitoring.<br>Notifies IDO, and Tool Admin<br>The Control Center tests and confirms the issue is resolved.<br>The Control Center notifies the IDO POC, and Tool Admin of the outage resolution.<br>Organization IDO POC receives notification that the issue has been resolved.<br>Organization IDO POC tests and confirms the outage resolution.<br>Organization IDO POC notifies the Vendor IDO NOC of the outage resolution via email or phone if phone contact was established.<br>The Tool Admin then receives notification of the issue |

TABLE INTERNALLYIDENTIFIED-continued

| | |
|---|---|
| | resolution. |
| 2. (Organization IDO POC) | Receives notification of the outage from The Control Center |
| | The Organization IDO POC notifies the Vendor IDO NOC of estimated time to resolve via chat. |
| | Organization IDO POC receives notification that the issue has been resolved. |
| | Organization IDO POC tests and confirms the outage resolution. |
| | Organization IDO POC notifies the Vendor IDO NOC of the outage resolution via email or phone if phone contact was established. |
| | The Tool Admin then receives notification of the issue resolution. |
| 3. (Tool Admin and Infrastructure NOC) Outputs | Receives notification of the application error from The Control Center. |
| | Receives notification of the issue resolution from the Organization IDO POC. |

Figure 37:
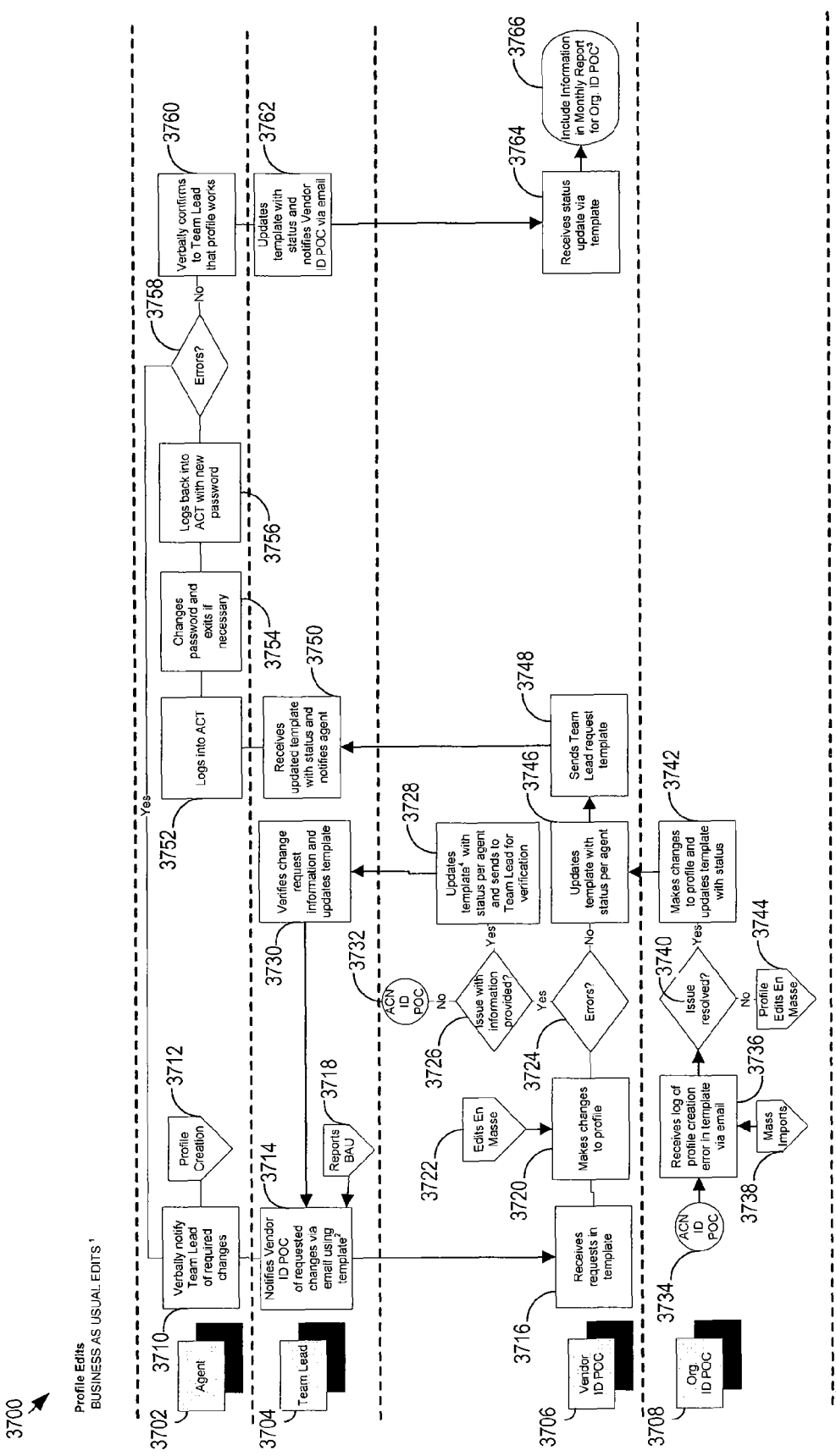
FIG. 37 shows a process flow for selected profile edits.

FIG. 37 shows a process flow 3700 for selected profile edits. FIG. 37 shows the interactions between the agent 3702, team lead 3704, vendor 3706, and a system host 3708. The selected profile edits may include profile changes for a LOB, team lead, center, or other area. For example, the agent 3702 may notify (3710) a team lead 3704 that changes are required to the profile of the agent 3702 (e.g., a new profile may need to be created (3712) and/or an existing profile modified). The team lead 3704 may communicate to the vendor 3706 a requested profile change (e.g., via e-mail in a request template) from the agent 3702 (3714 and 3716) and/or as a result of reports (e.g., business as usual (BAU) reports) (3718). The vendor 3706 may modify the profile (3720) and/or globally modify multiple profiles (3722) according to the request template. In the event an error is determined to exist corresponding to a modified profile (3724) and an issue regarding the information in the request template is determined (3726), the vendor 3706 may return the request template with updated status information for each agent 3702 to the team lead 3704 for verification (3728). The team lead 3704 verifies the change request information, updates the request template (3730) and resends the verified request template to the vendor 3706 (3714).

In the event an error is determined to exist corresponding to a modified profile (3724) and the error is unrelated to the information in the request template then the system host 3708 (e.g., administrator and/or ACT 100) is notified (3732 and 3734). The system host 3708 may receive logs corresponding to profile creation errors (3736) and/or mass imports (3738). The system host 3708 administrator may resolve the issues identified by the logs (3740), modify the profiles in accordance with the resolution of the issues and update the request template with the status of the profiles (3742). The system host 3708 administrator may send the request template to the vendor 3706. In the event the system host 3708 administrator is unable to resolve the issue (3744) identified by the logs and/or until the issue is identified and resolved (3722 and 3720), global profile edits may not be performed and/or alternatively individual profile edits may be performed.

In the event no errors are identified in the request template, the vendor 3706 updates the request template with the status of each agent (3746) and sends the updated request template to the team lead 3704 (3748). The team lead 3704 receives the request template and notifies the agent to log into ACT 100 (3750). The agent 3702 logs into ACT 100 (3752), changes the password and may exit in order to complete the password change process (3754). The agent 3702 logs back into ACT 100 with the new password (3756). In the event an error occurs during the log-in with the new password (3758), the agent 3702 notifies the team lead 3704 that a change to the profile is required (e.g., a password reset did not work) (3710). The agent 3702 otherwise notifies the team lead that the profile works (3760) and the team lead 3704 may update a template with status information and notify the vendor 3706 (3762 and 3764). The vendor 3706 may include the status updates to the request template in a monthly report for the organization (3766).

Figure 38:
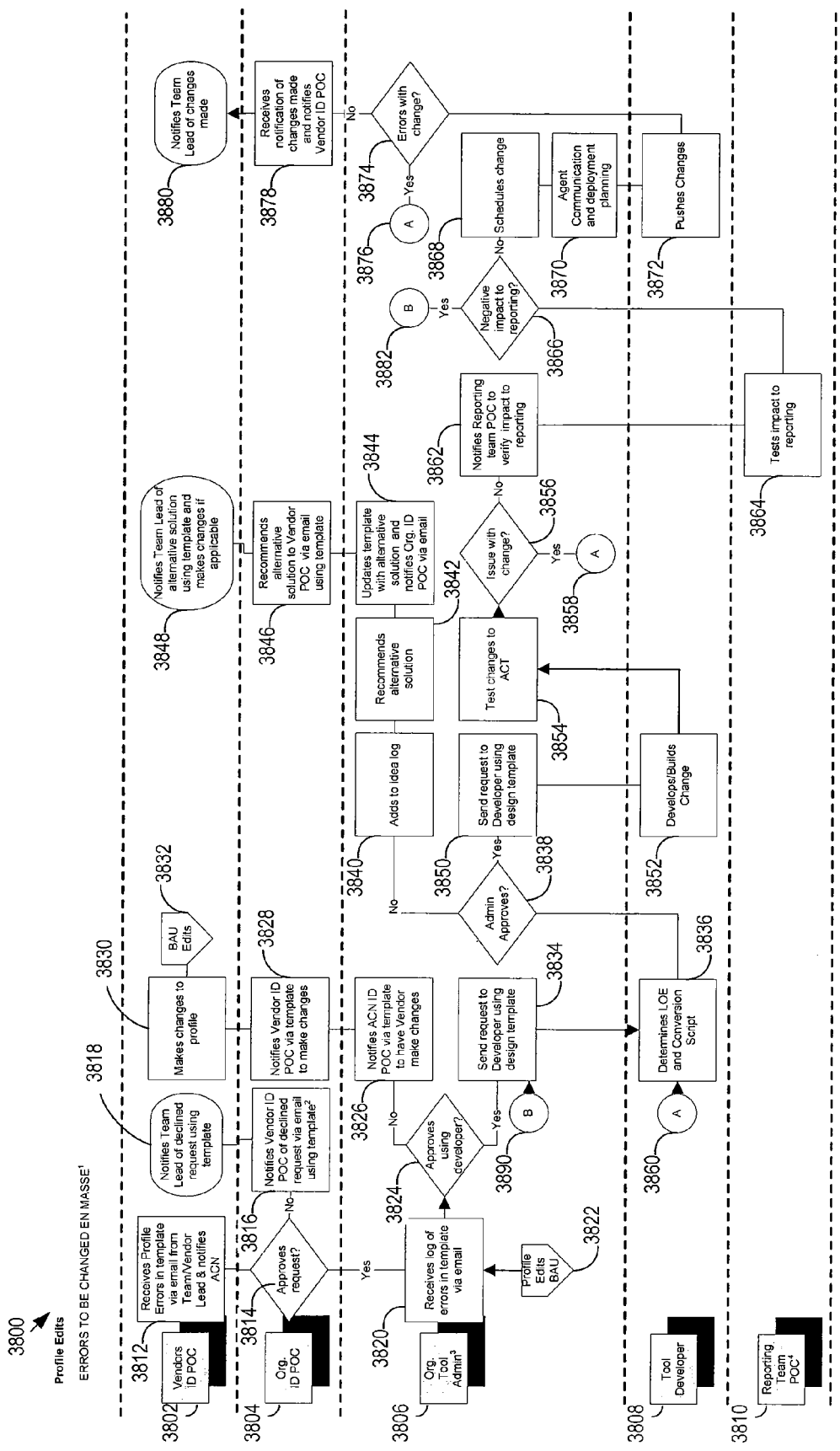
FIG. 38 illustrates a process flow for additional selected profile edits

FIG. 38 illustrates a process flow 3800 for additional selected profile edits. FIG. 38 shows the interactions between the vendor 3802, system host or organization 3804, tool admin 3806, tool developer 3808, and reporting team 3810. The process flow 3800 may be used for closing a center and reassigning all of the agents to another center, or other processes. The vendor 3802 may receive profile errors in a request template from the team lead 3704 and/or vendor lead (3812), and notifies the system host 3804 (e.g., administrator and/or ACT 100). In the event the host system 3804 does not approve the request (3814), the system host 3804 notifies the vendor 3706 that the request was declined (3816), and the vendor 3802 notifies the team lead 3704 that the request was declined (3818). In the event the system host 3804 approves the request, the tool admin 3806 receives a log of errors in a request template (e.g., via e-mail) (3820), including profile edits (e.g., BAU edits) (3822). The tool admin 3806 may serve as a liaison between the tool developer 3808 and the vendor 3802 (3824).

In the event the tool admin 3806 does not approve of using the tool developer 3808, the tool admin 3806 notifies the system host 3804 to request that the vendor 3902 modify the profiles with the requisite changes (3826 and 3828), and the vendor 3802 implements the profile changes (3830) that may be included in BAU edits (3832 and 3822).

In the event the tool admin 3806 approves of using the tool developer 3808, the request is communicated to the tool developer 3808 using a design template (3834). The tool developer 3808 determines the level of effort (LOE) and conversion scripts required, and the tool developer 3808 communicates the LOE and required conversion scripts to the tool admin 3806 (3836).

In the event the tool admin 3806 does not approve of the LOE and conversion scripts (3838), the tool admin 3806 includes the LOE and conversion scripts in an idea log (3840), the tool admin 3806 recommends alternative solution (3842) and updates the template with the alternative solution and notifies the system host 3804 (e.g., via e-mail) (3844). The system host 3804 recommends the alternative solution to the vendor 3802 (3846) and the vendor 3802 notifies the team lead 3704 regarding the alternative solution using the request template and makes applicable changes (3848).

In the event the tool admin 3806 approves of the LOE and conversion scripts, the tool admin 3806 communicates the request to the tool developer 3808 using the design template (3850), the tool developer 3808 builds (e.g., develops) the changes (3852). The tool admin 3806 tests the changes ACT 100 (3854). In the event the tool admin 3806 identifies issues corresponding to the changes (3856), the tool developer 3808 (3858 and 3860) further determines the LOE and required conversion scripts needed to resolve the issues (3836).

In the event the tool admin 3806 determines there are no issues corresponding to the changes, the tool admin 3806 notifies the reporting team 3810 to verify the impact to reporting (3862), and the reporting team 3810 tests the impacts to reporting (3864). In the event the reporting team 3810 determines that there are no negative impacts to reporting (3866), the tool admin 3806 schedules the changes (3868), performs agent communication and deployment planning (3870) and pushes the changes (3872). In the event the tool admin 3806 determines that there are issues corresponding to the changes (3874), the tool developer 3808 (3876 and 3860) further determines the LOE and required conversion scripts needed to resolve the issues (3836). In the event the tool admin 3806 determines that there are no issues corresponding to the changes, the system host 3804 receives notification of the changes made and notifies the vendor 3802 (3878). The vendor 3802 notifies the team lead of the changes made (3880).

In the event the reporting team 3810 determines that there are negative impacts to reporting (3882), the tool admin 3806 communicates the impacts to the tool developer 3808 using a design template (3890 and 3834).

Figure 39:
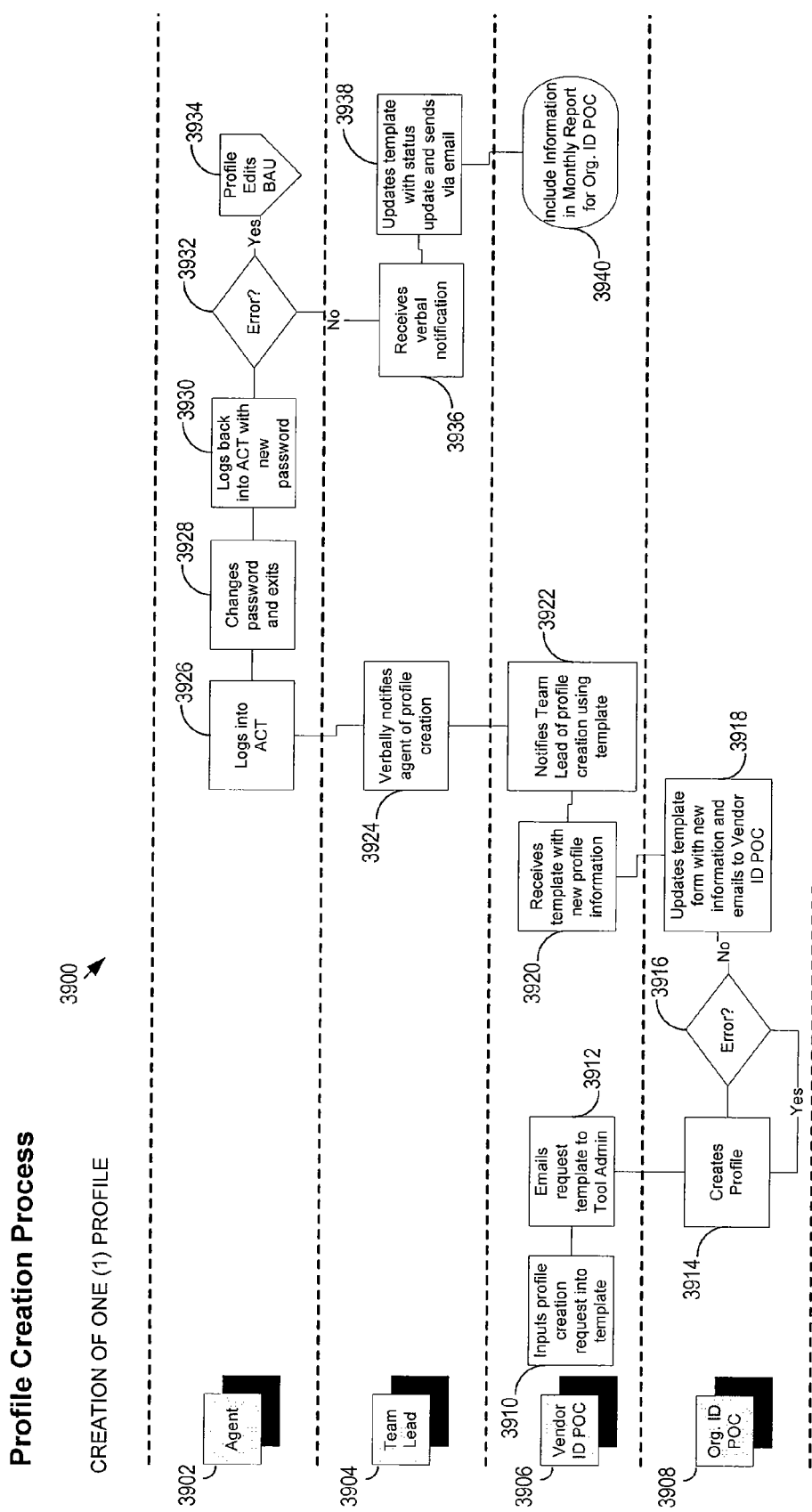
FIG. 39 shows a process flow for creation of a profile.

FIG. 39 shows a process flow 3900 for creation of a profile. FIG. 39 shows the interaction between the agent 3902, team lead 3904, vendor 3906, and the system host or organization 3908. The process flow 3900 may be used, for example, for creation of a profile. The vendor 3906 inputs a profile creation request into a request template (3910) and communicates (e.g., via e-mail) the request template to the tool admin 3806 (3912). The system host 3908 attempts to create the profile (3914) until there are no errors corresponding to the profile (3916). Once the event the system host 3908 determines that there are no errors corresponding to the profile, the system host 3908 updates the request template with the new information regarding the created profile (3918) and communicates the request template to the vendor 3906 (3920). The vendor 3906 notifies the team lead 3904 regarding the profile creation using the request template (3922). The team lead 3904 notifies the agent regarding the profile creation (3924) and the agent 3902 logs into ACT 100 (3926). The agent 3902 may be required to change the password upon the first log-in into ACT 100 and exit (3928). The agent 3902 may then log back into ACT 100 with the new password (3930). In the event an error occurs when the agent 3902 attempts to log back into ACT 100 (3932), profile edits and status may be communicated to the tool admin (e.g. 3806) to resolve the error (3934). In the event no errors occur when the agent 3902 attempts to log back into ACT 100, the successful log-in is communicated to the team lead 3904 (3936) and the request template is updated with the status and communicated to the vendor 3906 (3938). The vendor 3906 may include the information in the monthly report for the system host 3908 (3940).

Figure 40:
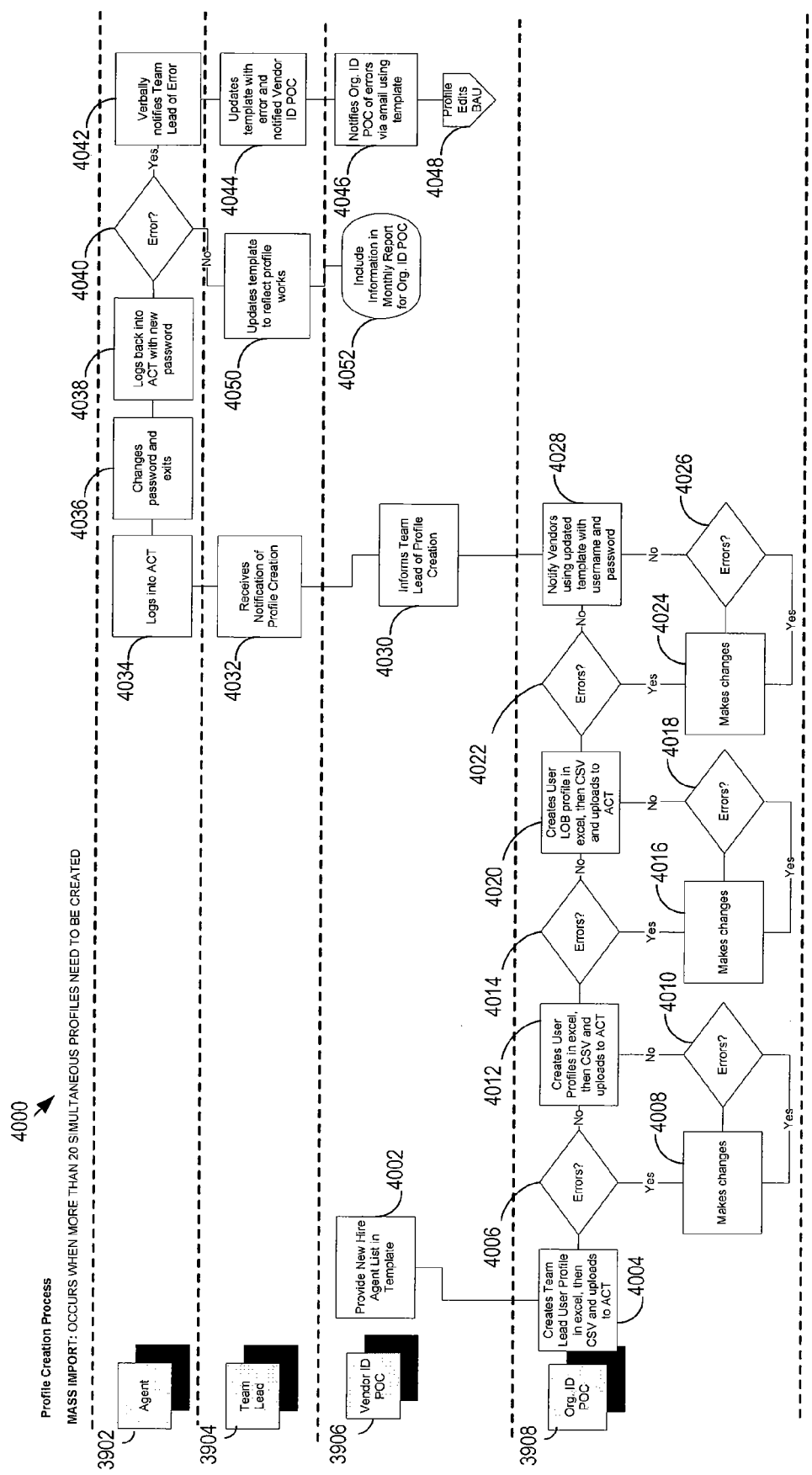
FIG. 40 shows a process flow for creation of multiple profiles.

FIG. 40 shows a process flow 4000 for creation of multiple profiles. FIG. 40 shows the interaction between the agent 3902, team lead 3904, vendor 3906, and the system host or organization 3908. The process flow 4000 may be used, for example, for creation of multiple profiles (e.g., more than 20 at once). The system host 3908 communicates a new hire agent list in a request template corresponding to the vendor 3906 (4002). The system host 3908 creates a team lead user profile in a request template (e.g., MS-Excel spreadsheet), then comma separates variables (CSV) and uploads the team lead user profile to ACT 100 (4004). In the event the system host 3908 identifies errors in the team lead user profile (4006), the system host 3908 modifies the team lead user profile (4008) until the system host 3908 determines that there are no errors corresponding to the team lead user profile (4010). The system host 3908 creates user profiles in excel, then CSV and uploads the user profiles to ACT 100 (4012). In the event the system host 3908 identifies errors in the user profiles (4014), the system host 3908 modifies the user profiles (4016) until the system host 3908 determines that there are no errors corresponding to the user profiles (4018). The system host 3908 creates LOB profiles in excel, then CSV and uploads the user profiles to ACT 100 (4020). In the event the system host 3908 identifies errors in the LOB profile (4022), the system host 3908 modifies the LOB profile (4024) until the system host 3908 determines that there are no errors corresponding to the LOB profile (4026). The system host 3908 notifies the vendors 3906 using the updated request template with the username and password (4028). The vendor 3906 notifies the team lead regarding the creation of the profiles (4030). The team lead 3904 receives the notification regarding the creation of the profiles (4032) and notifies the agent 3902 to log into ACT 100. The agent 3902 logs into ACT 100 (4034). The agent 3902 may be required to change the password upon the first log-in into ACT 100 and exit (4036). The agent 3902 may then log back into ACT 100 with the new password (4038). In the event an error occurs when the agent 3902 attempts to log back into ACT 100 (4040), the agent 3902 notifies the team lead regarding the error (4042), the team lead 3904 notifies the vendor regarding the error (4044), and the vendor 3906 notifies the system host 3908 regarding the error (4046). The error may be included in profile edit reports (e.g., BAU reports) (4048). In the event no errors occur when the agent 3902 attempts to log back into ACT 100, the team lead 3904 updates the request template to reflect the successful log-in (4050) and the team lead 3904 communicates the same to the vendor 3906. The vendor 3906 may include the information in the monthly report for the system host 3908 (4052).

Figure 41:
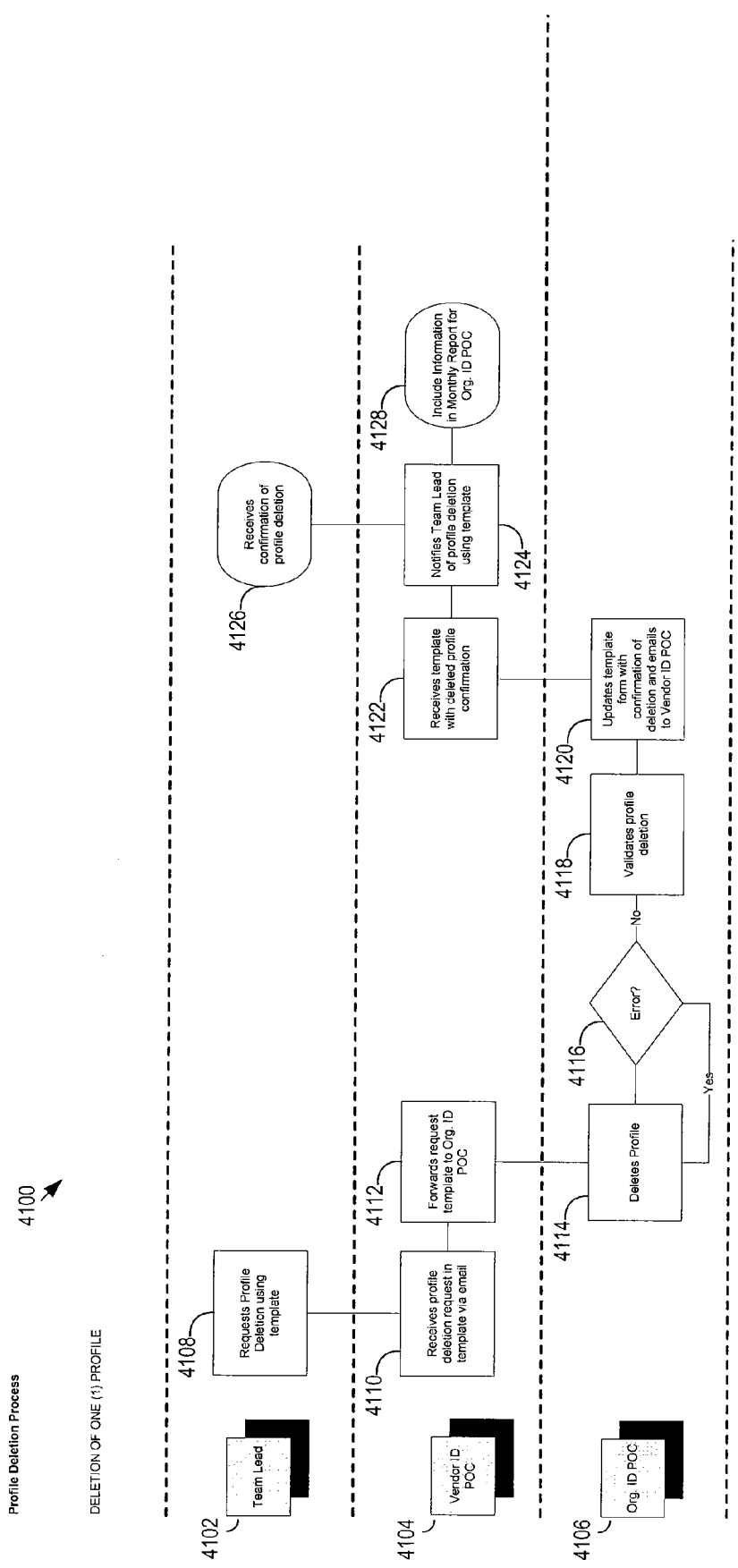
FIG. 41 illustrates a process flow for deletion of a profile.

FIG. 41 illustrates a process flow 4100 for deletion of a profile. FIG. 41 shows the interaction between the team lead 4102, the vendor 4104 and the system host or organization 4106. The process flow 4100 may be used, for example, for deletion of a profile. The team lead 4102 may request the deletion of a profile using a request template (4108). The vendor 4104 receives the profile deletion request in the request template (4110) and communicates the request template to the system host 4106 (4112). The system host 4106 may attempt to delete the profile (4114) until no errors results corresponding to the attempted deletion (4116). The system host 4106 validates that the profile has been deleted (4118) and updates the request template with the confirmation of deletion (4120) and communicates the deletion to the vendor 4104 (4122). The vendor 4104 notifies the team lead regarding the profile deletion using the request template (4124 and 4126). The vendor 4104 may also include the information in the monthly report for the system host 4106 (4128).

Figure 42:
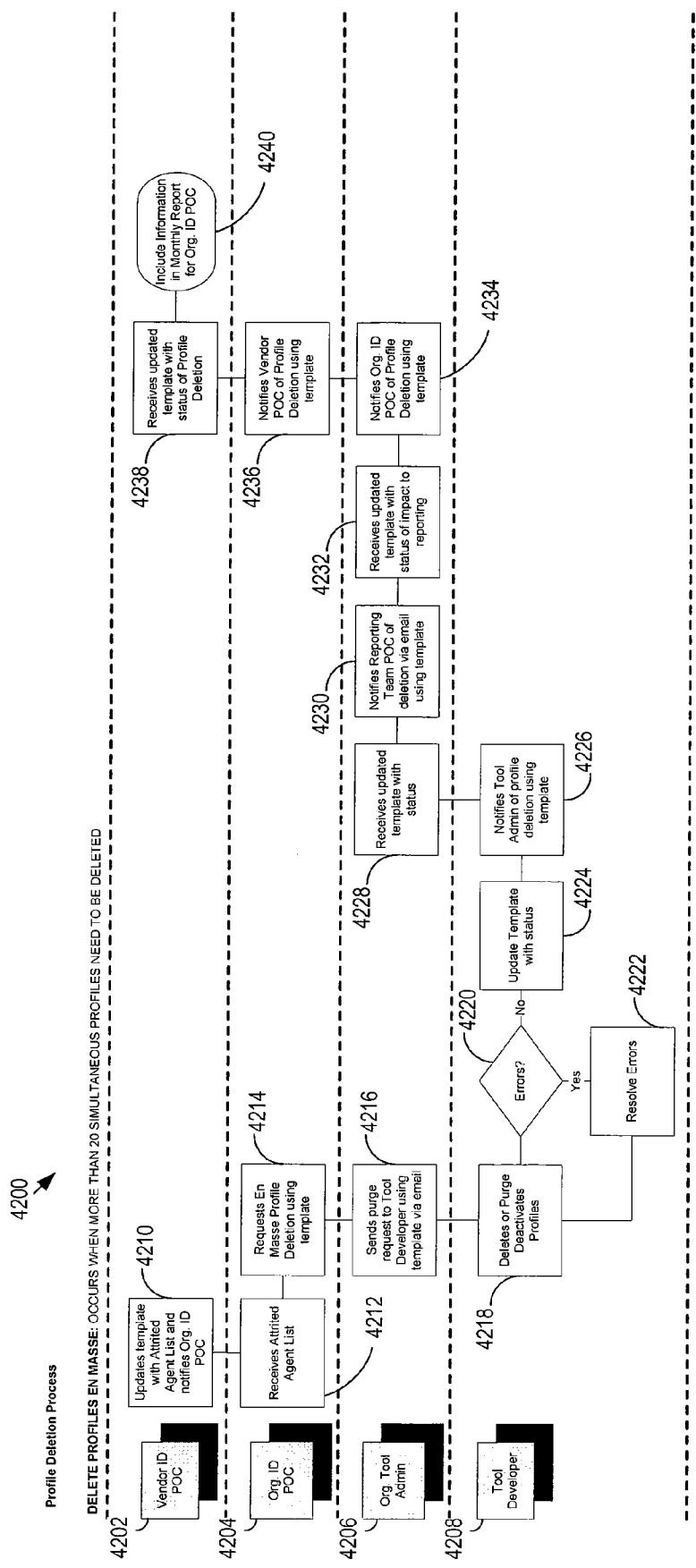
FIG. 42 shows a process flow for deletion of multiple profiles.

FIG. 42 shows a process flow 4200 for deletion of multiple profiles. FIG. 42 shows the interaction between the vendor 4202, system host 4204, tool admin 4206, and tool developer 4208. The process flow 4200 may be used, for example, for deletion of multiple profiles (e.g., more than 20 at once). The vendor 4202 updates a request template with attrited agent list (e.g., resulting from the attrition of agents) (4210) and communicates the request template to the system host 4204 (4212). The system host 4204 communicates a request for a global profile deletion using the request template comprising the attrited agent list (4214). The tool admin 4206 communicates the deletion request to the tool developer 4208 using the request template comprising the attrited agent list (4216). During an attempt to delete and/or purge the profiles of the agents corresponding to the attrited agent list (4218) by the tool developer 4208, in the event errors occur (4220), the tool developer attempts to resolve the errors (4222). In the event no errors occur during an attempt to delete and/or purge the profiles of the agents, the tool developer 4208 updates the request template with the deletion and/or purge status of the profiles (4224). The tool developer 4208 communicates the profile deletion and/or purge to the tool admin 4206 using update request status (4226 and 4228). The tool admin 4206 communicates the updated request status to the reporting team (4230) and the reporting team updates the request template with status regarding the impact of the profile deletion and/or purge to reporting (4232). The tool admin 4206 communicates the profile deletion and/or purge to the system host 4204 using the updated request template (4234). The system host 4204 communicates the profile deletion and/or purge to the vendor 4202 (4236 and 4238), and the vendor 4202 may include the information in the monthly report for the system host 4204 (4240).

Figure 43:
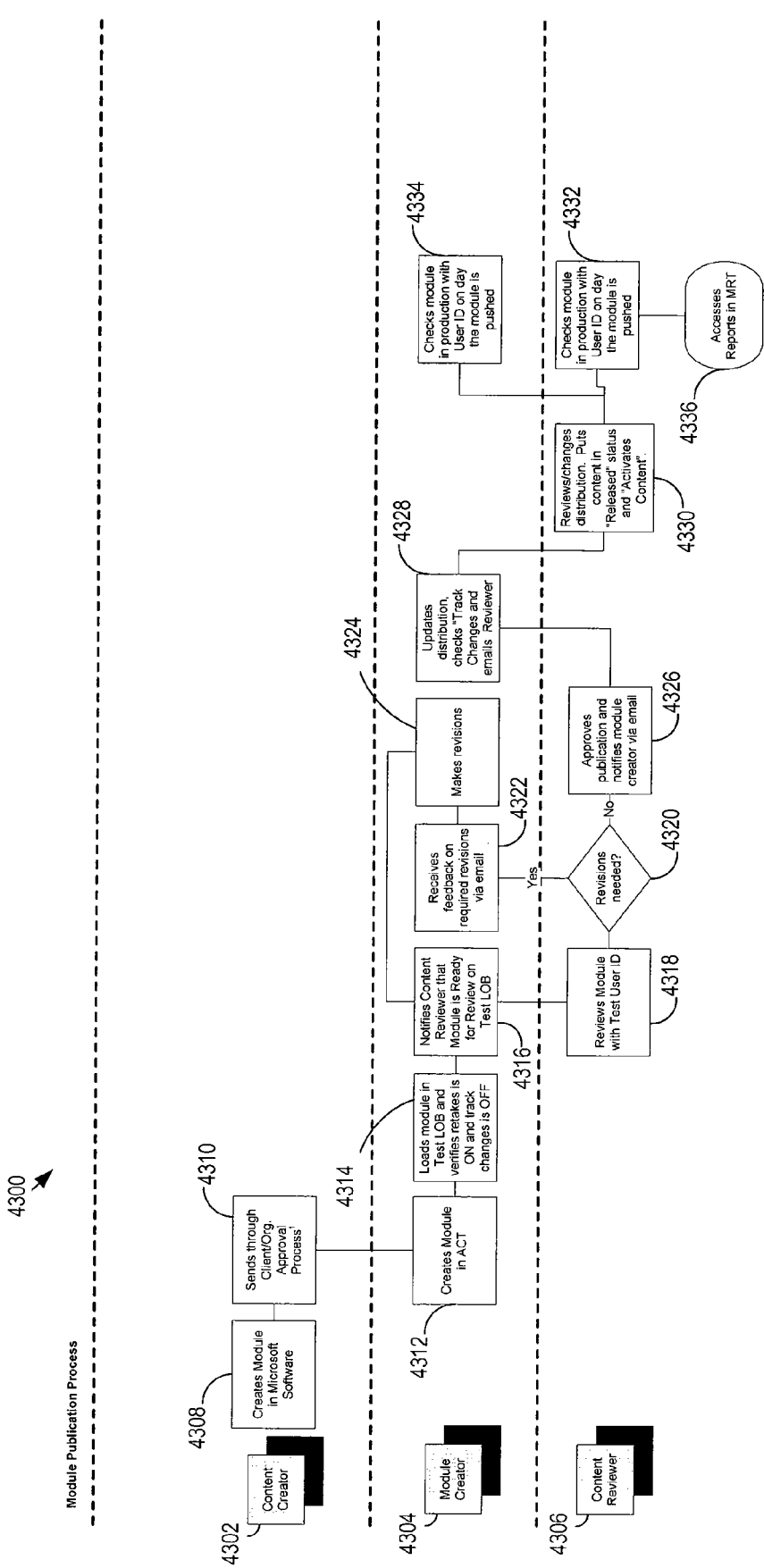
FIG. 43 illustrates a module publication process.

FIG. 43 illustrates a module publication process 4300. FIG. 43 shows the interaction between the content creator 4302, the module creator 4304, and the content reviewer 4306. The process flow 4300 may be used, for example, for publishing a module that includes call center agent content to be delivered to one or more agents. The content creator 4302 may create a module using a particular software tool (e.g., Microsoft Word and/or PowerPoint) (4308) and communicate the module to a review and approval process (e.g., quality team) (4310). The module creator 4304 creates the module in ACT 100 (4312), loads the module into the test LOB and verifies retakes is 'ON' and track changes is 'OFF' (4314). The retake option may be set during content creation in order to allow an agent to review content and answer questions more than once. The module creator 4304 communicates to the content reviewer 4306 that the module is ready for review on the test LOB (4316). The content reviewer 4306 reviews the module with a test user identifier (4318) and determines whether revisions are required (4320). In the event revisions are required, the module creator 4304 receives feedback from the content reviewer 4306 (4322) and the module creator 4304 makes revisions to the module accordingly (4324). In the event no revisions are required, the content reviewer 4306 approves the publication of the module to ACT 100 and communicates the same to the module creator 4304 (4326). The module creator 4304 updates the distribution, checks the track changes (4328) and communicates the distribution and track changes to the content reviewer 4306. The content reviewer 4306 reviews and may change the distribution, places the content in a 'released' status and activates the content (4330). The module creator 4304 and/or the content reviewer 4306 check the module in production with the user identifier (4332 and 4334), and the content review 4306 accesses the reports in the MRT (4336).

Figure 44:
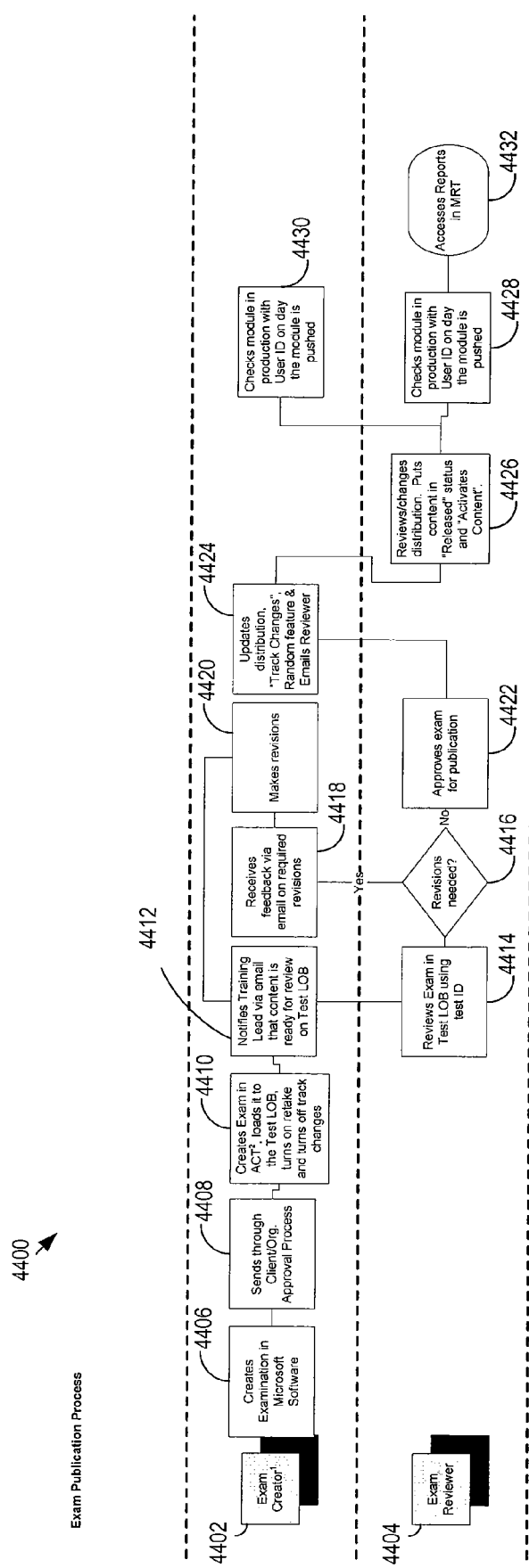
FIG. 44 illustrates a examination publication process.

FIG. 44 illustrates an examination publication process 4400. FIG. 44 shows the interactions between the exam creator 4402 and the exam reviewer 4404. The exam creator 4402 may create an examination using a particular tool (e.g., Microsoft Word and/or PowerPoint) (4406) and communicate the examination to a review and approval process (e.g., quality review board) (4408). The exam creator 4402 may create the exam in the ACT 100, load the exam into the test LOB, turn on 'retake' and turn off track changes (4410). The exam creator 4402 may notify the exam reviewer 4404 (e.g., training lead) that the content is ready for review on the test LOB (4412). The exam reviewer 4404 reviews the exam in the test LOB using a test user identifier (4414). In the event revisions are required to the exam (4416), the exam creator 4402 receives feedback from the exam reviewer 4404 (4418) and the exam creator 4402 makes the requisite modifications to the exam (4420). In the event no revisions are required, the exam reviewer 4404 approves the exam for publication (4422) and communicates the approval to publish the exam to the exam creator 4402. The exam creator 4402 updates the distribution, track changes and random feature (4424), and communicates the same to the exam reviewer 4404. The exam reviewer 4404 reviews and may change the distribution, places the content in a 'released' status and activates the content (4426). In one implementation, the random feature randomizes the exams given to each agent. An exam may be set to randomize the order of the questions presented so that the order of the questions for each agent for a given exam is different. Alternatively, an exam may be set to randomize the actual questions used so that agents are presented different questions from a pool of questions. The exam creator 4402 and/or the exam reviewer 4404 check the module in production with the user identifier (4428 and 4430), and the exam review 4404 accesses the reports in the MRT (4432).

Figure 45:
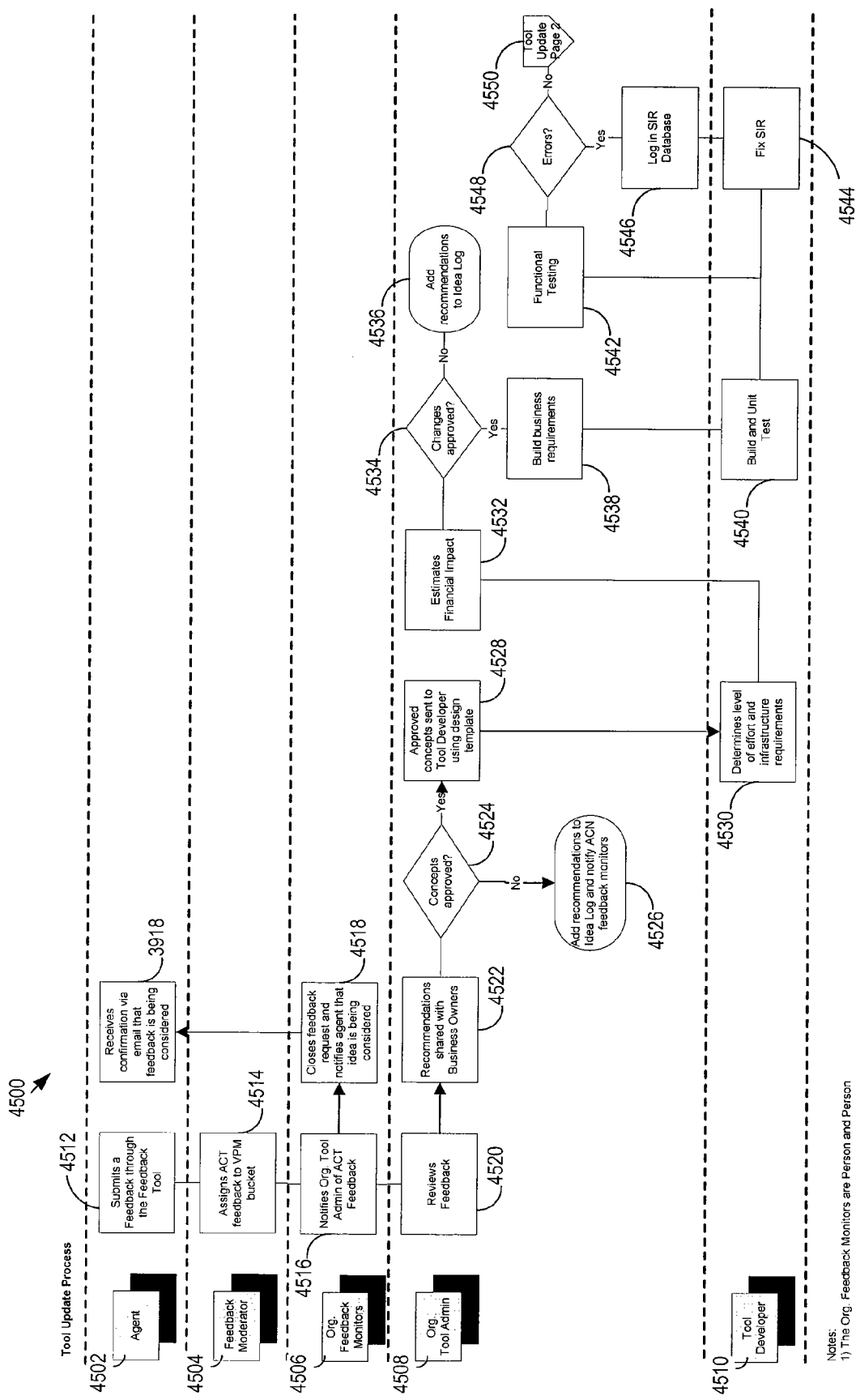
FIG. 45 illustrates a tool update process.
Figure 46:
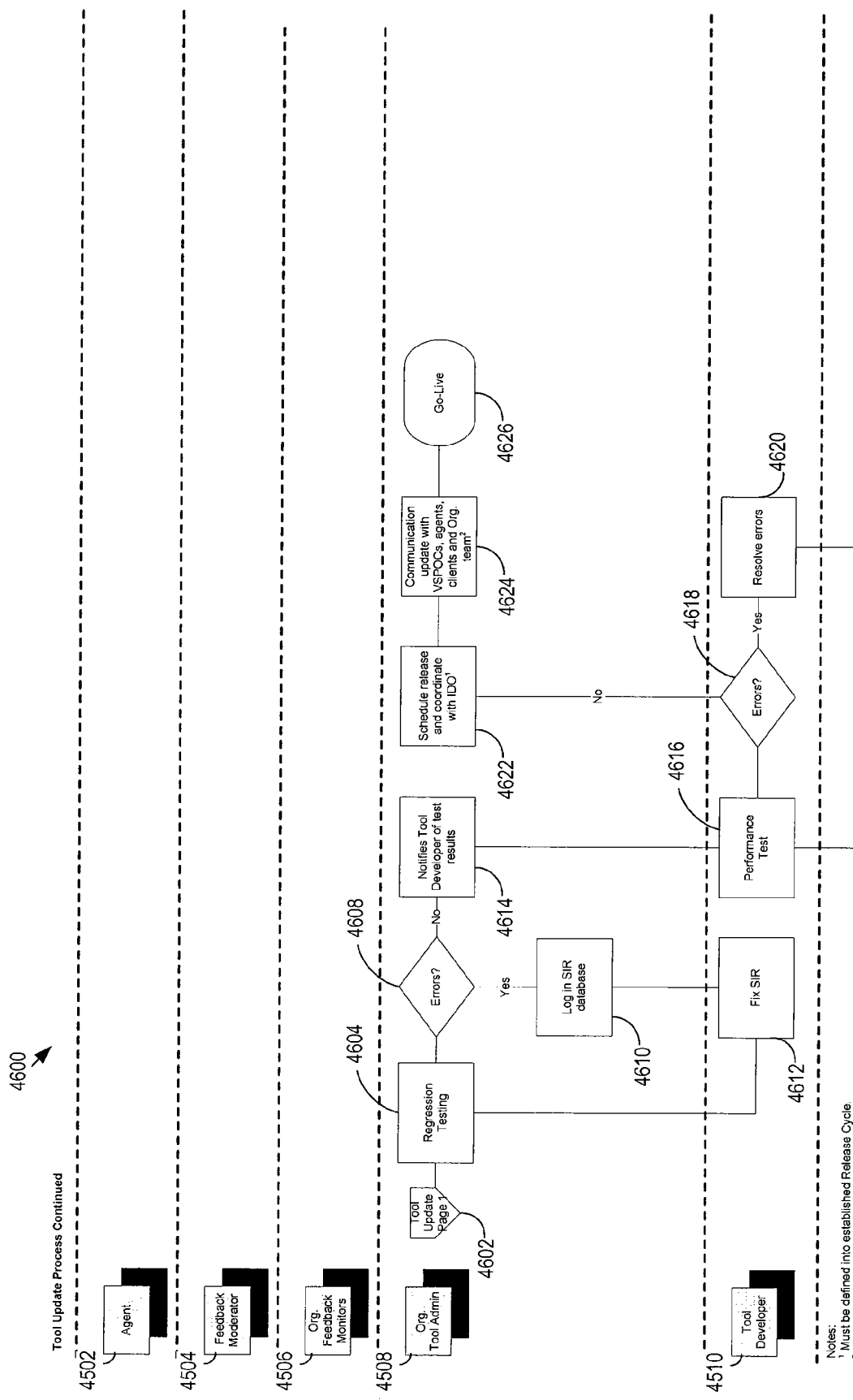
FIG. 46 shows additional flow for a tool update process.

FIG. 45 illustrates a tool update process 4500. FIG. 45 shows the interactions between the agent 4502, the feedback moderator 4504, the system feedback monitors 4506, the tool administrator 4508, and the tool developer 4510. The process 4500 may represent the mechanism for requesting updates or changes to the call center tool. FIG. 46 shows additional flow 4600 for the tool update process. The agent 4502 may submit a feedback through the feedback tool to the feedback moderator 4504 (4512). The feedback moderator 4504 assigns ACT feedback to the vendor performance management (VPM) bucket (4514). The system feedback monitors 4506 communicate the ACT feedback to the tool administrator 4508 (4516), and closes feedback request and notifies the agent 4502 that the idea is being considered (4518). The tool administrator 4508 reviews the feedback (4520) and shares recommendations with business owners (4522). In the event the recommendation is not approved (4524), the tool administrator 4508 includes the recommendation is included in the idea log and notifies the feedback monitors 4506 (4526). In the event the recommendation is approved, the recommendation is communicated to the tool developer 4510 using a design template (4528). The tool developer 4510 determines the level of effort and resources (e.g., infrastructure) required to implement the recommendation (4530). The tool administrator 4508 estimates the financial impact of implementing a tool corresponding to the recommendation (4532). In the event the tool administrator 4508 does not approve the financial estimates (4534) then the recommendation is included in the idea log and notifies the feedback monitors 4506 (4536). In the event the tool administrator 4508 approves the financial estimates, the tool administrator 4508 prepares the business requirements corresponding to the tool (4538), and the tool developer 4510 develops and unit tests the tool (4540). The tool administrator 4508 performs functional testing (4542) and the tool developer performs fix 'SIR' (e.g., resolve a system investigation request) (4544). The tool administrator 4508 logs functional testing errors in a SIR database (4546). In the event the tool completes functional testing without error (4548 and 4550) the tool administrator 4508 performs regression testing on the tool (referring to FIG. 46, 4602 and 4604).

In the event the tool admin 4508 identifies regression testing errors (4608), the errors are logged in the SIR database (4610) and the tool developer 4510 resolves the SIR (4612). The tool administrator 4508 communicates the regression testing results to the tool, developer 4510 (4614). The tool developer 4510 conducts performance testing (4616) identifies errors (4618) and resolves errors corresponding to the performance testing (4620). The tool administrator 4510 schedules the release of the tool (4622) and coordinates with intra-day operations (IDO). The tool administrator 4510 communicates the availability of the tool (4624) and the tool is made operational (4626).

Figure 47:
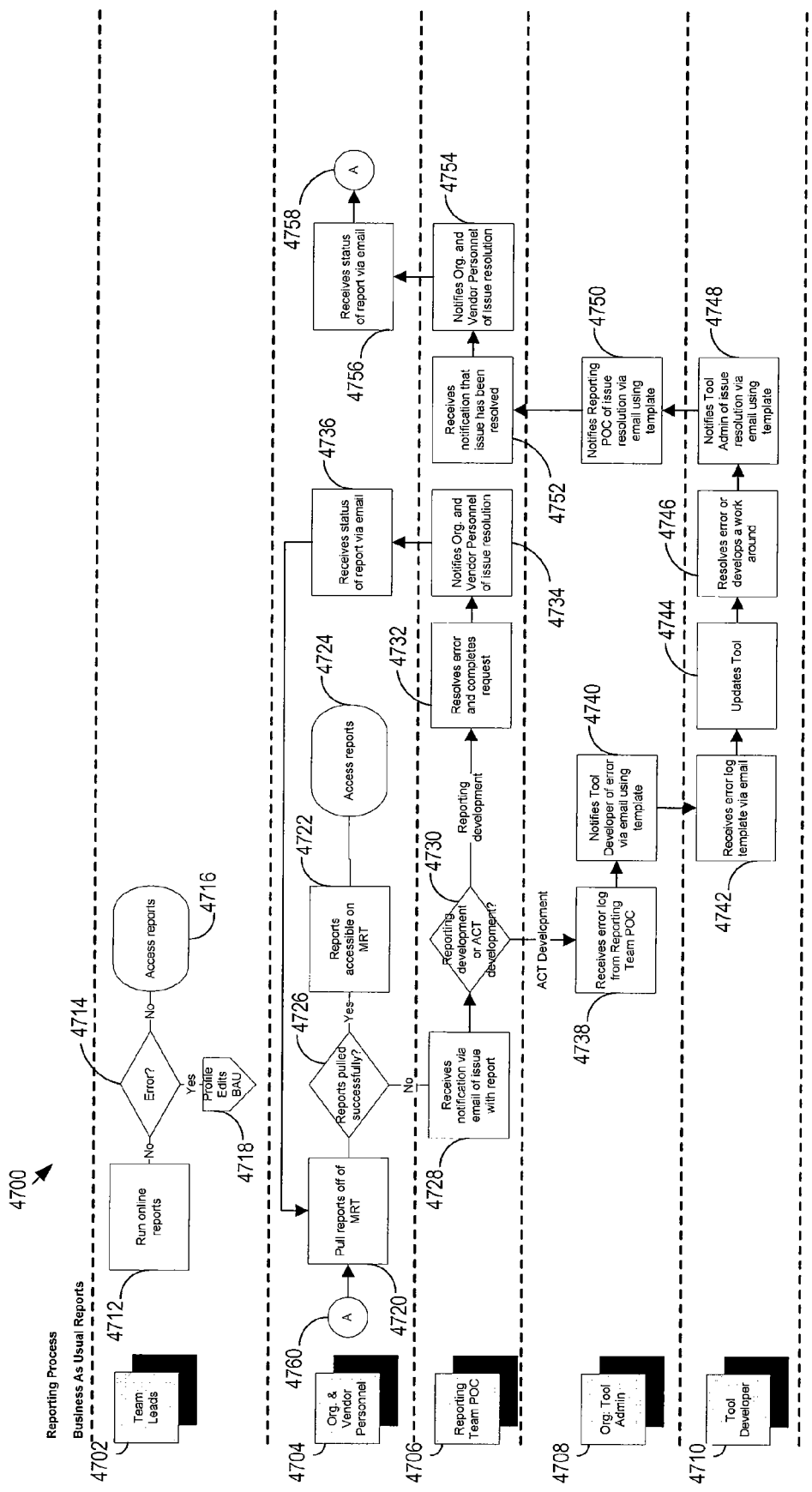
FIG. 47 illustrates a process flow for selected reporting.

FIG. 47 illustrates a process flow 4700 for selected reporting. The process flow 4700 shows the interactions between the team leads 4702, the system and vendor personnel 4704, the reporting team 4706, the system tool admin 4708, and the tool developer 4710. Team leads 4702 may access on-line reports (4712). In the event an error occurs (4714) corresponding to a request for access to a report (4716), profile edits may be required (e.g., updated BAU reports) (4718). The system and vendor personnel 4704 may attempt to access reports on MRT (4720) from a list of reports accessible on MRT (4722) and successfully accesses reports on MRT (4724). In the event a request for access to a report is unsuccessful (4726), the reporting team 4706 receives notifications regarding unsuccessful requests for access to the reports (4728). The reporting team 4706 determines whether the error corresponds to reporting development or ACT development (4730). In the event the error corresponds to reporting development, the reporting team 4706 resolves the error and completes the request for access to the report (4732), and notifies the system and vendor personnel 4704 that the issue has been resolved (4734 and 4736). In the event the error corresponds to ACT development, the system tool admin 4708 receives the error log from the reporting team 4706 (4738) and communicates the error log to the tool developer 4710 using a template (4740 and 4742). The tool developer 4710 updates the tool in response to the error (4744) and resolves the error and/or develops a work around in response to the error (4746). The tool developer 4710 notifies the system tool admin 4708 regarding the issue resolution (e.g., via e-mail) using the template (4748). The system tool admin 4708 communicates the issue resolution to the reporting team 4706 (4750 and 4752). The reporting team 4706 communicates the issue resolution to the system and vendor personnel 4704 (4754 and 4756). The system and vendor personnel 4704 attempt to access the reports on MRT (4758 and 4760).

Figure 48:
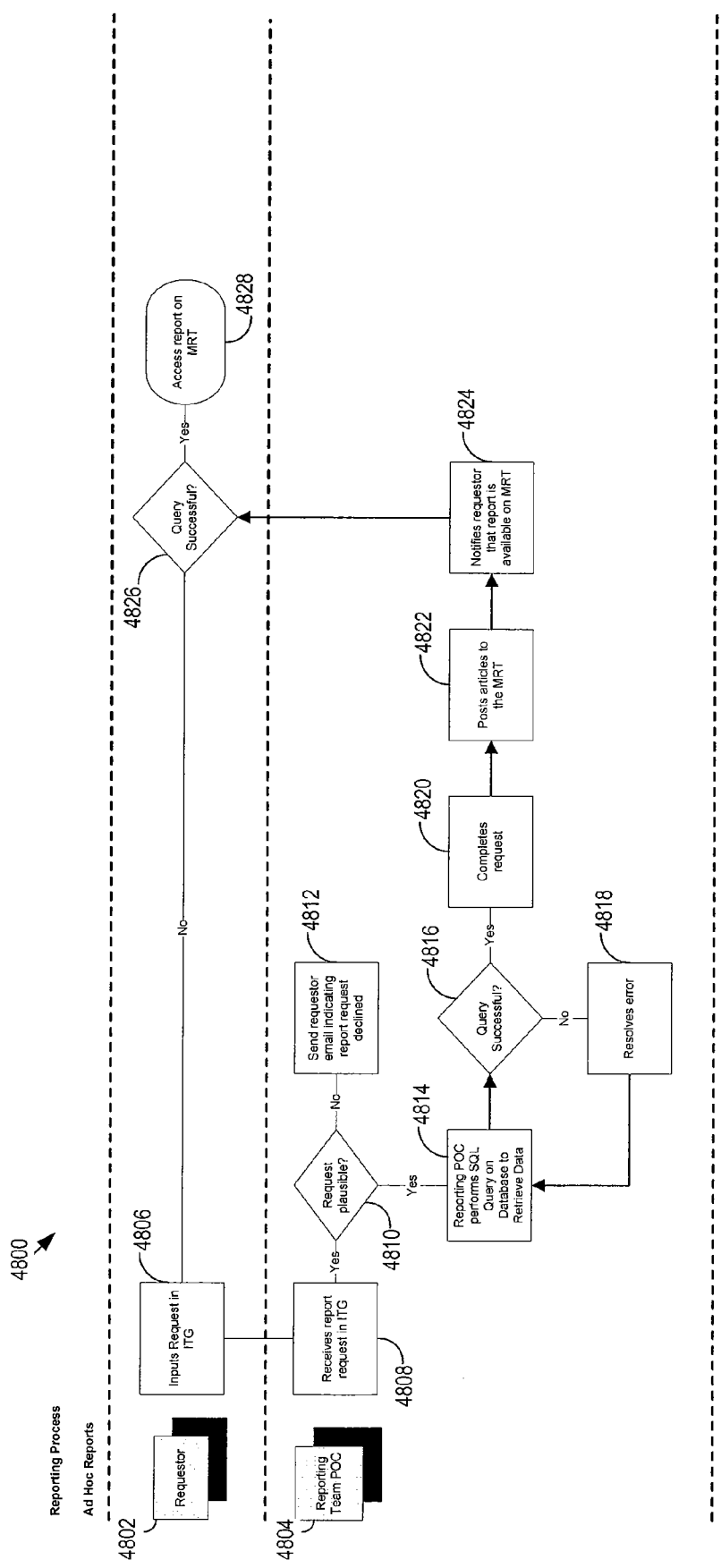
FIG. 48 illustrates a process flow for ad-hoc reporting.

FIG. 48 illustrates a process flow 4800 for ad-hoc reporting. The process flow 4800 shows the interactions between the requester 4802 and the reporting team point of contact (POC) 4804. The requester 4802 may input a request in 'ITG' (e.g., an information technology governance and/or procedural rules package) (4806) and the reporting team 4804 may receive the report request in 'ITG' (4808). In the event the reporting team 4804 determines that the report request is implausible (4810) then the reporting team 4804 declines the report request (4812). In the event the reporting team 4804 determines the report request is plausible, then the reporting team 4804 performs a structured query language (SQL) query against the database to retrieve the data for the requested report (4814). The reporting team 4804 may perform (4816) and refine (e.g., resolve errors related to the query) (4818) the SQL query until the query completes successfully (4820). In the even the query is successful, the reporting team 4804 completes the report request and the report (e.g., articles) is posted to the MRT (4822). The reporting team 4804 communicates the availability of the report to the requester 4802 (4824). The requester 4802 attempts a query to access the report (4826), and in the event the query is successful, accesses the report on MRT (4828).

Figure 49:
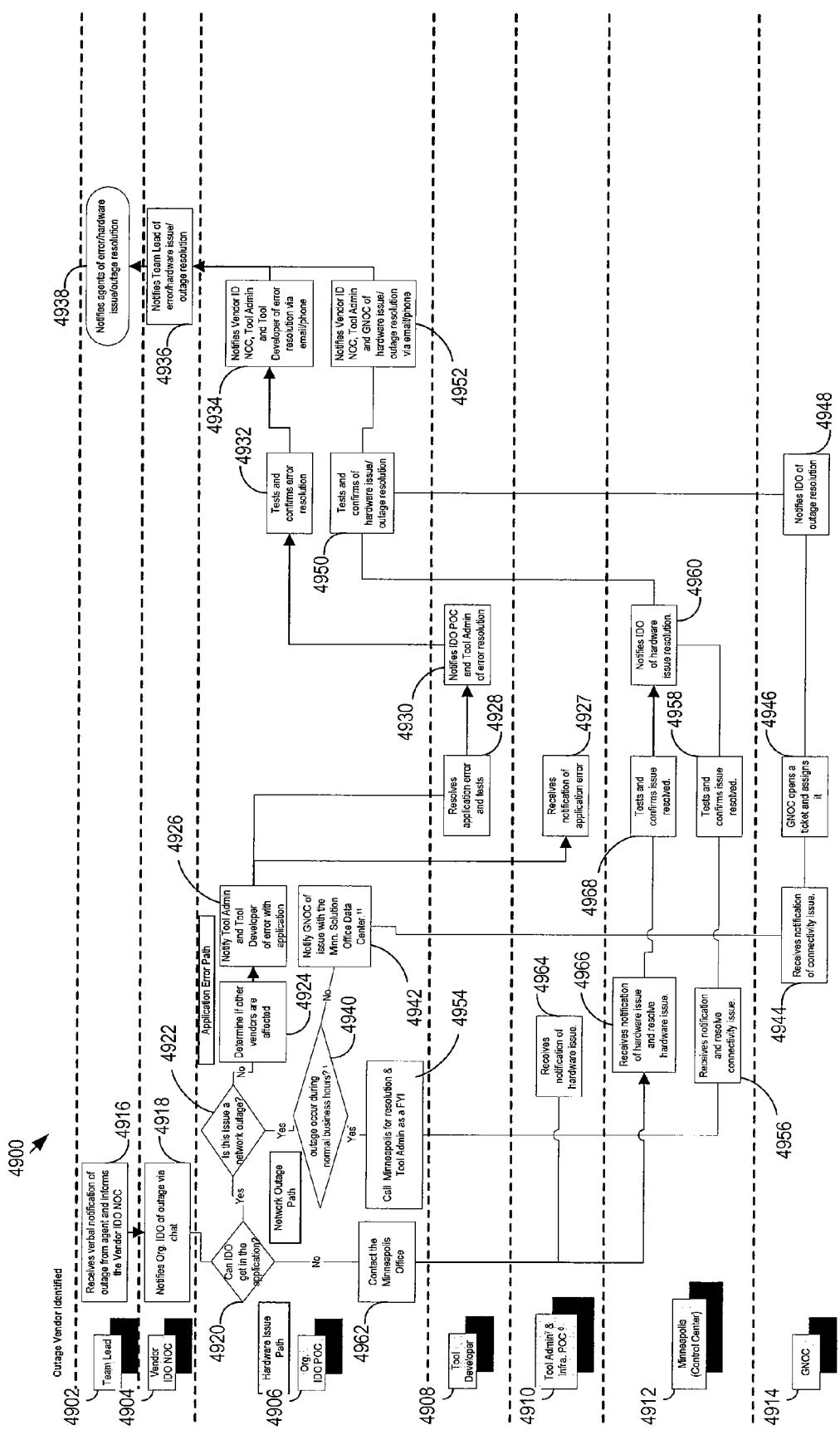
FIG. 49 shows a process flow for handling a vendor identified outage.

FIG. 49 shows a process flow 4900 for handling a vendor identified outage. FIG. 49 shows the interactions between the team lead 4902, vendor 4904, and the system POC 4906. FIG. 49 also shows the interaction between the tool developer 4908, the tool admin 4910, a control center 4912 (e.g., Minneapolis), and the global network operations center (GNOC) 4914. The team lead 4902 may receive a notification regarding an outage from an agent and the team lead 4902 communicates the outage to the vendor 4904 (4916). The vendor 4904 communicates the outage to the system POC 4906 (4918).

In the event the 'IDO' can access the application corresponding to the outage (4920) and the system POC 4906 determines that the issue is not related to a network outage (4922), then the system POC 4906 determines whether other vendors are affected by the outage (4924). The system POC 4906 notifies the tool admin 4910 and the tool developer 4908 regarding the outage (4926 and 4927). The tool developer 4908 resolves the application error and tests the solution (4928), and communicates the error resolution to the system POC 4906 and the tool admin 4910 (4930). The system POC 4906 tests and confirms the error resolution (4932) and communicates the error resolution to the vendor 4904, the tool admin 4910 and the tool developer 4908 (4934). The vendor 4904 communicates the outage resolution to the team lead 4902 (4936) and the team lead 4902 communicates the same to the agent (4938).

In the event the 'IDO' can access the application corresponding to the outage (4920) and the system POC 4906 determines that the issue is related to a network outage (4922), the system POC 4906 determines whether the outage occurred during normal business hours (4940). In the event the outage did not occur during normal business hours then the outage is communicated to the GNOC of the appropriate control center 4912 (4942 and 4944). The GNOC 4914 opens an issue tracking ticket and assigns the issue tracking ticket for resolution (4946), tracks the resolution of the issue and communicates the resolution to the system POC 4906 (4948). The system POC 4906 tests and confirms the issue resolution (4950) and communicates the issue resolution to the vendor 4904 and the GNOC 4914 (4952). The vendor 4904 communicates the outage resolution to the team lead 4902 (4936) and the team lead 4902 communicates the same to the agent (4938).

In the event the 'IDO' can access the application corresponding to the outage (4920), and the system POC 4906 determines that the issue is related to a network outage (4922) and the outage occurred during normal business hours (4940) then the system POC 4906 contacts the control center 4912 to have the issue resolved and communicates the situation to the tool admin 4910 (4954). The control center 4912 resolves the connectivity issue (4956), tests and confirms the issue has been resolved (4958) and communicates the issue resolution to the system POC 4906 (4960). The system POC 4906 tests and confirms the issue resolution (4950) and communicates the issue resolution to the vendor 4904 and the GNOC 4914 (4952). The vendor 4904 communicates the outage resolution to the team lead 4902 (4936) and the team lead 4902 communicates the same to the agent (4938).

In the event 'IDO' cannot access the application corresponding to the outage (4920), the system POC 4906 contacts the control center 4912 (4962) and communicates the outage to the tool admin 4910 (4964). The control center 4912 resolves the hardware issue (4966), tests and confirms that the issue has been resolved (4968) and communicates the issue resolution to the system POC 4906 (4960). The system POC 4906 tests and confirms the issue resolution (4950) and communicates the issue resolution to the vendor 4904 and the GNOC 4914 (4952). The vendor 4904 communicates the outage resolution to the team lead 4902 (4936) and the team lead 4902 communicates the same to the agent (4938).

Figure 50:
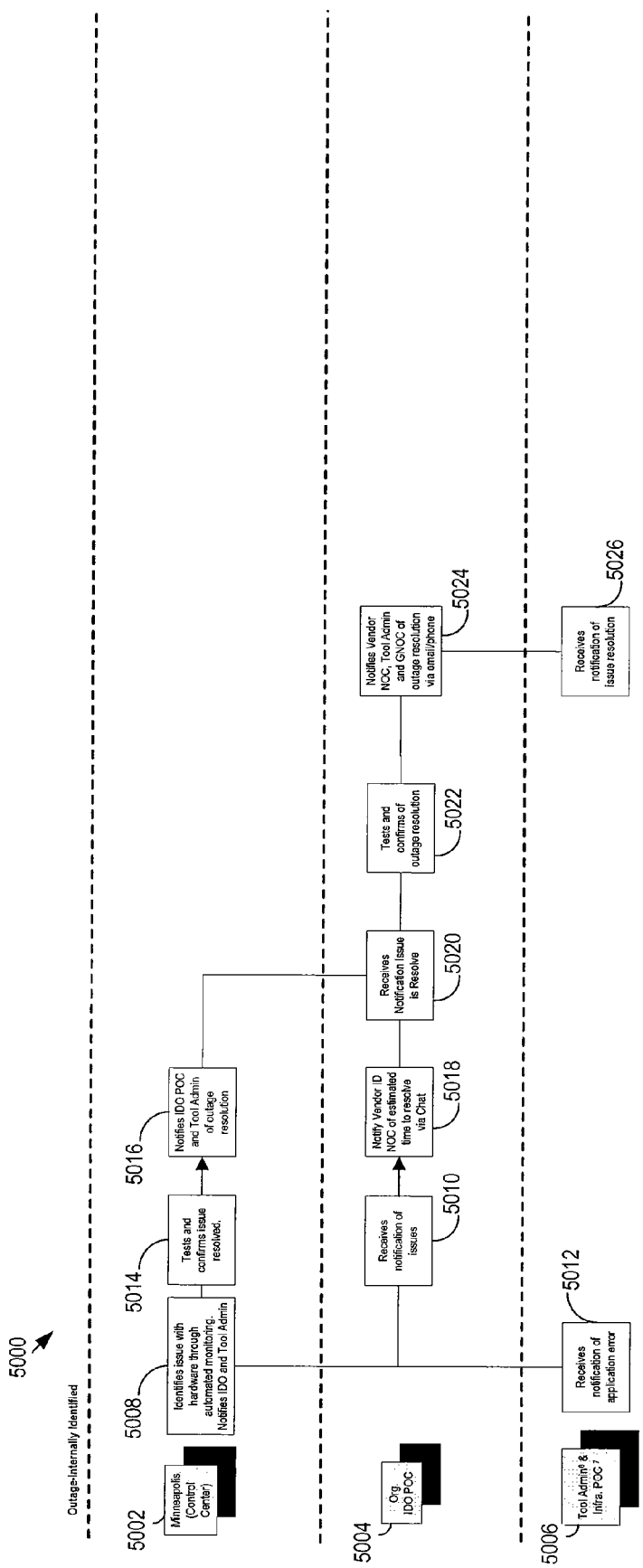
FIG. 50 shows a process flow for handling an internally identified outage.

FIG. 50 shows a process flow 5000 for handling an internally identified outage. FIG. 50 illustrates the interactions between the control center 5002 (e.g., Minneapolis), the system 5004, and the admin and infrastructure POC 5006. The control center 5002 may identify an issue with hardware through automated monitoring (5008), and communicate the situation to the system 5004 (5010) and the tool admin and infrastructure POC 5006 (5012). The control center 5002 tests and confirms the issue resolution (5014) and communicates the issue resolution to the system 5004 and the tool admin and infrastructure POC 5006 (5016). The system 5004 communicates the estimated time to resolve the issue with the vendor (5018). The system 5004 tests and confirms the resolution of the issue communicated by the control center 5002 (5022). The system 5004 communicates the resolution of the issue, after testing and confirming the same, to the vendor, the GNOC and the admin and infrastructure POC 5006 (5024 and 5026).

Figure 51:
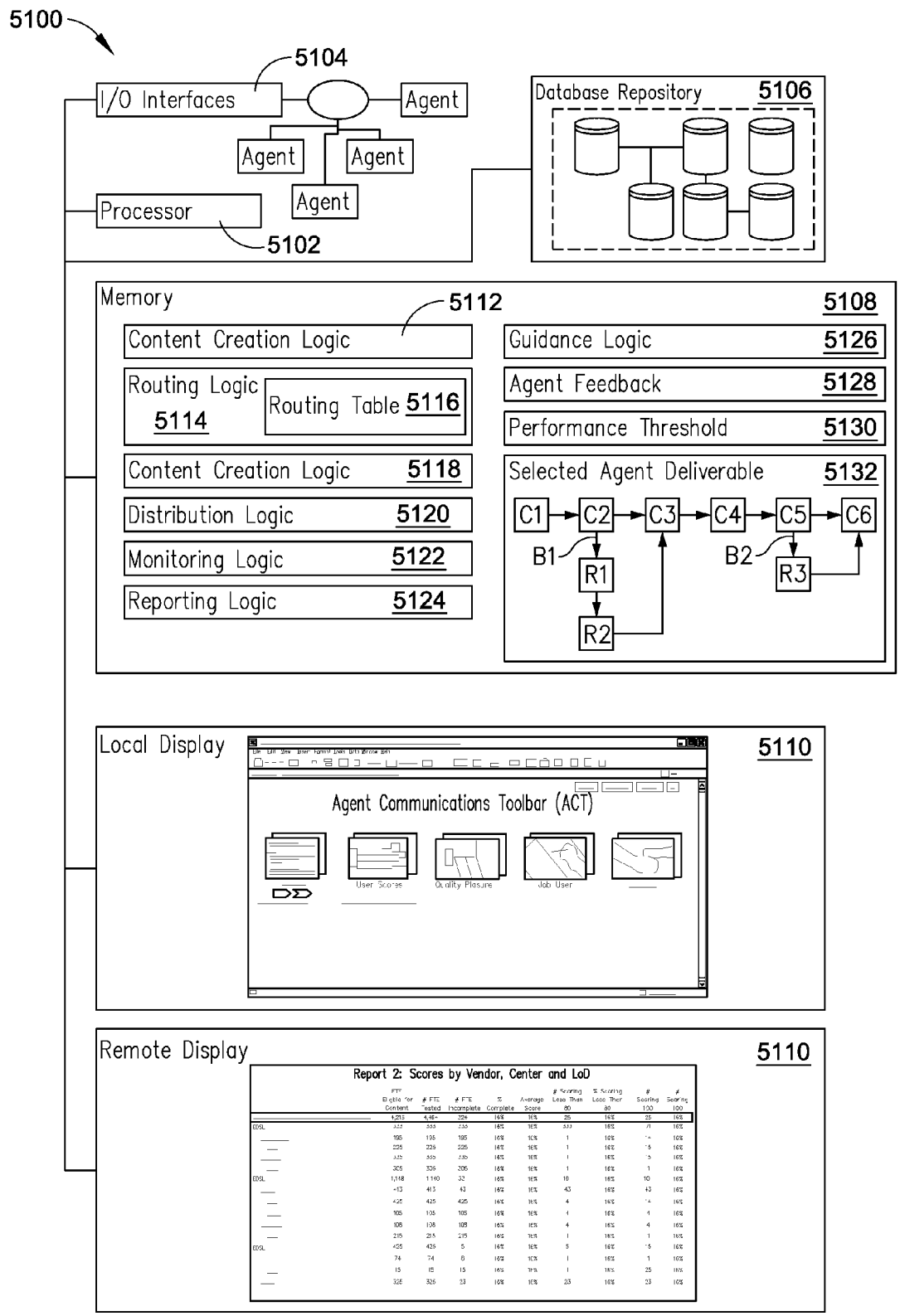
FIG. 51 shows an example of a call center communication and compliance monitoring system.

FIG. 51 shows a call center communication and compliance monitoring system 5100 ("system 5100"). The system 5100 includes a processor 5102, input/output interfaces 5104, and a database repository 5106. The I/O interfaces 5104 may implement a keyboard interface, mouse interface, touchscreen, voice recognition interface, network communication interface, or any other I/O interface.

The system 5100 also includes a memory 5108, and one or more local or remote displays 5110. The displays 5110 may include a local display on an agent desktop through which the system 5100 generates an agent interface including hyperlinks to call center agent content deliverables (e.g., WPAs, electronic desk drops, and exams). The displays 5110 may also include a remote display on a management desktop through which reports on call center agents are viewed.

The database repository 5106 includes a collection of information specific to the call center activities and agent monitoring data. The data may include examination statistics (e.g., examination results, number of exams taken, and other statistics), call center agent compliance statistics (e.g., the number of electronic drop sheets received, read, and examined), or other data. The call center data model 5112 through which the database repository 5106 is organized is discussed below.

Logic in the memory 5108 facilitates the call center communication and compliance monitoring. In the example shown in FIG. 51, the memory 5108 includes content creation logic 5112, and routing logic 5114 including a real-time modifiable routing table 5116. The routing table 5116 stores group definitions that include group attributes. The group definitions may be attached to call center agent records to join the call center agent into any number of groups. The group attributes may specify any agent characteristic (e.g., LoB, or delivery center) that may be used for directed content to an agent.

The routing logic 5114 is operable to access the real-time modifiable routing table 5116 and match the group definitions against the desired recipient characteristics to determine matching call center agents. The memory 5108 also includes distribution logic 5120. The distribution logic 5120 is operable to communicate the call center agent content deliverables to the matching call center agents. The distribution logic 5120 may include email logic, file transfer logic, or other communication logic.

The memory 5108 also includes monitoring logic 5122. In a web server implementation, the monitoring logic 5122 watches for agent clicks on specific links, collects examination answers through the web interface, and otherwise monitors agent interactions with the home page 102. In other implementations, the agent may have a dedicated tool on their machine that receives and displays content and interacts with the agent, and the dedicated tool may then return content access data to the monitoring logic. The monitoring logic 5122 may store any of the monitoring information in the call center database 5106 in preparation for reporting.

The reporting logic 5124 generates access statistics based on the information received by the monitoring logic 5122. The reporting logic may store the access statistics in the call center database 5106. The reporting logic may also generate reports based on the access statistics as described above. As one example, the reports may include a real-time local management report expressing compliance with execution of the call center agent deliverables by the matching call center agents. As another example, the reports may include a real-time remote management report expressing compliance with execution of the call center agent deliverables by the matching call center agents and communicating the real-time remote management report to a remote monitoring location.

The system 5100 may also use the processor 5102 to execute guidance logic 5126. The guidance logic 5126 tracks execution of a selected call center agent deliverable (e.g., the deliverable 5132) that has been communicated to a call center agent for review. As the call center agent interacts with the deliverable, the guidance logic 5126 receives agent feedback 5128 specific to the selected call center deliverable 5132. For example, the selected call center agent deliverable 5132 may be a training guide, and the agent feedback may be the agent's answers to questions posed to the agent by the training guide.

The guidance logic 5126 determines whether the agent feedback 5128 meets a performance threshold 5130. As one example, the agent feedback 5128 may fail to meet the performance threshold 5130 where the agent chooses a partially correct answer from a choice of one correct answer and multiple partially correct answers. The performance threshold may be defined in other ways, and there may be multiple thresholds individually assigned to any section or across multiple sections of the selected call center agent deliverable 5132.

When the agent feedback 5128 fails to meet the performance threshold 5130, the guidance logic 5126 may branch execution of the selected call center agent deliverable 5132 to a performance re-enforcement deliverable section within the selected call center agent deliverable 5132. In the example shown in FIG. 51, the selected call center agent deliverable 5132 includes six core content sections C1, C2, C3, C4, C5, and C6. At the core content section C2, the guidance logic 5126 obtains agent feedback 5128. When the agent feedback 5128 does not meet the performance threshold 5130, the guidance logic 5126 may take the branch B1 and deliver the re-enforcement deliverable sections R1 and R2 to the agent, instead of moving directly to the next core content section C3. Similarly, the guidance logic 5126 again obtains at section C5 agent feedback 5128. When the agent feedback 5128 does not meet the performance threshold 5130, the guidance logic 5126 may take the branch B2 and deliver the re-enforcement deliverable section R3 to the agent, instead of the next core content section C6.

The following database schema applies to the data models shown in FIG. 52 through FIG. 61.

TABLE

| Database Schema | | | |
| --- | --- | --- | --- |
| Table | Column | Type | Null/Not Null |

TABLE-continued

Database Schema

| | | | |
|---|---|---|---|
| CCTT_EXAM | SECT_EXAM_ID, | int IDENTITY (1, 1) | NOT NULL |
| | SECT_EXAM_TTL_NM | varchar (1000) | NULL |
| | PIC_FILE_PATH_TXT | varchar (100) | NULL |
| | SCEN_SECT_ID | int | NOT NULL |
| | SECT_EXAM_PG_NBR | int | NOT NULL |
| | SECT_EXAM_TXT | varchar (1000) | NULL |
| CCTT_EXAM_FDBK | FDBK_ID | int IDENTITY (1, 1) | NOT NULL |
| | FDBK_TXT | varchar (1000) | NOT NULL |
| | FDBK_SUMM_VAL | int | NULL |
| | SCEN_SECT_ID | int | NULL |
| | AUD_FILE_PATH_TXT | varchar (100) | NULL |
| | IMG_FILE_PATH_TXT | varchar (100) | NULL |
| | FDBK_TTL_TXT | varchar (1000) | NULL |
| | FDBK_NBR | int | NOT NULL |
| CCTT_EXAM_QUEST | SECT_PG_QUEST_ID | int IDENTITY (1, 1) | NOT NULL |
| | SECT_PG_QUEST_TXT | varchar (1000) | NULL |
| | SECT_EXAM_ID | int | NOT NULL |
| | PIC_FILE_PATH_TXT | varchar (100) | NULL |
| | AUD_FILE_PATH_TXT | varchar (100) | NULL |
| CCTT_EXAM_RESP | SECT_PG_QUEST_RESP_ID | int IDENTITY (1, 1) | NOT NULL |
| | SECT_PG_QUEST_RESP_TXT | varchar (1000) | NULL |
| | SECT_PG_QUEST_ID | int | NOT NULL |
| | SECT_PG_QUEST_RESP_NM | varchar (1000) | NOT NULL |
| | RESP_ANS_COR_CDE | int | NOT NULL |
| | NEXT_SECT_PG_ID | varchar (100) | NOT NULL |
| | FDBK_NBR | int | NULL |
| | PIC_FILE_PATH_TXT | varchar (50) | NULL |
| | AUD_FILE_PATH_TXT | varchar (50) | NULL |
| CCTT_EXAM_RSLT | SCEN_ID | int | NOT NULL |
| | USR_ID | int | NOT NULL |
| | SCEN_USR_RUN_QTY | int | NOT NULL |
| | SCEN_SECT_SCORE_VAL | int | NOT NULL |
| | SCEN_BEST_CMPLT_DT | datetime | NOT NULL |
| CCTT_EXAM_RSLT_HIST | USR_ID | int | NOT NULL |
| | EXAM_RSLT_CMPLT_TS | datetime | NOT NULL |
| | SECT_PG_QUEST_ID | int | NOT NULL |
| | SECT_PG_QUEST_RESP_ID | int | NOT NULL |
| CCTT_EXAM_SECT | SCEN_SECT_ID | int IDENTITY (1, 1) | NOT NULL |
| | SCEN_SECT_NM | varchar (1000) | NOT NULL |
| | SCEN_ID | int | NOT NULL |
| | SCEN_SECT_NBR | int | NOT NULL |
| | SCEN_SECT_TXT | varchar (1000) | NULL |
| | SECT_AUD_FILE_PATH_TXT | varchar (100) | NULL |
| | SECT_PIC_FILE_PATH_TXT | varchar (100) | NULL |
| | FDBK_NBR | int | NULL |
| CCTT_FDBK | FDBK_ID | int IDENTITY (1, 1) | NOT NULL |
| | FDBK_TXT | varchar (1000) | NULL |
| | FDBK_SUMM_VAL | int | NULL |
| | SECT_PG_QUEST_RESP_ID | int | NULL |
| | AUD_FILE_PATH_TXT | varchar (100) | NULL |
| | IMG_FILE_PATH_TXT | varchar (100) | NULL |
| | FDBK_TTL_TXT | varchar (1000) | NULL |
| | SCEN_SECT_ID | int | NULL |
| | FDBK_NBR | int | NOT NULL |
| CCTT_QUEST_RESP | SECT_PG_QUEST_RESP_ID | int IDENTITY (1, 1) | NOT NULL |
| | SECT_PG_QUEST_RESP_TXT | varchar (1000) | NULL |
| | SECT_PG_QUEST_RESP_NM | varchar (1000) | NULL |
| | SECT_PG_QUEST_ID | int | NOT NULL |
| | RESP_ANS_COR_CDE | int | NOT NULL |
| | NEXT_SECT_PG_ID | varchar (100) | NOT NULL |
| | FDBK_NBR | int | NULL |
| | PIC_FILE_PATH_TXT | varchar (100) | NULL |
| | AUD_FILE_PATH_TXT | varchar (100) | NULL |
| | REL_TOPIC_NBR | int | NULL |
| | INIT_FDBK_NBR | int | NULL |
| CCTT_REL_TOPIC | REL_TOPIC_ID | int IDENTITY (1, 1) | NOT NULL |
| | REL_TOPIC_TXT | varchar (1000) | NULL |
| | REL_TOPIC_FILE_PATH_TXT | varchar (100) | NOT NULL |
| | REL_TOPIC_NBR | int | NOT NULL |
| CCTT_SCEN | SCEN_ID | int IDENTITY (1, 1) | NOT NULL |
| | SCEN_NM | varchar (1000) | NOT NULL |
| | SCEN_NBR | int | NOT NULL |
| | BKGRND_IMG_PATH_TXT | varchar (100) | NULL |
| CCTT_SCEN_SECT | SCEN_SECT_ID | int IDENTITY (1, 1) | NOT NULL |
| | SCEN_SECT_NM | varchar (1000) | NULL |
| | SCEN_ID | int | NOT NULL |
| | SCEN_SECT_NBR | int | NOT NULL |
| | SCEN_SECT_TXT | varchar (1000) | NULL |

TABLE-continued

Database Schema

| Table | Column | Type | | Null/Not Null |
|---|---|---|---|---|
| | SECT_AUD_FILE_PATH_TXT | varchar (100) | | NULL |
| | SECT_PIC_FILE_PATH_TXT | varchar (100) | | NULL |
| | FDBK_NBR | int | | NULL |
| CCTT_SCEN_USR | USR_ID | int | | NOT NULL |
| | SCEN_ID | int | | NOT NULL |
| CCTT_SECT_PG | SECT_PG_ID | int IDENTITY (1, 1) | | NOT NULL |
| | SECT_PG_TTL_TXT | varchar (1000) | | NULL |
| | PIC_FILE_PATH_TXT | varchar (100) | | NULL |
| | SCEN_SECT_ID | int | | NOT NULL |
| | SECT_PG_NBR | int | | NOT NULL |
| | SECT_PG_TXT | varchar (1000) | | NULL |
| CCTT_SECT_PG_QUEST | SECT_PG_QUEST_ID | int IDENTITY (1, 1) | | NOT NULL |
| | SECT_PG_QUEST_TXT | varchar (1000) | | NULL |
| | SECT_PG_ID | int | | NOT NULL |
| | PIC_FILE_PATH_TXT | varchar (100) | | NULL |
| | AUD_FILE_PATH_TXT | varchar (100) | | NULL |
| | SECT_PG_QUEST_TYP_CDE | varchar (1000) | | NULL |
| CCTT_STORY | STORY_ID | int IDENTITY (1, 1) | | NOT NULL |
| | STORY_TTL_TXT | varchar (1000) | | NOT NULL |
| | STORY_PATH_TXT | varchar (100) | | NOT NULL |
| | STORY_CAT_TXT | varchar (1000) | | NULL |
| CCTT_USR | USR_ID | int IDENTITY (1, 1) | | NOT NULL |
| | USR_LAST_NM | varchar (25) | | NOT NULL |
| | USR_FRST_NM | varchar (25) | | NOT NULL |

| Table | Column | Type | Length | Null/Not Null | Description |
|---|---|---|---|---|---|
| CCTT_VENDOR | | | | | Vendor information table - maintained through SQL |
| | VENDOR_ID | int IDENTITY | 4 | NOT NULL | Primary key |
| | VENDOR_NM | Varchar | 50 | NOT NULL | Name of the Vendor |
| | STATUS_CD | Varchar | 10 | NOT NULL | May contain the value "Active" or "Inactive" to indicate the current state of the Vendor |
| | DESC_TXT | Varchar | 1000 | NULL | Place to enter any comments regarding the vendor |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_CENTER | | | | | Center information table - maintained through SQL |
| | CENTER_ID | int IDENTITY | 4 | NOT NULL | Primary key |
| | CENTER_NM | Varchar | 50 | NOT NULL | Name of the Center |
| | STATUS_CD | Varchar | 10 | NOT NULL | May contain the value "Active" or "Inactive" to |

TABLE-continued

Database Schema

| | | | | | |
|---|---|---|---|---|---|
| | | | | | indicate the current state of the Center |
| | VENDOR_ID | Integer | 4 | NOT NULL | Foreign key to the CCTT_VENDOR table |
| | DESC_TXT | Varchar | 1000 | NULL | Place to enter any comments regardin the center |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_LOB | | | | | Line of Business information table - maintained through SQL |
| | LOB_ID | int IDENTITY | 4 | NOT NULL | Primary key |
| | LOB_NM | Varchar | 50 | NOT NULL | Name of the Line of Business |
| | STATUS_CD | Varchar | 10 | NOT NULL | May contain the value "Active" or "Inactive" to indicate the current state of the Line of Business |
| | DESC_TXT | Varchar | 1000 | NULL | Place to enter any comments regardin the Line of Business |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_USR_TYPE | | | | | User Type definintion table - maintained through SQL |
| | USR_TYPE_ID | int IDENTITY | 4 | NOT NULL | Primary key |
| | USR_TYPE_CD | Varchar | 20 | NOT NULL | User type name |

TABLE-continued

Database Schema

| | | | | | |
|---|---|---|---|---|---|
| | | | | | (Admin, Vendor Admin, Center Admin, agent) |
| | STATUS_CD | Varchar | 10 | NOT NULL | May contain the value "Active" or "Inactive" to indicate the current state of the agent Type |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_USR | | | | | User Table - maintained through an Admin page |
| | USR_ID | int IDENTITY | 4 | NOT NULL | Primary key |
| | USR_LAST_NM | Varchar | 25 | NOT NULL | User's last name |
| | USR_FRST_NM | Varchar | 25 | NOT NULL | User's first name |
| | USER_NAME | Varchar | 50 | NOT NULL | This is the agentname that is entered on the login page |
| | USR_PWD | Varchar | 20 | NOT NULL | This is the agent's password |
| | USR_PWD1 | Varchar | 20 | NULL | Old Password |
| | USR_PWD2 | Varchar | 20 | NULL | Old Password |
| | USR_PWD3 | Varchar | 20 | NULL | Old Password |
| | USR_PWD4 | Varchar | 20 | NULL | Old Password |
| | USR_PWD5 | Varchar | 20 | NULL | Old Password |
| | STATUS_CD | Varchar | 10 | NOT NULL | May contain the value "Active" or "Inactive" to indicate the current state of the agent |
| | USR_TYPE_ID | Integer | 4 | NOT NULL | Foreign key to the CCT_USER_TYPE table |
| | CENTER_ID | Integer | 4 | NOT NULL | Foreign key to the CCT_CENTER table |
| | TEAM_LD_FL | Varchar | 1 | NULL | If this is set to "Y" the agent is identified as |

TABLE-continued

Database Schema

| | | | | | |
|---|---|---|---|---|---|
| | TEAM_LD_ID | Integer | 4 | NULL | a "Team Lead" This is the foreign key to CCT_USR (self-join) to the Team Lead record. |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_USR_LOB | | | | | User to LOB relationship - maintained through an Admin page |
| | USR_LOB_ID | int IDENTITY | 4 | NOT NULL | Primary key |
| | USR_ID | Integer | 4 | NOT NULL | User type name (Admin, Vendor Admin, Center Admin, agent) |
| | PRIMARY_FL | Bit | 1 | NOT NULL | Indicates whether this is the primary LOB for the agent. There can only be one record for each USR_ID that can be marked primary |
| | STATUS_CD | Varchar | 20 | NOT NULL | May contain the value "Active" or "Inactive" to indicate the current state of the agent LOB record |
| | LOB_ID | Integer | 4 | NOT NULL | Foreign key to the CCTT_LOB table |
| | CRM_USR_NM | Varchar | 15 | NULL | CRM agentname |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT | date/time |

TABLE-continued

Database Schema

| | | | | | |
|---|---|---|---|---|---|
| | | | | NULL | when the record is created |
| CCTT_INBOX | | | | | Inbox for distributing content to each agent. Populated via a stored procedure. |
| | INBOX_ID | Integer | 4 | | |
| | USR_ID | Integer | 4 | NOT NULL | Part 1 of the Primary Key - Foreign key to the CCTT_USR table |
| | SCEN_ID | Integer | 4 | NOT NULL | Part 2 of the Primary Key - Foreign key to the CCTT_SCEN table |
| | COMP_PCT | Float | 8 | NOT NULL | Completion percentage for the Content |
| | COMP_FL | Bit | 1 | NOT NULL | Indicator that specifies whether a piece of Content has been completed |
| | STATUS_CD | Varchar | 10 | NOT NULL | May contain the value "Active" or "Inactive" to indicate the current state of the Inbox record |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_SCEN_TYPE | | | | | Lists all of the available types of content that can be created (e.g. Desk Drop, WPA's, Quality Flashes). Entered using SQL |
| | SCEN_TYPE_ID | int IDENTITY | 4 | NOT NULL | Primary key |
| | SCEN_TYPE_NM | Varchar | 100 | NOT NULL | Scenario type name |
| | DESC_TXT | Varchar | 1000 | NOT NULL | Description text |
| | STATUS_CD | Varchar | 10 | NOT NULL | Code field to indicate the status of the type record |
| | DISPLAY_POSITION | Integer | 4 | NULL | Display order on |

TABLE-continued

Database Schema

| | | | | | |
|---|---|---|---|---|---|
| | | | | | course map page |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_SCEN | | | | | This is the "header" record for each piece of content. Maintained via BiSiDet |
| | SCEN_ID | int IDENTITY | 4 | NOT NULL | Primary key |
| | SCEN_NM | Varchar | 100 | NOT NULL | Scenario name - title for the content (e.g. name for the Desk Drop, WPA, Quality Flash) |
| | SCEN_NBR | Integer | 4 | NOT NULL | Version number |
| | BKGRND_IMG_PATH_TXT | Varchar | 100 | NULL | Path for the image file |
| | STATUS_CD | Varchar | 10 | NOT NULL | Status code |
| | EXAM_ALLOW_MULTI | Bit | 1 | NULL | Flag to indicate if an exam can be taken more than once |
| | EXAM_QUEST_TYPE_CD | Varchar | 30 | NULL | Code to indicate the type of exam |
| | TRACK_FL | Bit | 1 | NOT NULL | Flag to indicate if tracking is enabled |
| | QUEST_TOT | Integer | 4 | NULL | |
| | ACTIVE_TS | Datetime | 8 | NULL | Timestamp for when the record became active |
| | SCEN_TYPE_ID | Integer | 4 | NOT NULL | Foreign key to CCTT_SCEN_TYPE table |
| | SCEN_START_DT | Datetime | 8 | NOT NULL | Start date for the content |
| | SCEN_END_DT | Datetime | 8 | NOT NULL | End date for the content |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_SCEN_SECT | | | | | These are the sections for each piece of content. Maintained via BiSiDet |
| | SCEN_SECT_ID | int IDENTITY | 4 | NOT NULL | Primary key |

TABLE-continued

| | | | | | |
|---|---|---|---|---|---|
| | | Database Schema | | | |
| | SCEN_SECT_NM | Varchar | 1000 | NULL | Section name - descriptive text |
| | SCEN_ID | Integer | 4 | NOT NULL | Foreign key to the CCTT_SCEN table |
| | SCEN_SECT_NBR | Integer | 4 | NOT NULL | Section number |
| | SCEN_SECT_TXT | Varchar | 1000 | NULL | Text for the scenario section |
| | SECT_AUD_FILE_PATH_TXT | Varchar | 100 | NULL | File path for the audio file |
| | SECT_PIC_FILE_PATH_TXT | Varchar | 100 | NULL | File path for the picture file |
| | FDBK_NBR | Integer | 4 | NULL | Feedback foreign key for the CCTT_FDBK table |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_SECT_PG | | | | | These are the pages for each piece of content. Maintained via BiSiDet |
| | SECT_PG_ID | int IDENTITY | 4 | NOT NULL | Primary key |
| | SECT_PG_TTL_TXT | Varchar | 1000 | NULL | Page title |
| | PIC_FILE_PATH_TXT | Varchar | 100 | NULL | File path for the picture file |
| | SCEN_SECT_ID | Integer | 4 | NOT NULL | Foreign key to the CCTT_SCEN_SECT table |
| | SECT_PG_NBR | Integer | 4 | NOT NULL | Section page number |
| | STATUS_CD | Varchar | 10 | NULL | |
| | SECT_PG_TXT | Varchar | 1000 | NULL | Text for the Page |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCT_SCEN_DIST | | | | | This table contains the distribution for each Scenario (content). Maintained via BiSiDet |
| | SCEN_DIST_ID | int IDENTITY | 4 | NOT NULL | Primary key |
| | SCEN_ID | Integer | 4 | NOT NULL | Foreign key to the CCT_SCEN table |
| | STATUS_CD | Varchar | 10 | NOT | Status code for |

TABLE-continued

Database Schema

| | | | | | |
|---|---|---|---|---|---|
| | CENTER_ID | Integer | 4 | NULL | this record File path for the picture file |
| | LOB_ID | Integer | 4 | NOT NULL | Foreign key to the CCTT_SCEN_SECT table |
| | DESC_TXT | Varchar | 1000 | NULL | Text field to enter comments |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_SECT_PG_QUEST | | | | | This table contains the questions that are asked in a Scenario (content). Maintained via BiSiDet |
| | SECT_PG_QUEST_ID | int IDENTITY | 4 | NOT NULL | Primary key |
| | SECT_PG_QUEST_TXT | Text | N/a | NULL | Text for the question |
| | SECT_PG_ID | Integer | 4 | NOT NULL | Foreign key to CCTT_SECT_PG |
| | PIC_FILE_PATH_TXT | Varchar | 100 | NULL | Path for the picture file |
| | AUD_FILE_PATH_TXT | Varchar | 100 | NULL | Path for the audio file |
| | SECT_PG_QUEST_TYP_CDE | Varchar | 1000 | NULL | Type code for the question |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_QUEST_RESP | | | | | These are the possible responses for the question. Maintained via BiSiDet |
| | SECT_PG_QUEST_RESP_ID | int IDENTITY | 4 | NOT NULL | Primary key |
| | SECT_PG_QUEST_RESP_TXT | Varchar | 1000 | NULL | Question Response text (Answer) |
| | SECT_PG_QUEST_RESP_NM | Varchar | 1000 | NULL | Question Response number |
| | SECT_PG_QUEST_ID | Integer | 4 | NOT NULL | Foreign key to CCTT_SECT_PG_QUEST |
| | RESP_ANS_COR_CDE | Integer | 4 | NOT NULL | Response code |
| | NEXT_SECT_PG_ID | Varchar | 100 | NOT NULL | Foreign key to CCTT_SECT_PG |
| | FDBK_NBR | Integer | 4 | NULL | Foreign key to |

TABLE-continued

Database Schema

| | | | | | |
|---|---|---|---|---|---|
| | PIC_FILE_PATH_TXT | Varchar | 100 | NULL | CCTT_FDBK Path for picture file |
| | AUD_FILE_PATH_TXT | Varchar | 100 | NULL | Path for audio file |
| | REL_TOPIC_NBR | Integer | 4 | NULL | Foreign key to CCTT_REL_TOPIC |
| | INIT_FDBK_NBR | Integer | 4 | NULL | Foreign key to CCT_FDBK |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_REL_TOPIC | | | | | This table contains information on related topics. Maintained via BiSiDet |
| | REL_TOPIC_ID | Int IDENTITY | 4 | NOT NULL | Primary Key |
| | REL_TOPIC_TXT | Varchar | 1000 | NULL | Text for the related topic |
| | REL_TOPIC_FILE_PATH_TXT | Varchar | 100 | NOT NULL | File path to the file for the related topic |
| | REL_TOPIC_NBR | Integer | 4 | NOT NULL | Related topic number |
| | SECT_PG_QUEST_RESP_ID | Integer | 4 | NOT NULL | |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_FDBK | | | | | This table contains feedback. Maintained via BiSiDet |
| | FDBK_ID | Int IDENTITY | 4 | NOT NULL | Primary Key |
| | FDBK_TXT | Varchar | 1000 | NULL | Feedback text |
| | FDBK_SUMM_VAL | Integer | 4 | NULL | |
| | SECT_PG_QUEST_RESP_ID | Integer | 4 | NULL | Foreign key to CCTT_QUEST_RESP |
| | AUD_FILE_PATH_TXT | Varchar | 100 | NULL | Path for audio file |
| | IMG_FILE_PATH_TXT | Varchar | 100 | NULL | Path for image file |
| | FDBK_TTL_TXT | Varchar | 1000 | NULL | Title for the feedback |
| | SCEN_SECT_ID | Integer | 4 | NULL | Foreign key to CCTT_SCEN_SECT |
| | FDBK_NBR | Integer | 4 | NULL | Feedback number |
| | MODIFIED_ID | Integer | 4 | NOT NULL | USR_ID of the agent who updated the |

TABLE-continued

Database Schema

| | | | | | |
|---|---|---|---|---|---|
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_SCEN_USR | | | | | Used to track an agent's progress through the Content. Populated by the Service Advisor template pages. |
| | SCEN_USR_ID | int IDENTITY | 4 | NOT NULL | Primary key |
| | USR_ID | Integer | 4 | NOT NULL | Foreign key to CCTT_USR table |
| | SCEN_ID | Integer | 4 | NOT NULL | Foreign key to CCTT_SCEN table |
| | SCEN_USR_ATTEMPT | Integer | 4 | NOT NULL | The attempt number for the CCTT_SCEN record |
| | STATUS_CD | Varchar | 10 | NOT NULL | Status code for the attempt |
| | SCEN_SCORE | Decimal | 3, 2 | NULL | Question score if applicable |
| | START_TS | Datetime | 8 | NOT NULL | Start date and time |
| | END_TS | Datetime | 8 | NOT NULL | End date and time |
| CCTT_SCEN_USR_DTL | | | | | Used to track the agent's progress through the Sections and the Pages of Content. Populated by the Service Advisor template pages each time a page is opened or closed |
| | SCEN_USR_DTL_ID | int IDENTITY | 4 | NOT NULL | Primary key |
| | SCEN_USR_ID | Integer | 4 | NOT NULL | Foreign key to CCTT_SCEN_USR |
| | SCEN_SECT_ID | Integer | 4 | NOT NULL | Foriegn key to CCTT_SCEN_SECT |
| | SECT_PG_ID | Integer | 4 | NOT NULL | Foreign key to CCTT_SECT_PG |
| | SECT_PG_QUEST_ID | Integer | 4 | NOT NULL | Foreign key to CCTT_SECT_PG_QUEST |
| | SECT_PG_QUEST_RESP_ID | Integer | 4 | NULL | Foreign key to CCTT_QUEST_RESP |
| | USR_RESP_TXT | Varchar | 1000 | NULL | Free form response text |
| | USR_RESP_RSLT | Integer | 4 | NULL | Identifies whether the agent's response is correct or if it is free form |
| | START_TS | Datetime | 8 | NOT NULL | Start date and time |
| | END_TS | Datetime | 8 | NULL | End date and time |
| CCTT_EXAM | | | | | This is the header table for the Exams. Maintained via BiSiDet |

TABLE-continued

Database Schema

| | | | | | |
|---|---|---|---|---|---|
| | SECT_EXAM_PAGE_ID | int IDENTITY | 4 | NOT NULL | Primary key |
| | SCEN_ID | Integer | 4 | NOT NULL | Foreign key to CCTT_SCEN |
| | EXAM_PG_NBR | Integer | 4 | NOT NULL | Exam Page number |
| | EXAM_PG_NM | Varchar | 1000 | NULL | Exam Page name |
| | PIC_FILE_PATH_TXT | Varchar | 100 | NULL | Path to picture file |
| | PG_EXAM_TXT | Varchar | 1000 | NULL | Exam description field |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_EXAM_QUEST | | | | | This table contains the definitions for each section of an Exam. Maintained in BiSiDet |
| | EXAM_QUEST_ID | int IDENTITY | 4 | NOT NULL | Primary key |
| | QUEST_ID | Integer | 4 | NOT NULL | Foreign key to CCTT_QUESTION |
| | COMMENT | Varchar | 1000 | NULL | Comment text |
| | SECT_EXAM_PAGE_ID | Integer | 4 | NOT NULL | |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_QUESTION | | | | | This table contains the Questions for the Exams. Maintained in BiSiDet |
| | QUEST_ID | int IDENTITY | 2 | NOT NULL | Primary key |
| | QUEST_SUB | Varchar | 20 | NOT NULL | Text field |
| | QUEST_CAT | Varchar | 20 | NOT NULL | Text field |
| | QUEST_TXT | Text | N/a | NULL | Question text |
| | PIC_FILE_PATH_TXT | Varchar | 100 | NULL | Path for the picture file |
| | AUD_FILE_PATH_TXT | Varchar | 100 | NULL | Path for the audio file |
| | STATUS_CD | Varchar | 10 | NOT NULL | Status code for the Question |
| | MODIFIED_ID | Integer | 4 | NOT NULL | USR_ID of the agent who updated the record |
| | MODIFIED_TS | Datetime | 8 | NOT NULL | date/time when the record is modified |

TABLE-continued

Database Schema

| Table | Column | Type | Size | Null | Description |
|---|---|---|---|---|---|
| | CREATED_ID | Integer | 4 | NOT NULL | USR_ID of the agent who created the record |
| | CREATED_TS | Datetime | 8 | NOT NULL | date/time when the record is created |
| CCTT_RESPONSE | | | | | This table contains the Responses to the Questions for the Exams. Maintained in BiSiDet |
| | EXAM_QUEST_RESP_ID | Int IDENTITY | 4 | NOT NULL | Primary key |
| | QUEST_RESP_NM | Varchar | 100 | NULL | Question response name |
| | QUEST_ID | Integer | 4 | NOT NULL | Foreign key to CCTT_QUESTION |
| | QUEST_RESP_TXT | Varchar | 1000 | NOT NULL | Response text |
| | RESP_ANS_COR_CDE | Integer | 4 | NOT NULL | Code that identifies if this is or is not the right response |
| | EXAM_FDBK_ID | Integer | 4 | NULL | Foreign key to CCTT_EXAM_FDBK |
| | PIC_FILE_PATH_TXT | Varchar | 50 | NULL | Path for picture file |
| | AUD_FILE_PATH_TXT | Varchar | 50 | NULL | Path for audio file |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_EXAM_FDBK | | | | | This table contains the Feedback to the Questions and Responses for the Exams. Maintained in BiSiDet |
| | EXAM_FDBK_ID | Integer | 4 | NOT NULL | Primary key |
| | FDBK_TXT | Varchar | 1000 | NOT NULL | Feedback text |
| | FDBK_SUMM_VAL | Integer | 4 | NULL | Summary value |
| | AUD_FILE_PATH_TXT | Varchar | 100 | NULL | Path to audio file |
| | IMG_FILE_PATH_TXT | Varchar | 100 | NULL | Path to image file |
| | FDBK_TTL_TXT | Varchar | 1000 | NULL | Feedback title |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_EXAM_RSLT_HDR | | | | | |
| | EXAM_RSLT_HDR_ID | int IDENTITY | 4 | NOT NULL | Primary key |

TABLE-continued

Database Schema

| | | | | | |
|---|---|---|---|---|---|
| | SCEN_ID | Integer | 4 | NOT NULL | Foreign key to CCTT_SCEN table |
| | USR_ID | Integer | 4 | NOT NULL | Foreign key to CCTT_USR table |
| | EXAM_ID | Integer | 4 | NOT NULL | Foreign key to CCTT_EXAM table |
| | SCEN_USR_ATTEMPT | Integer | 4 | NOT NULL | Attempt number |
| | EXAM_RSLT_STATUS_CD | Varchar(10) | 50 | NOT NULL | Status code for the attempt |
| | EXAM_SCORE_PCT | Float | 8 | NOT NULL | Score |
| | EXAM_START_TS | Datetime | 8 | NOT NULL | Start date and time |
| | EXAM_END_TS | Datetime | 8 | NOT NULL | End date and time |
| CCTT_EXAM_RSLT_DTL | | | | | |
| | EXAM_RSLT_DTL_ID | int IDENTITY | 4 | NOT NULL | Primary key |
| | EXAM_RSLT_HDR_ID | Integer | 4 | NOT NULL | Foreign key to CCTT_EXAM_RSLT_HDR table |
| | EXAM_PG_NBR | Integer | 4 | NOT NULL | Exam page number |
| | USR_QUEST_ID | Integer | 4 | NOT NULL | Foreign key to CCTT_QUESTION |
| | USR_QUEST_RESP_ID | Integer | 4 | NULL | Foreign key to CCTT_QUEST_RESP |
| | USR_RESP_RSLT | Integer | 4 | NOT NULL | Identifies whether the agent's response is correct or if it is free form |
| | USR_RESP_TXT | Varchar | 1000 | NOT NULL | For text responses |
| | QUEST_START_TS | Datetime | 8 | NOT NULL | Start date and time |
| | QUEST_END_TS | Datetime | 8 | NOT NULL | End date and time |
| CCTT_BATCH_LOG | | | | | Populated by the batch processes |
| | BATCH_LOG_ID | Integer | 4 | NOT NULL | Primary key |
| | PROCESS_NM | Varchar | 20 | NOT NULL | Batch process name |
| | RECORD_TYPE | Varchar | 10 | NOT NULL | Indicates whether this is a Header or Detail record |
| | STATUS_CD | Varchar | 10 | NOT NULL | Status of the process |
| | START_TS | Datetime | 8 | NOT NULL | USR_ID of the agent who updated the record |
| | END_TS | Datetime | 8 | NULL | date/time when the record is modified |
| | SCEN_ID | Integer | 4 | NULL | USR_ID of the agent who created the record |
| | FILE_NAME | Varchar | 100 | NULL | date/time when the record is created |
| | RECORD_CNT | Integer | 4 | NULL | |
| CCTT_ERR_LOG | | | | | Populated by the batch processes |
| | ERR_LOG_ID | Integer | 4 | NOT NULL | Primary key |
| | PROCESS_NM | Varchar | 20 | NOT NULL | Batch process name |
| | ERR_NUM | Integer | 4 | NOT NULL | |
| | SEVERITY | Varchar | 10 | NOT NULL | |
| | SCEN_ID | Integer | 4 | NULL | |
| | FILE_NAME | Varchar | 100 | NULL | |
| | ERR_MSG | Varchar | 1000 | NOT NULL | |
| | ERR_REC_DTLS | Varchar | 1000 | NOT NULL | |

TABLE-continued

Database Schema

| | | | | | |
|---|---|---|---|---|---|
| CCTT_TEMPLATE | ERR_TS | Datetime | 8 | NOT NULL | Populated by the batch processes |
| | TEMPLATE_ID | Integer | 4 | NOT NULL | Primary key |
| | TEMPLATE_PATH | Varchar | 100 | NOT NULL | Batch process name |
| | TEMPLATE_NM | Varchar | 100 | NOT NULL | Display name of |
| | STATUS_CD | Varchar | 10 | NOT NULL | Status of the process |
| | ALLOW_BK_FL | Integer | | NOT NULL | Enables the Back Button |
| CCTT_UPLOAD_IMAGE | | | | | Populated by the batch processes |
| | IMAGE_ID | Integer | 4 | NOT NULL | Primary key |
| | IMAGE_NM | Varchar | 100 | NOT NULL | Image name |
| | IMAGE_BINARY | Image | 16 | NOT NULL | Image binary |
| | MODIFIED_ID | Integer | 4 | NOT NULL | USR_ID of the agent who updated the record |
| | MODIFIED_TS | Datetime | 8 | NOT NULL | date/time when the record is modified |
| | CREATED_ID | Integer | 4 | NOT NULL | USR_ID of the agent who created the record |
| | CREATED_TS | Datetime | 8 | NOT NULL | date/time when the record is created |
| CCTT_STORY | | | | | This is the Story table. It contains links to HTML files to access Agent stories. Maintained by BiSiDet. |
| | STORY_ID | int IDENTITY | 4 | NOT NULL | Primary key |
| | STORY_TTL_TXT | Varchar | 1000 | NOT NULL | Story title |
| | STORY_PATH_TXT | Varchar | 100 | NOT NULL | Path to file |
| | STORY_CAT_TXT | Varchar | 1000 | NULL | Story Category |

Figure 52:
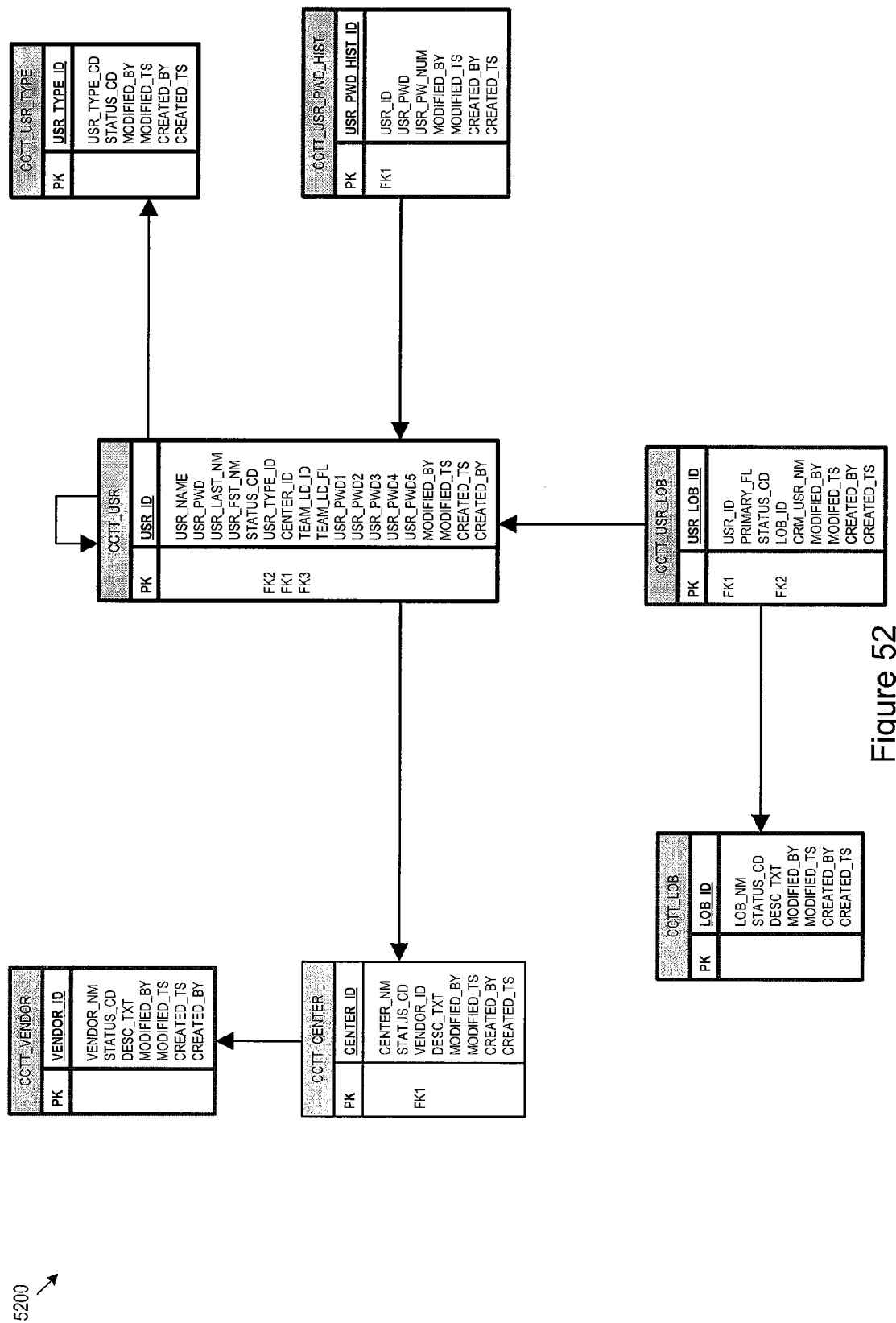
FIG. 52 shows an agent hierarchy data model that the system may implement.

FIG. 52 shows an agent hierarchy data model 5200 that the system may implement.

Figure 53:
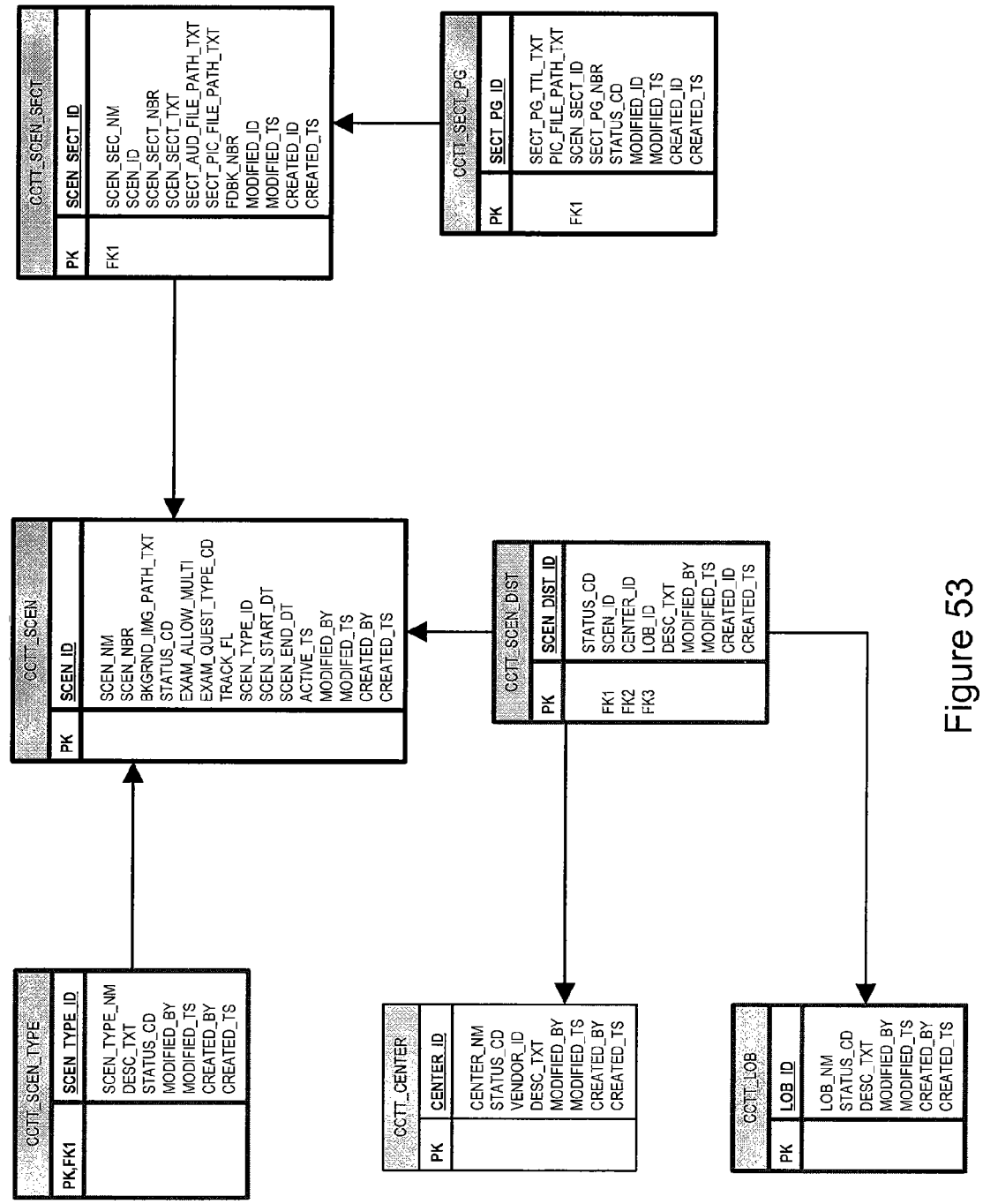
FIG. 53 shows a content hierarchy data model that the system may implement.

FIG. 53 shows a content hierarchy data model 5300 that the system may implement. The table below lists content distribution tables. The service advisor administrator agents may create and manage the Content. The sequence for populating the tables include: CCTT_SCEN—determine the type of content and create the header record; CCTT_SCEN_DIST—select the Vendor/Center/LOB combinations that may be able to access the Content; CCTTT_SCEN_SECT—determine the sections for the Content; CCTT_SECT_PG—determine the pages for the Content; and CCTT_INBOX—once the Content has been released for distribution the Inbox records are created. The sequence for creating the CCTT_SCEN_SECT, CCTT_SCEN_SECT, and CCTT_SECT_PG records may vary. In one implementation, the CCTT_SCEN record may be the first record created and the CCTT_INBOX records may be the last to be created.

The content distribution processing logic used with content hierarchy data model that the system may implement includes: the CCT_BATCH_LOG table may be used to log the progress of the Content Distribution process and to capture key statistics; Insert/Update of CCTT_BATCH_LOG Header records; Insert/Update of CCTT_BATCH_LOG Detail records; Commit of CCTT_INBOX records after 1000 records; and Error handling for SQL errors. The content distribution logic may implement a Unique key on the CCTT_INBOX table—USR_ID and SCEN_ID, for each agent there may only be one CCTT_INBOX record for each piece of Content (SCEN_ID), inserts into the CCTT_INBOX table may indicate a duplicate key index violation, but an agent may qualify for multiple Vendor/Center/LOB combinations. In one implementation, only want one Content record for each agent may be permitted.

| Table | Purpose |
|---|---|
| CCTT_SCEN_TYPE | This table stores the different Content types. Includes Desk Drop, WPA's, Quality Flashes, Exams, and Job Aids. |
| CCTT_SCEN | This table stores all of the "Header" information for the different types of content. There may be a record in this table for each Desk Drop, WPA, Quality Flash, Exam, or Job Aid. |
| CCTT_SCEN_SECT | This is a child table of CCTT_SCEN and it is used to break up the content into sections. For example, one section may be text and the next section may be a series of questions to test comprehension. Each section may have a record in this table. |
| CCTT_SECT_PG | This is a child to CCTT_SCEN_SECT. Each section |

| Table | Purpose |
| --- | --- |
|  | is composed of Pages and the records in this table define what goes on each page. There can be one or more pages in a section. |
| CCTT_SCEN_DIST | This is a new child table to CCTT_SCEN. This is where the Content distribution is stored. There needs to be at least one record in this table for each piece of content in order for the content to be visible. Content distribution may need to be identified down to the Vendor, Center & LOB. |
| CCTT_INBOX | This table serves as the inbox for each agent. A record in this table may be created for each piece of Content that an agent has access to. |

Figure 54:
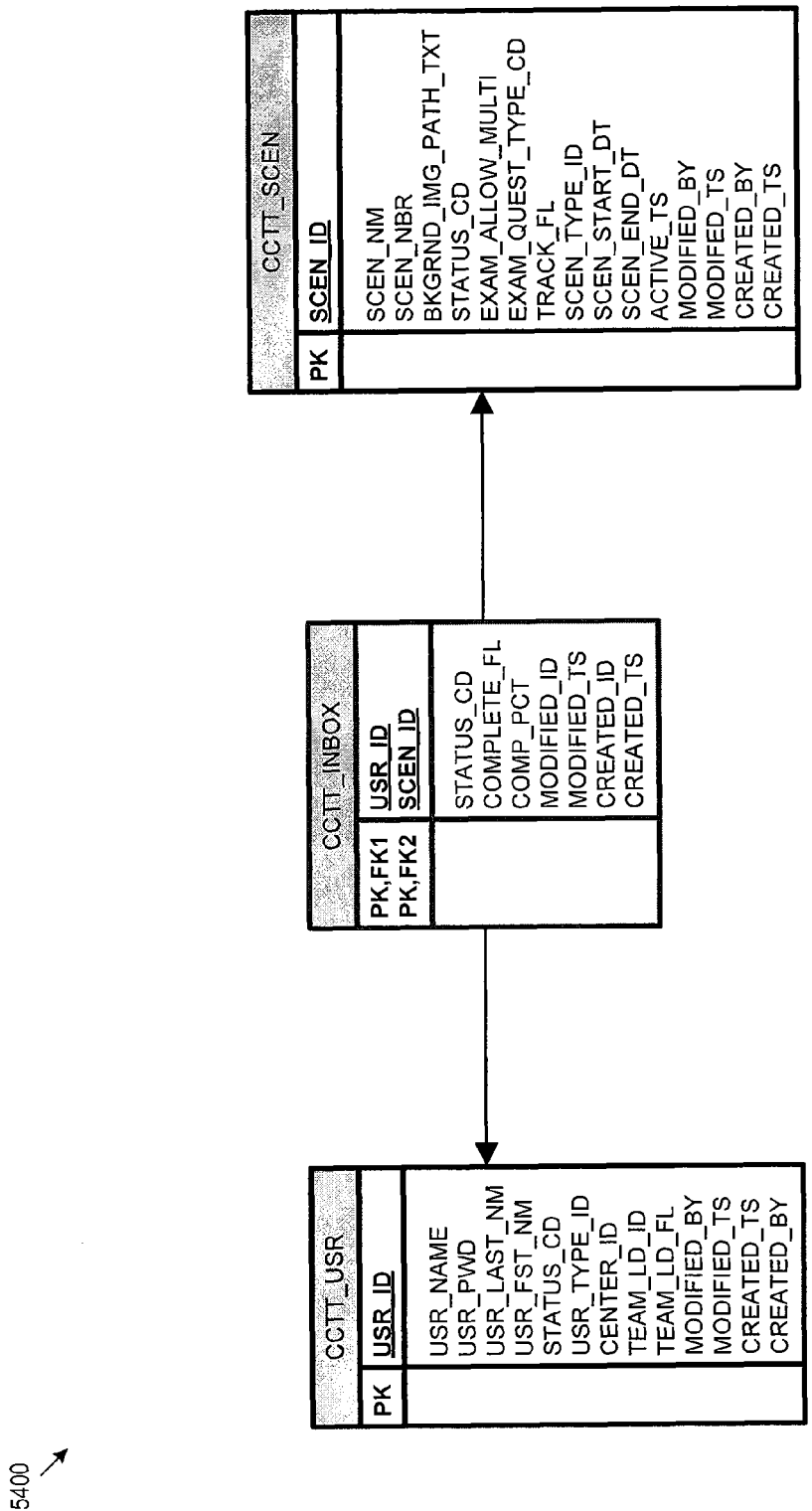
FIG. 54 shows a content distribution data model that the system may implement.

FIG. 54 shows a content distribution data model 5400 that the system may implement.

Figure 55:
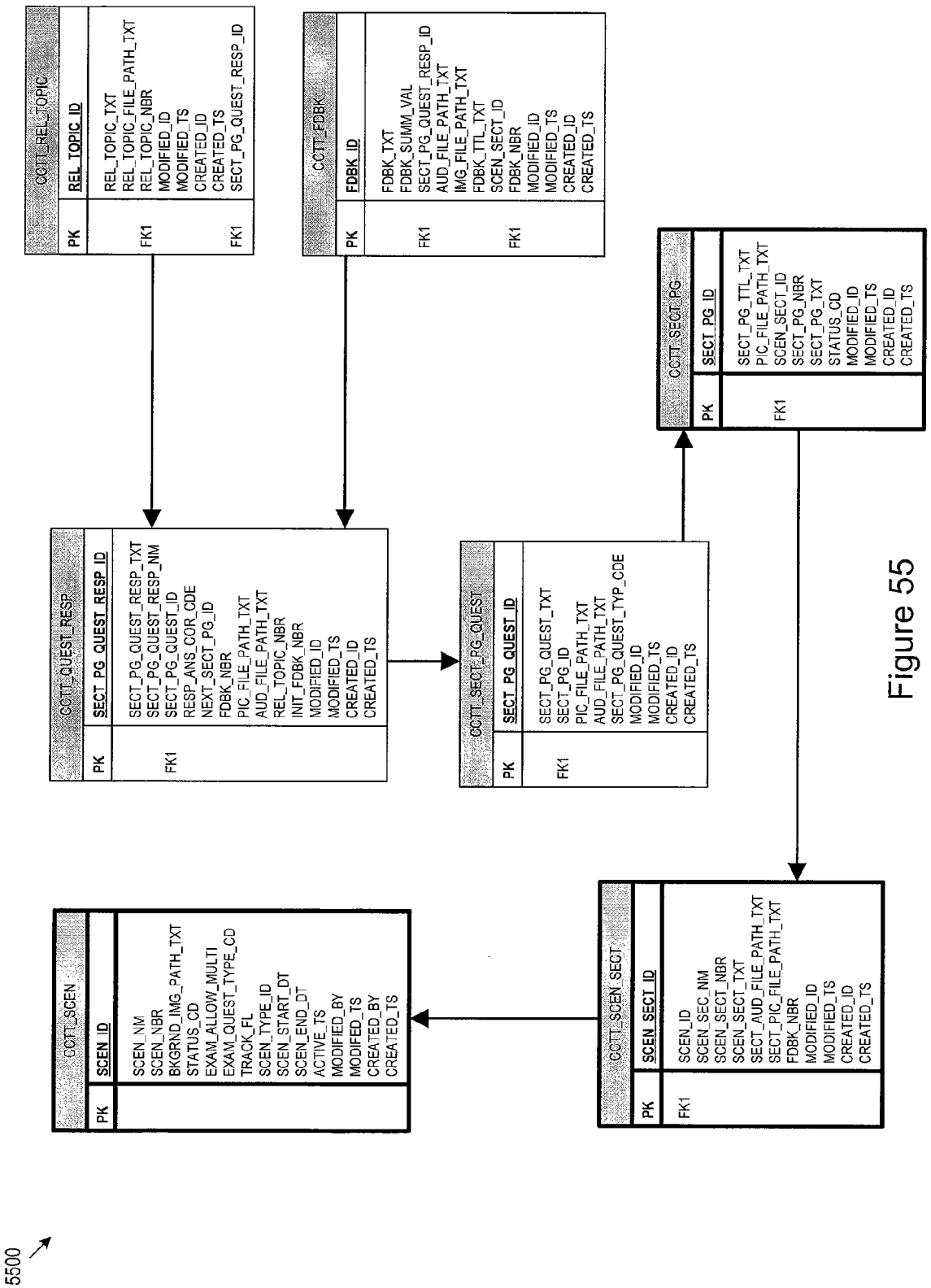
FIG. 55 shows a content definition data model that the system may implement.

FIG. 55 shows a content definition data model 5500 that the system may implement.

Figure 56:
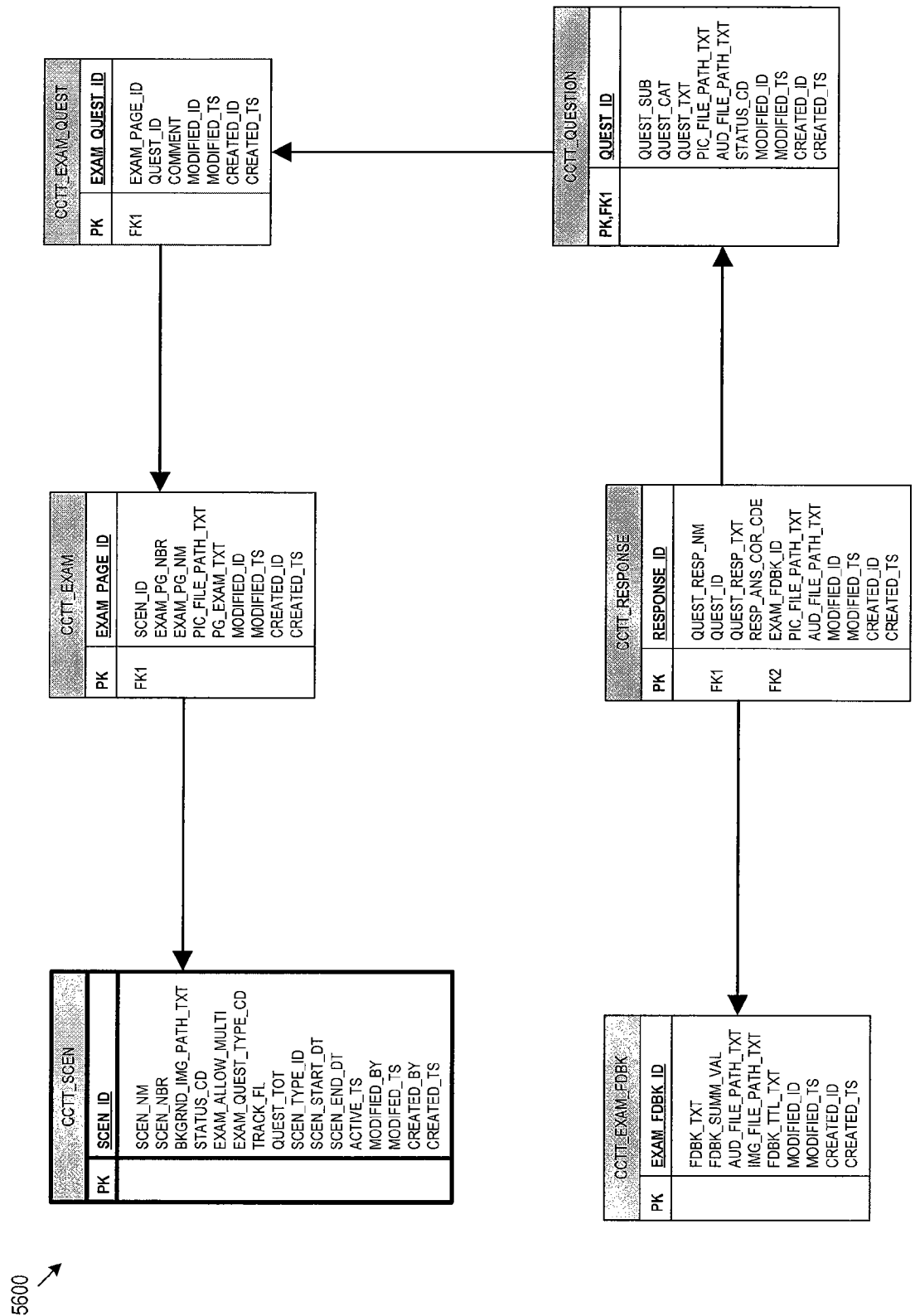
FIG. 56 shows a examination definition data model that the system may implement.

FIG. 56 shows a examination definition data model 5600 that the system may implement.

Figure 57:
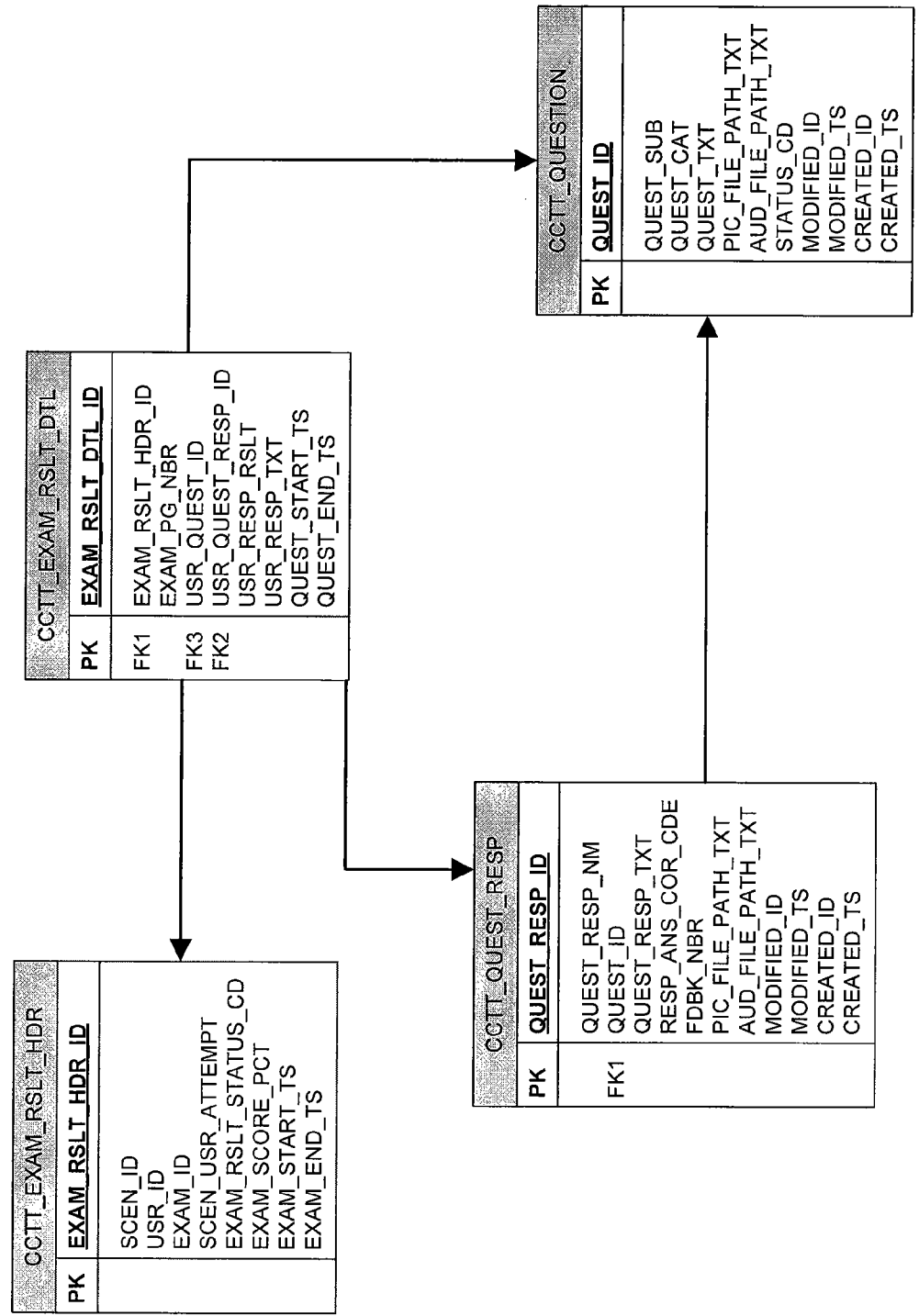
FIG. 57 shows an examination tracking data model that the system may implement.

FIG. 57 shows an examination tracking data model 5700 that the system may implement. Tracking begins when an agent selects a piece an Exam from the home page 102. The TRACK_FL on the CCTT_SCEN table is check to see if the flag is set to True. If it is set to True then steps 3-5 are executed. If it is set to False then not tracking is done and steps 3-5 are skipped. For each attempt at the Exam an EXAM_RSLT_HDR record is created. For each question the EXAM_RSLT_DTL record is created. The EXAM_RSLT_DTL record can be updated because an agent should be able to change a response to the question.

Figure 58:
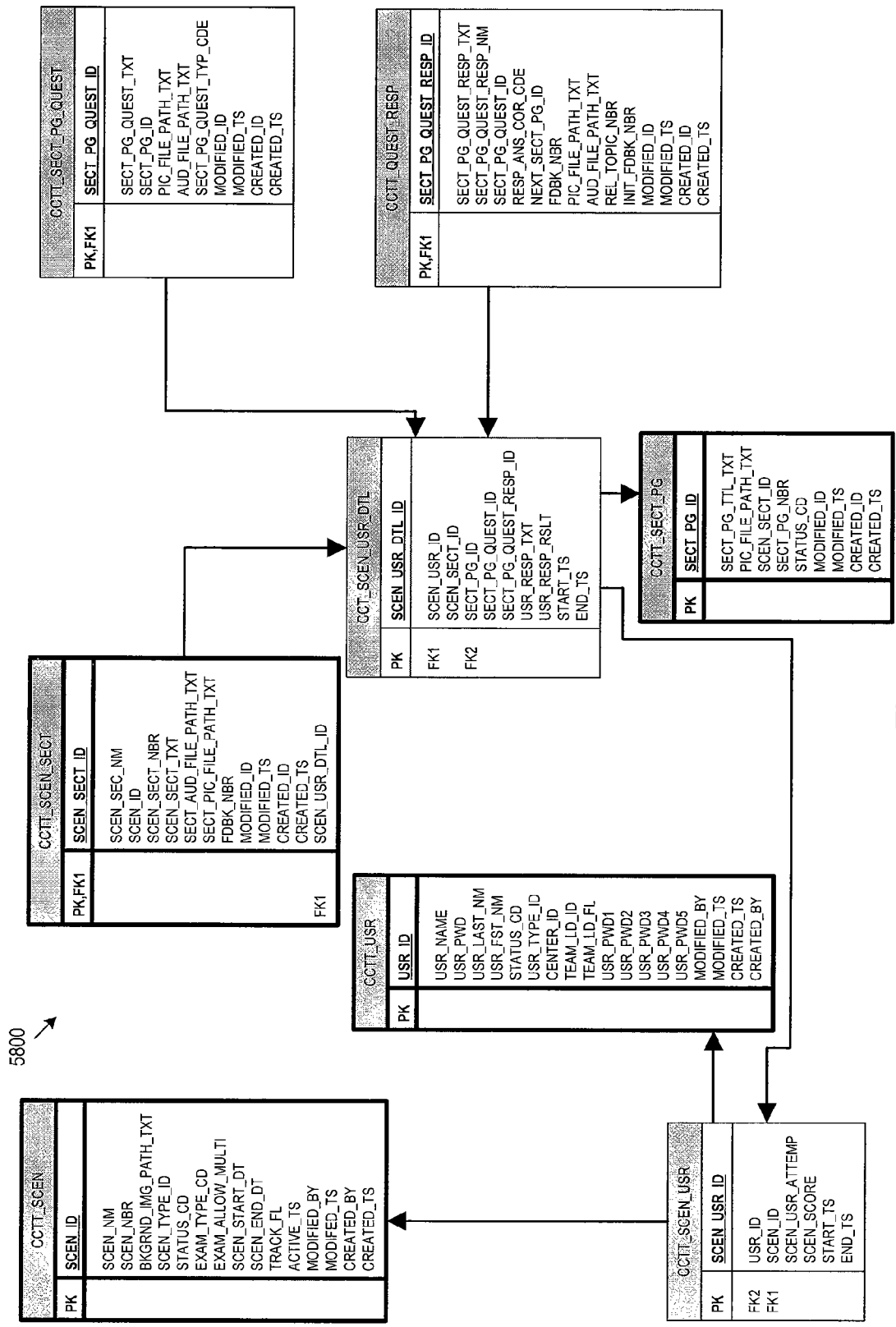
FIG. 58 shows a content tracking data model that the system may implement.

FIG. 58 shows a content tracking data model 5800 that the system may implement. Tracking begins when an agent selects a piece of Content to read from the home page 102. When the hyperlink is clicked the TRACK_FL on the CCTT_SCEN table needs to be checked. If it is set to True then a CCTT_SCEN_USR record is created that contains the information about the agent and Module selected. The start date time is recorded but the end date time is not (set to null). A record is created for each attempt at reading the content. If the flag is set to False then not tracking is done and the following steps are skipped. Once the first page is loaded the start date time is stored in memory if the page contains a question. This is the start date time for that page. Otherwise, there is no tracking for that page. For pages with questions (see above) a CCTT_SCEN_USR_DTL record is created when an answer is selected for a question. The start date time is put into the record when it is inserted. The CCTT_SCEN_USR_DTL table should be insert only—agents may not be able to go back to a question. When the agent exits a module to get to the home page 102 the end date time stamp on the CCTT_SCEN_USR table is updated. If the agent closes the browser or ends the session the column is not updated.

Figure 59:
FIG. 59 shows a batch and error log data model that the system may implement.

FIG. 59 shows a batch and error log data model 5900 that the system may implement.

Figure 60:
FIG. 60 shows a template data model that the system may implement.

FIG. 60 shows a template data model 6000 that the system may implement. The CCTT_TEMPLATE includes the names of available templates from which modules may be created. The CCTT_UPLOAD_IMAGE may include content that an administrator loads into a template to create a module.

Figure 61:
FIG. 61 shows an agent story data model that the system may implement.

FIG. 61 shows an agent story data model 6100 that the system may implement. The CCTT_STORY may record a call center customer call with an agent, including the questions and answers to topics covered during the call.

Figure 62:
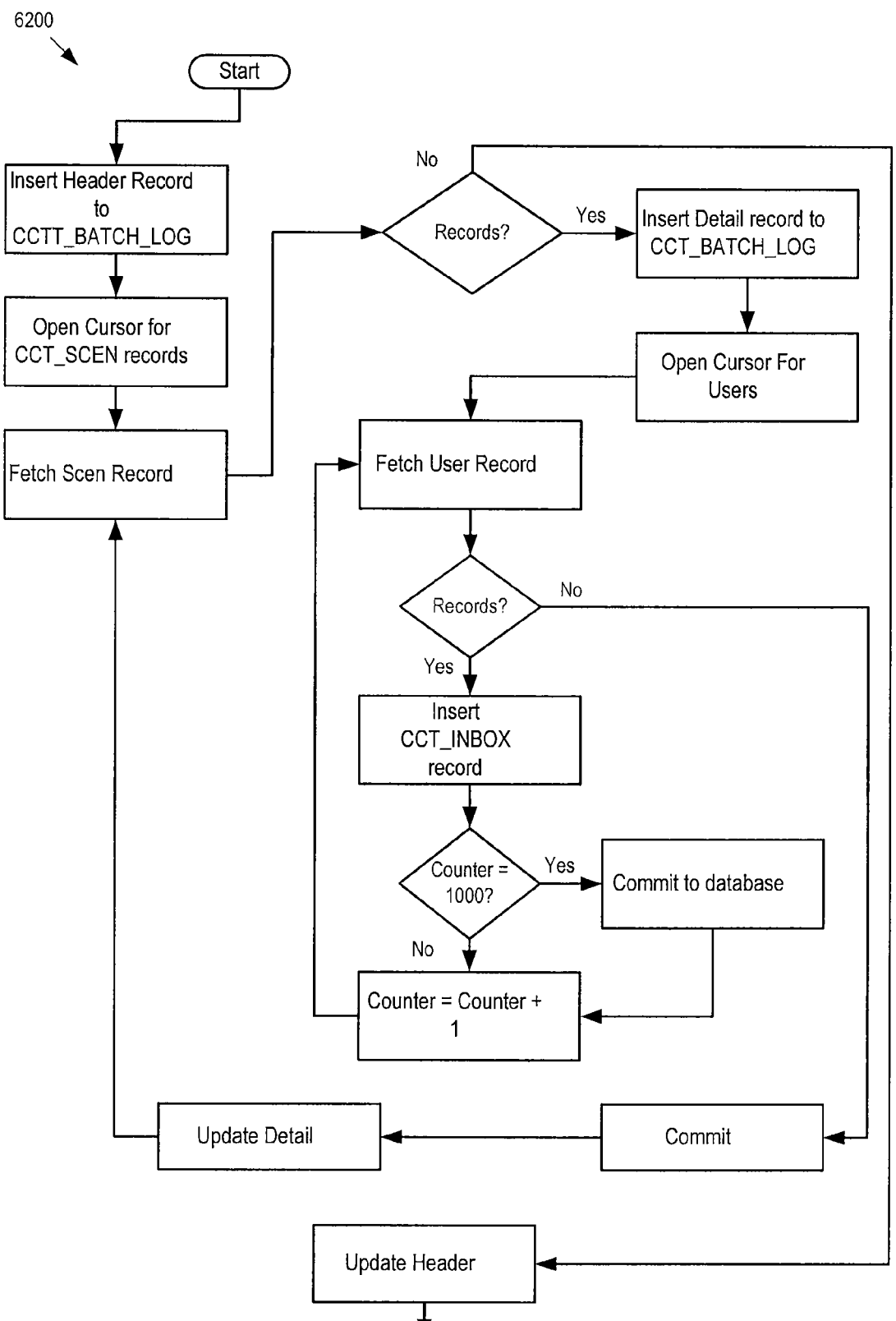
FIG. 62 shows a content distribution processing flow 6200.

FIG. 62 shows a content distribution processing flow 6200. The ACT system 5100 may initiate the flow 6200 after any call center agent content deliverable (e.g., an examination or an electronic desk drop) has been changed to Released status. The system 5100 then inserts a header in CCTT_BATCH_LOG, opens the database to open records from CCTT_SCEN, and delivers each content scenario. When no more content scenarios remain to be delivered, the system 5100 updates the headers and finishes. When additional content scenarios exist that are Released, the system 5100 logs a detail record in CCTT_BATCH_LOG and opens agent records in the database. For each agent matching the content distribution list for a content scenario, the system 5100 inserts a delivery record in CCTT_INBOX. At any given interval (e.g., every 1000 records) the system 5100 may commit related data to the database, thereby avoiding performance degradation when committing every record. The system 5100 continues delivering a content scenario to agents when no more agents match the distribution list. The system 5100 then moves to the next content scenario, if any, for delivery. The flow 6200 repeats until all the content scenarios have been delivered to all of the matching call center agents.

A number of implementations have been described. Nevertheless, it may be understood that various modifications may be made without departing from the spirit and scope of the invention. Accordingly, other implementations are within the scope of the following claims.

What is claimed is:

1. A call center communication and compliance monitoring method comprising:
   defining call center agent content deliverables, the call center agent content deliverables comprising electronic desk drops, examinations, or both for an asset of a call center supported vendor;
   communicating the call center agent content deliverables to a call center agent;
   assessing an agent utilization by the call center agent of the content deliverables;
   communicating, in response to the agent utilization of the content deliverables, an agent profile edit request to the call center supported vendor, the edit request specifying an update to an agent access authorization for the asset of the call center supported vendor; allowing the call center agent to access the asset of the call center supported vendor, when the agent access authorization is updated to allow the call center agent to access the asset.

2. The method of claim 1, the asset of the call center supported vendor comprising: a network provisioned service, supported by the call center supported vendor, from multiple network provisioned services in a line of business of the vendor.

3. The method of claim 1, where assessing agent utilization comprises:
   monitoring access to the call center agent deliverables by the call center agent and tracking execution of the call center agent deliverables by the call center agent.

4. The method of claim 3, further comprising:
   generating access statistics based on the access and storing the access statistics in a monitoring database.

5. The method of claim 4, further comprising:
   automatically generating a real-time local management report expressing compliance with execution of the call center agent deliverables by the matching call center agents; and
   automatically generating a real-time remote management report expressing compliance with execution of the call center agent deliverables by the matching call center agents and communicating the real-time remote management report to a remote monitoring location.

6. The method of claim 2, where the network provisioned service comprises:
a digital subscriber line (DSL) service;
a secure shuttle transport (SST) service;
an ethernet digital subscriber line (eDSL) service, or any combination thereof.

7. The method of claim 1, further comprising:
tracking execution of a selected call center agent deliverable from among those communicated to the call center agent;
obtaining agent feedback specific to the selected call center agent deliverable during execution of the selected call center agent deliverable;
determining whether the agent feedback meets a performance threshold; and
when the agent feedback fails to meet the performance threshold, branching execution of the selected call center agent deliverable to a performance re-enforcement deliverable section within the selected call center agent deliverable.

8. A call center communication and compliance monitoring system comprising: a memory comprising: content creation logic operable to define call center agent content deliverables, the call center agent content deliverables comprising electronic desk drops, examinations, or both for an asset of a call center supported vendor; distribution logic operable to communicate the call center agent content deliverables to a call center agent; monitoring logic operable to assess an agent utilization by the call center agent of the content deliverables; reporting logic operable to: communicate, in response to the agent utilization of the content deliverables, an agent profile edit request to the call center supported vendor, the edit request specifying an update to an agent access authorization for the asset of the call center supported vendor, where the asset of the call center supported vendor comprises a network provisioned service, supported by the call center supported vendor, from multiple network provisioned services in a line of business of the vendor; and allow the call center agent access to the asset of the call center supported vendor, when the agent access authorization is updated to allow the call center agent to access the asset; and a processor operable to execute the content creation logic, routing logic, and distribution logic.

9. The system of claim 8, the monitoring logic further operable to access the call center agent deliverables and tracking execution of the call center agent deliverables.

10. The system of claim 9, the reporting logic further operable to generate access statistics based on the access and storing the access statistics in a monitoring database.

11. The system of claim 10, where the reporting logic is further operable to:
automatically generate a real-time local management report expressing compliance with execution of the call center agent deliverables by the matching call center agents; and
automatically generate a real-time remote management report expressing compliance with execution of the call center agent deliverables by the matching call center agents and communicating the real-time remote management report to a remote monitoring location.

12. The system of claim 8, further comprising:
guidance logic operable to:
track execution of a selected call center agent deliverable from among those communicated to the call center agent;
obtain agent feedback specific to the selected call center agent deliverable during execution of the selected call center agent deliverable;
determine whether the agent feedback meets a performance threshold; and
when the agent feedback fails to meet the performance threshold, branch execution of the selected call center agent deliverable to a performance re-enforcement deliverable section within the selected call center agent deliverable.

13. A product comprising:
a non-transitory computer readable medium; and
computer executable instructions stored on the medium for execution by a processor in a system, that when executed, cause the system to perform a method comprising:
defining call center agent content deliverables comprising electronic desk drops, examinations, or both for an asset of a call center supported vendor;
communicating the call center agent content deliverables to a call center agent;
assessing an agent utilization by the call center agent of the content deliverables;
communicating, in response to agent utilization of the content deliverables, an agent profile edit request to the call center supported vendor, the edit request specifying an update to an agent access authorization for the asset of the call center supported vendor;
allowing the call center agent access to the asset of the call center supported vendor, when the agent access authorization is updated to allow the call center agent to access the asset.

14. The product of claim 13, the asset of the call center supported vendor comprising: a network provisioned service, supported by the call center supported vendor, from multiple network provisioned services in a line of business of the vendor.

15. The product of claim 13, where assessing agent utilization comprises:
monitoring access to the call center agent deliverables and tracking execution of the call center agent deliverables.

16. The product of claim 15, where instructions cause the system to perform a method further comprising:
generating access statistics based on the access and storing the access statistics in a monitoring database.

17. The product of claim 16, where instructions cause the system to perform a method further comprising:
automatically generating a real-time local management report expressing compliance with execution of the call center agent deliverables by the matching call center agents; and
automatically generating a real-time remote management report expressing compliance with execution of the call center agent deliverables by the matching call center agents and communicating the real-time remote management report to a remote monitoring location.

18. The product of claim 14, where network provisioned service is from a group consisting of:
a digital subscriber line (DSL) service;
a secure shuttle transport (SST) service;
an ethernet digital subscriber line (eDSL) service, or any combination thereof.

19. The product of claim 13, where instructions cause the system to perform a method further comprising:
tracking execution of a selected call center agent deliverable from among those communicated to the call center agent;

obtaining agent feedback specific to the selected call center agent deliverable during execution of the selected call center agent deliverable;

determining whether the agent feedback meets a performance threshold; and when the agent feedback fails to meet the performance threshold, branching execution of the selected call center agent deliverable to a performance re-enforcement deliverable section within the selected call center agent deliverable.

* * * * *